(12) United States Patent
Li et al.

(10) Patent No.: US 12,448,425 B2
(45) Date of Patent: Oct. 21, 2025

(54) THERAPEUTIC PEPTIDES

(71) Applicant: Board of Regents, The University of Texas System, Austin, TX (US)

(72) Inventors: Chun Li, Houston, TX (US); Chiyi Xiong, Houston, TX (US); Yunfei Wen, Houston, TX (US); Anil Sood, Houston, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 910 days.

(21) Appl. No.: 17/609,536

(22) PCT Filed: May 8, 2020

(86) PCT No.: PCT/US2020/032074
§ 371 (c)(1),
(2) Date: Nov. 8, 2021

(87) PCT Pub. No.: WO2020/227620
PCT Pub. Date: Nov. 12, 2020

(65) Prior Publication Data
US 2022/0213165 A1    Jul. 7, 2022

Related U.S. Application Data

(60) Provisional application No. 62/844,986, filed on May 8, 2019.

(51) Int. Cl.
| C07K 14/705 | (2006.01) |
| A61K 38/08 | (2019.01) |
| A61K 38/10 | (2006.01) |
| A61K 47/64 | (2017.01) |
| A61K 47/69 | (2017.01) |
| A61K 49/00 | (2006.01) |
| A61K 51/12 | (2006.01) |
| A61P 35/00 | (2006.01) |
| A61K 38/00 | (2006.01) |

(52) U.S. Cl.
CPC ............ *C07K 14/705* (2013.01); *A61K 38/08* (2013.01); *A61K 38/10* (2013.01); *A61K 47/6415* (2017.08); *A61K 47/6425* (2017.08); *A61K 47/6909* (2017.08); *A61K 49/0082* (2013.01); *A61K 51/1227* (2013.01); *A61P 35/00* (2018.01); *A61K 38/00* (2013.01)

(58) Field of Classification Search
CPC ...... C07K 14/705; A61K 38/08; A61K 38/10; A61K 47/6415; A61K 47/6425; A61K 47/6909; A61K 49/0082; A61K 51/1227; A61P 35/00
See application file for complete search history.

(56) References Cited

U.S. PATENT DOCUMENTS

| 2008/0064052 A1 | 3/2008 | Kuhn et al. |
| 2010/0150834 A1 | 6/2010 | Pasquale |

FOREIGN PATENT DOCUMENTS

| CN | 101146822 A | 3/2008 |
| CN | 105713075 A | 6/2016 |
| WO | WO 2007/082296 | 7/2007 |

OTHER PUBLICATIONS

Abéngozar et al., "Blocking ephrinB2 with highly specific antibodies inhibits angiogenesis, lymphangiogenesis, and tumor growth," Blood 119, 4565-4576, 2012.
Barneh et al., "EphB4 tyrosine kinase stimulation inhibits growth of MDA-MB-231 breast cancer cells in a dose and time dependent manner," Dis Markers 35, 933-938, 2013.
Becerikli et al., "EPHB4 tyrosine-kinase receptor expression and biological significance in soft tissue sarcoma," Int J Cancer.; 15;136(8):1781-91, Apr. 2015.
Bergers et al., "Modes of resistance to anti-angiogenic therapy," Nat Rev Cancer 8, 592-603, 2008.
Bhatia et al., "Enhancing radiosensitization in EphB4 receptor-expressing Head and Neck Squamous Cell Carcinomas," Sci Rep., 6:38792, Dec. 2016.
Chen et al., "EphB4 forward-signaling regulates cardiac progenitor development in mouse ES cells," J Cell Biochem., 116(3):467-75, 2015.
Chen et al., "Targeting receptor tyrosine kinase EphB4 in cancer therapy," Semin Cancer Biol.; 56:37-46, 2019 (Epub 2017).
Chrencik et al., "Structural and biophysical characterization of the EphB4*ephrinB2 protein-protein interaction and receptor specificity," J Biol Chem 281, 28185-28192, 2006.
Chrencik et al., "Structure and thermodynamic characterization of the EphB4/Ephrin-B2 antagonist peptide complex reveals the determinants for receptor specificity," *Structure*, 14:321-330, 2006.
El-Faham and Albericio, "Peptide coupling reagents, more than a letter soup," Chemical Reviews. 111 (11): 6557-602, Nov. 2011.
Extended European Search Report issued in European Application No. 20801520.6, mailed Jan. 2, 2023.
Ferguson et al., "Novel EPHB4 Receptor Tyrosine Kinase Mutations and Kinomic Pathway Analysis in Lung Cancer," Sci Rep.; 5:10641, Jun. 2015.

(Continued)

*Primary Examiner* — Robert S Cabral
(74) *Attorney, Agent, or Firm* — pH IP Law

(57) ABSTRACT

Provided herein are therapeutic peptides. In some aspects, therapeutic peptides are provided that can alter EphB4/EFNB2 signaling and can be used to treat a cancer. In some embodiments, the peptides are comprised in nanoparticles, such as core-cross-linked polymeric micelles (CCPM).

38 Claims, 25 Drawing Sheets

Specification includes a Sequence Listing.

(56) References Cited

OTHER PUBLICATIONS

Hasina et al., "Critical role for the receptor tyrosine kinase EPHB4 in esophageal cancers," Cancer Res.; 73(1):184-94, Jan. 2013.
Herington et al., "Inhibiting Eph kinase activity may not be "Eph"ective for cancer treatment," Growth Factors 32, 207-213, 2014.
Heroult et al., "EphB4 promotes site-specific metastatic tumor cell dissemination by interacting with endothelial cell-expressed ephrinB2," Mol Cancer Res 8, 1297-1309, 2010.
Himanen et al., "Crystal structure of an Eph receptor-ephrin complex," Nature 414, 933-938, 2001.
Hu et al., "Down-regulation of EphB4 phosphorylation is necessary for esophageal squamous cell carcinoma tumorigenecity," Tumour Biol 35, 7225-7232, 2014.
Ishii et al., "EphB signaling inhibits gap junctional intercellular communication and synchronized contraction in cultured cardiomyocytes," Basic Res Cardiol. 2011; 106:1057-68.
Kertesz et al., "The soluble extracellular domain of EphB4 (sEphB4) antagonizes EphB4-EphrinB2 interaction, modulates angiogenesis, and inhibits tumor growth," Blood 107, 2330-2338, 2006.
Koolpe et al., "EphB receptor-binding peptides identified by phage display enable design of an antagonist with ephrin-like affinity," *The Journal of Biological Chemistry*, 280(17):17301-17311, 2005.
Kwan Tat et al., "Activation of the receptor EphB4 by its specific ligand ephrin B2 in human osteoarthritic subchondral bone osteoblasts," *Arthritis Rheum.*, 58:3820-3830, 2008.
Lamouille et al., "Molecular mechanisms of epithelial-mesenchymal transition," Nat Rev Mol Cell Biol 15, 178-196, 2014.
Li et al., "EphB4 regulates the growth and migration of pancreatic cancer cells," Tumour Biol.; 35(7):6855-9, Jul. 2014.
Li et al., "Erythropoietin promotes bone formation through EphrinB2/EphB4 signaling," *Journal of Dental Research*, 94(3):455-463, 2015.
Li et al., "The coexpression of EphB4 and EphrinB2 is associated with poor prognosis in HER2-positive breast cancer," Onco Targets Ther.; 10:1735-1742, Mar. 2017.
Mansson-Broberg et al., "Modulation of ephrinB2 leads to increased angiogenesis in ischemic myocardium and endothelial cell proliferation," Biochem Biophys Res Commun; 373:355-9, 2008.
Martiny-Baron et al., "Inhibition of tumor growth and angiogenesis by soluble EphB4," Neoplasia 6, 248-257, 2004.
Melchionna et al., "The unexpected advantages of using D-Amino acids for peptide self-assembly into nanostructured hydrogels for medicine," *Current Topics in Medicinal Chemistry*, 16:2009-2018, 2016.
Mertens-Walker et al., "EphB4 localises to the nucleus of prostate cancer cells," Exp Cell Res.; 10;333(1):105-15, Apr. 2015.
Mertens-Walker et al., "The tumour-promoting receptor tyrosine kinase, EphB4, regulates expression of integrin-β8 in prostate cancer cells," BMC Cancer 15, 164, 2015.
Noberini et al., "PEGylation potentiates the effectiveness of an antagonistic peptide that targets the EphB4 receptor with nanomolar affinity," PLoS One, 6(12):e28611, 2011.
Noren and Pasquale, "Paradoxes of the EphB4 receptor in cancer," Cancer Res 67, 3994-3997, 2007.
Noren et al., "Interplay between EphB4 on tumor cells and vascular ephrin-B2 regulates tumor growth," Proc Natl Acad Sci USA 101, 5583-5588, 2004.
Noren et al., "The EphB4 receptor suppresses breast cancer cell tumorigenicity through an Abl-Crk pathway," Nat Cell Biol 8, 815-825, 2006.
PCT International Search Report and Written Opinion issued in International Application No. PCT/US2020/032074, mailed Oct. 19, 2020.
Pecot et al., "Tumour angiogenesis regulation by the miR-200 family," Nat Commun 4, 2427, 2013.
Randolph et al., "EphB4/EphrinB2 therapeutics in Rhabdomyosarcoma," PLoS One.; 12(8):e0183161, Aug. 2017.
Reidl et al., "Targeting the EPH system with peptides and peptide conjugates," *Curr Drug Targets*, 16(10):1031-1047, 2015.
Rutkowski et al., "Evidence for a dual function of EphB4 as tumor promoter and suppressor regulated by the absence or presence of the ephrin-B2 ligand," Int J Cancer 131, E614-624, 2012.
Sawamiphak et al., "Ephrin-B2 regulates VEGFR2 function in developmental and tumour angiogenesis," Nature 465, 487-491, 2010.
Scehnet et al., "The role of Ephs, Ephrins, and growth factors in Kaposi sarcoma and implications of EphrinB2 blockade," Blood 113, 254-263, 2009.
Stammes et al., "Evaluation of EphA2 and EphB4 as Targets for Image-Guided Colorectal Cancer Surgery," Int J Mol Sci.; 18(2):E307, Feb. 2017.
Stephenson et al., "Anti-tumour effects of antibodies targeting the extracellular cysteine-rich region of the receptor tyrosine kinase EphB4," Oncotarget 6, 7554-7569, 2015.
Tognolini et al., "Therapeutic perspectives of Eph-ephrin system modulation," Drug Discov Today, 19(5):661-669, 2014.
Vrettos et al., "On the design principles of peptide-drug conjugates for targeted drug delivery to the malignant tumor site," Beilstein J Org Chem.; 14: 930-954, 2018.
Wang et al., "Ephrin-B2 controls VEGF-induced angiogenesis and lymphangiogenesis," Nature 465, 483-486, 2010.
Wang et al., "Targeted delivery of paclitaxel to EphA2-expressing cancer cells," *Clinical Cancer Research*, 19(1):128-137, 2013.
Xiong et al., "In vivo small-animal PET/CT of EphB4 receptors using 64Cu-labeled peptide," *J Nucl Med.*, 52:241-248, 2011.
Xiong et al., "Targeting forward and reverse EphB4/EFNB2 signaling by a peptide with dual functions," *Scientific Reports*, 10:520, 2020.
Yang and Weinberg, "Epithelial-mesenchymal transition: at the crossroads of development and tumor metastasis," Dev Cell 14, 818-829, 2008.
Yang et al., "Long-circulating near-infrared fluorescence core-cross-linked polymeric micelles: synthesis, characterization, and dual nuclear/optical imaging," Biomacromolecules 8, 3422-3428, 2007.
Yin et al., "Overexpression of EPHB4 Is Associated with Poor Survival of Patients with Gastric Cancer," Anticancer Res.; 37(8):4489-4497, Aug. 2017.
Zhang et al., "Annexin A5-conjugated polymeric micelles for dual SPECT and optical detection of apoptosis," J Nucl Med 52, 958-964, 2011a.
Zhang et al., "Peptide-conjugated polymeric micellar nanoparticles for Dual SPECT and optical imaging of EphB4 receptors in prostate cancer xenografts," *Biomaterials*, 32(25):5872-5879, 2011.
Zhao et al., "Bidirectional ephrinB2-EphB4 signaling controls bone homeostasis," *Cell Metabolism*, 4:111-121, 2006.
Zhao et al., "Distinct EphB4-mediated mechanisms of apoptotic and resistance to dasatinib in human chronic myeloid leukemia and K562 cell lines," Leuk Res., 63:28-33, Dec. 2017.
Zhao et al., "Dual-modal tumor imaging via long-circulating biodegradable core-cross-linked polymeric micelles," *ACS Macro Letters*, 1:150-153, 2012.

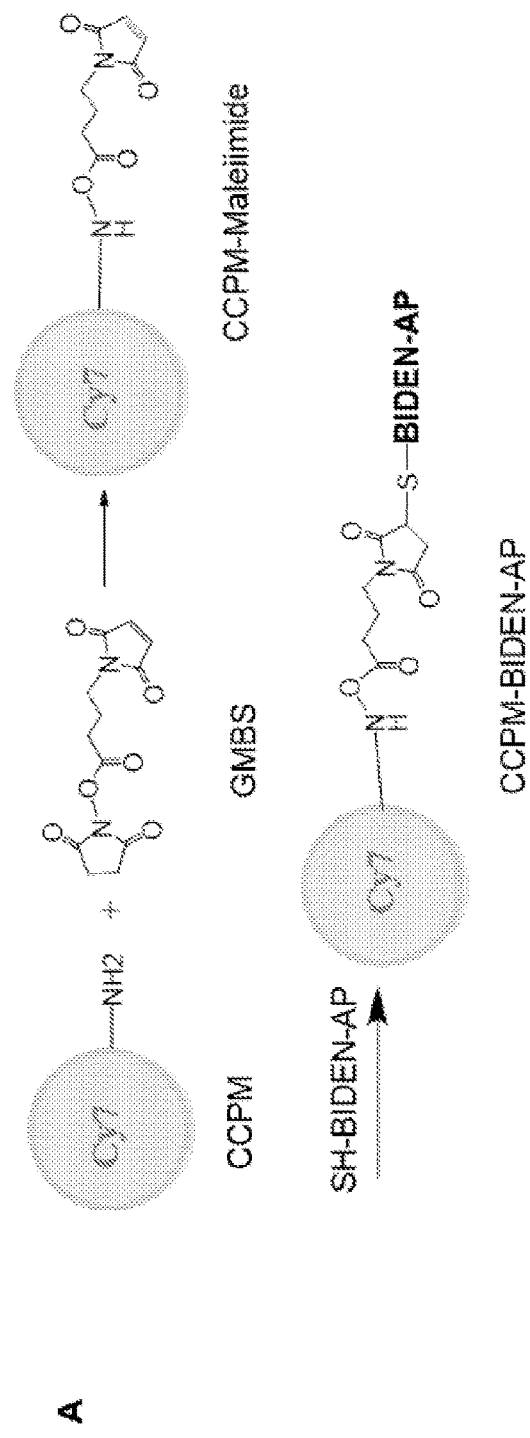
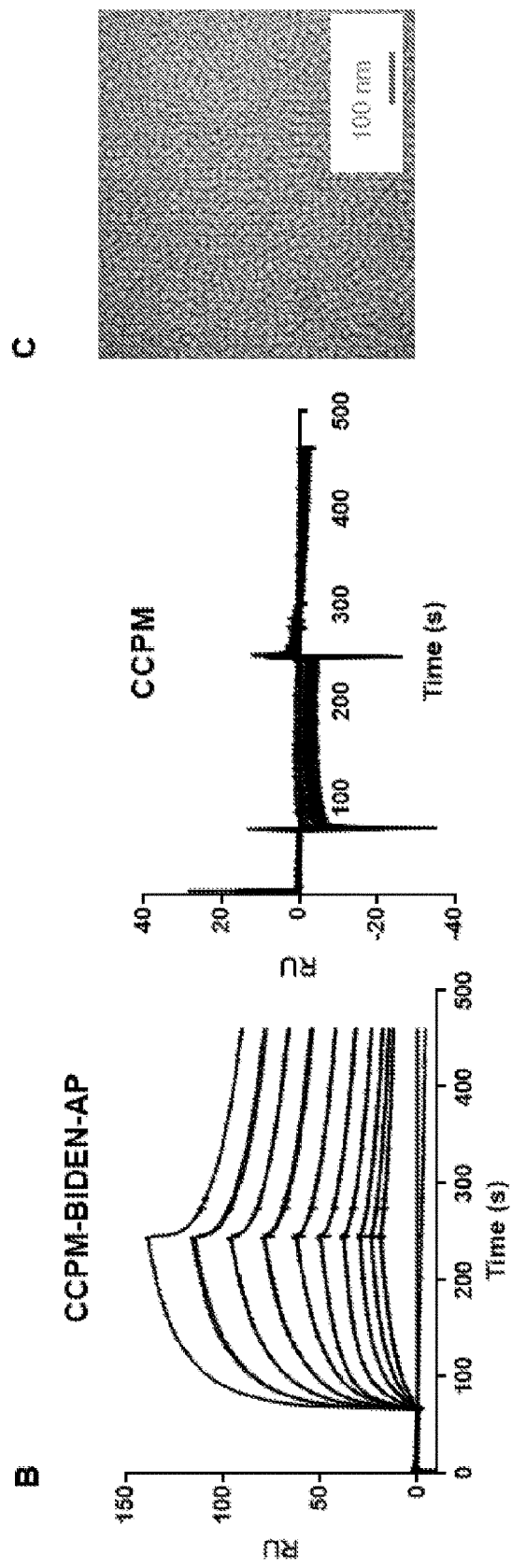
FIGS. 3A-C

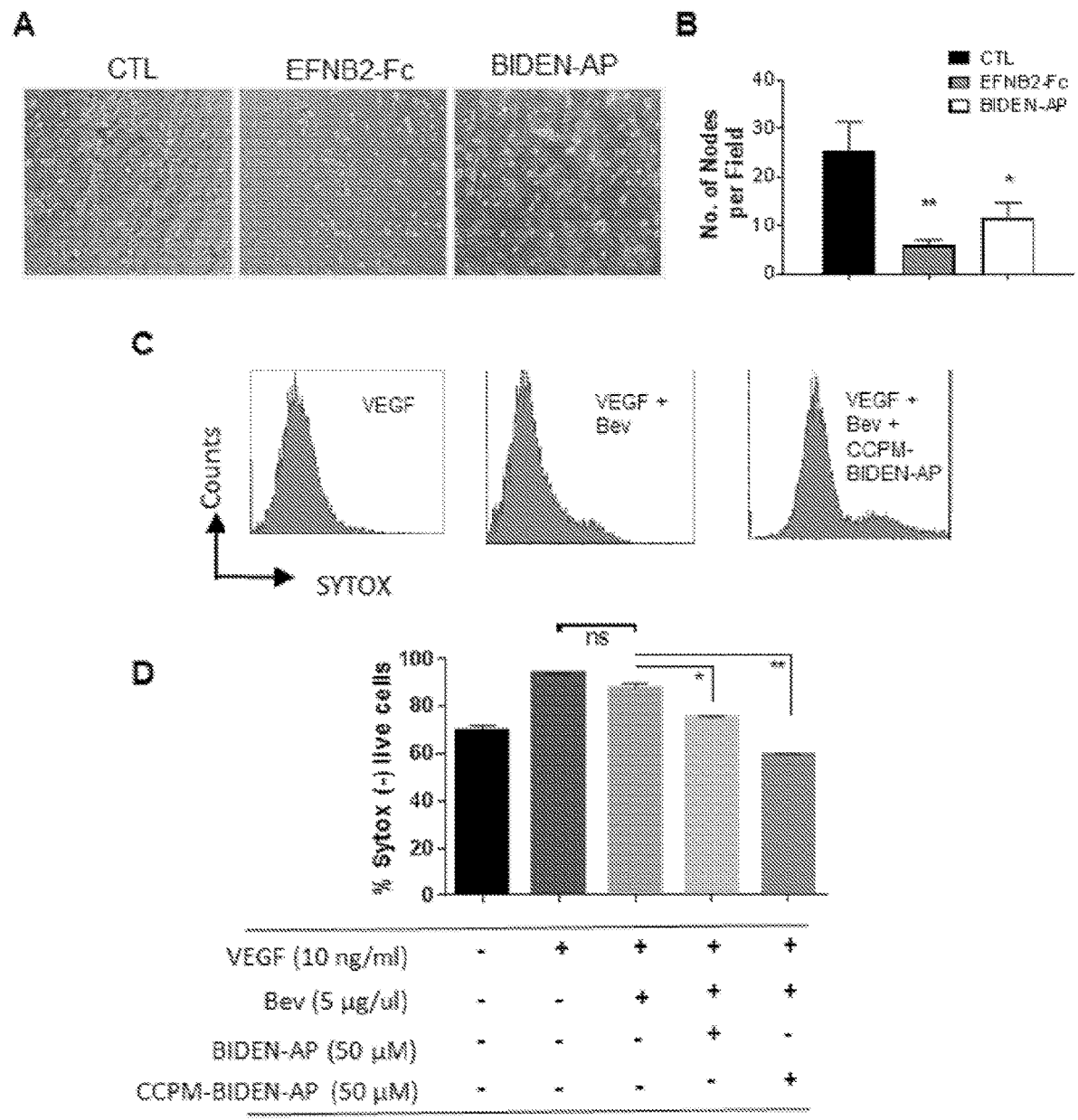
FIGS. 4A-D

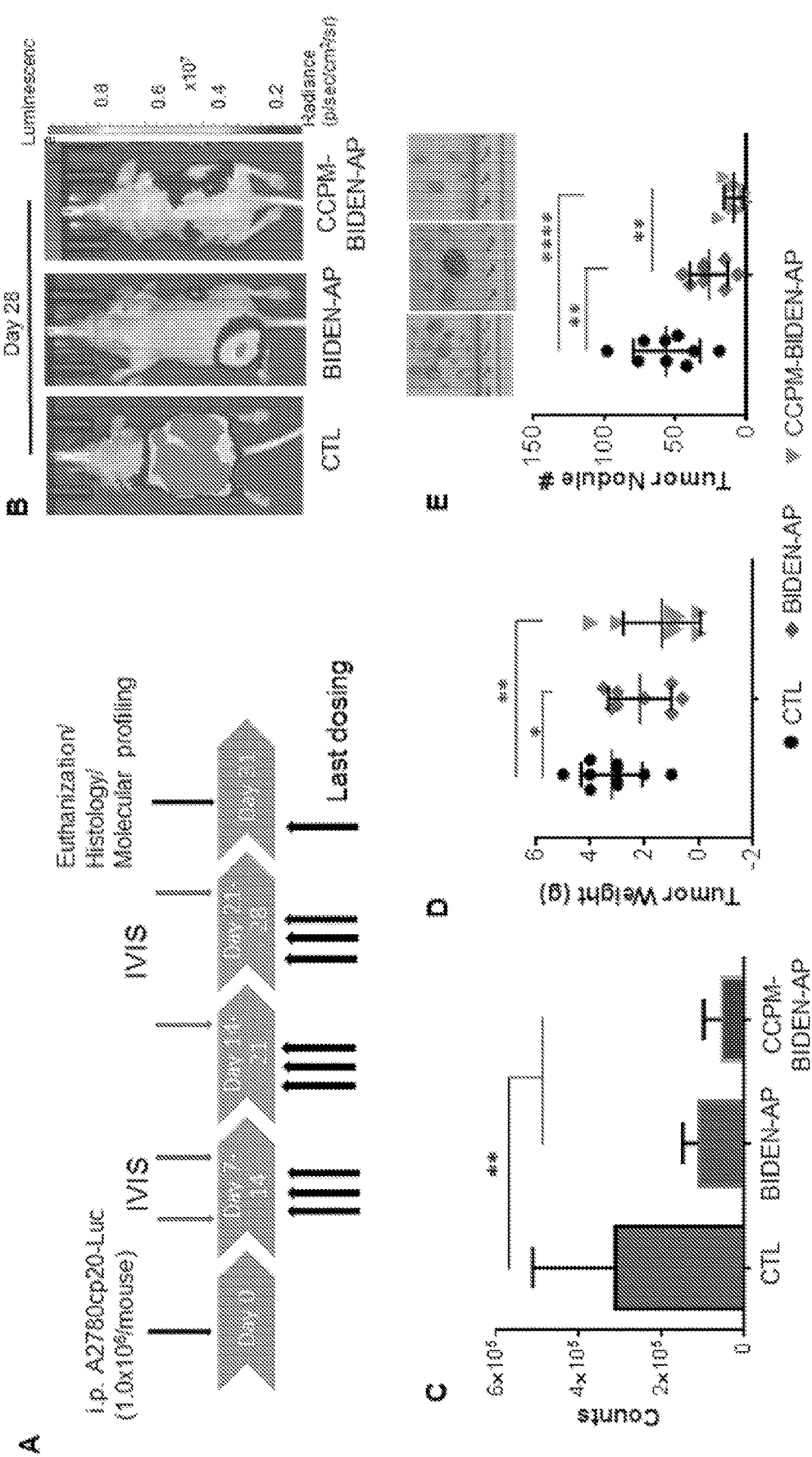
FIGS. 5A-E

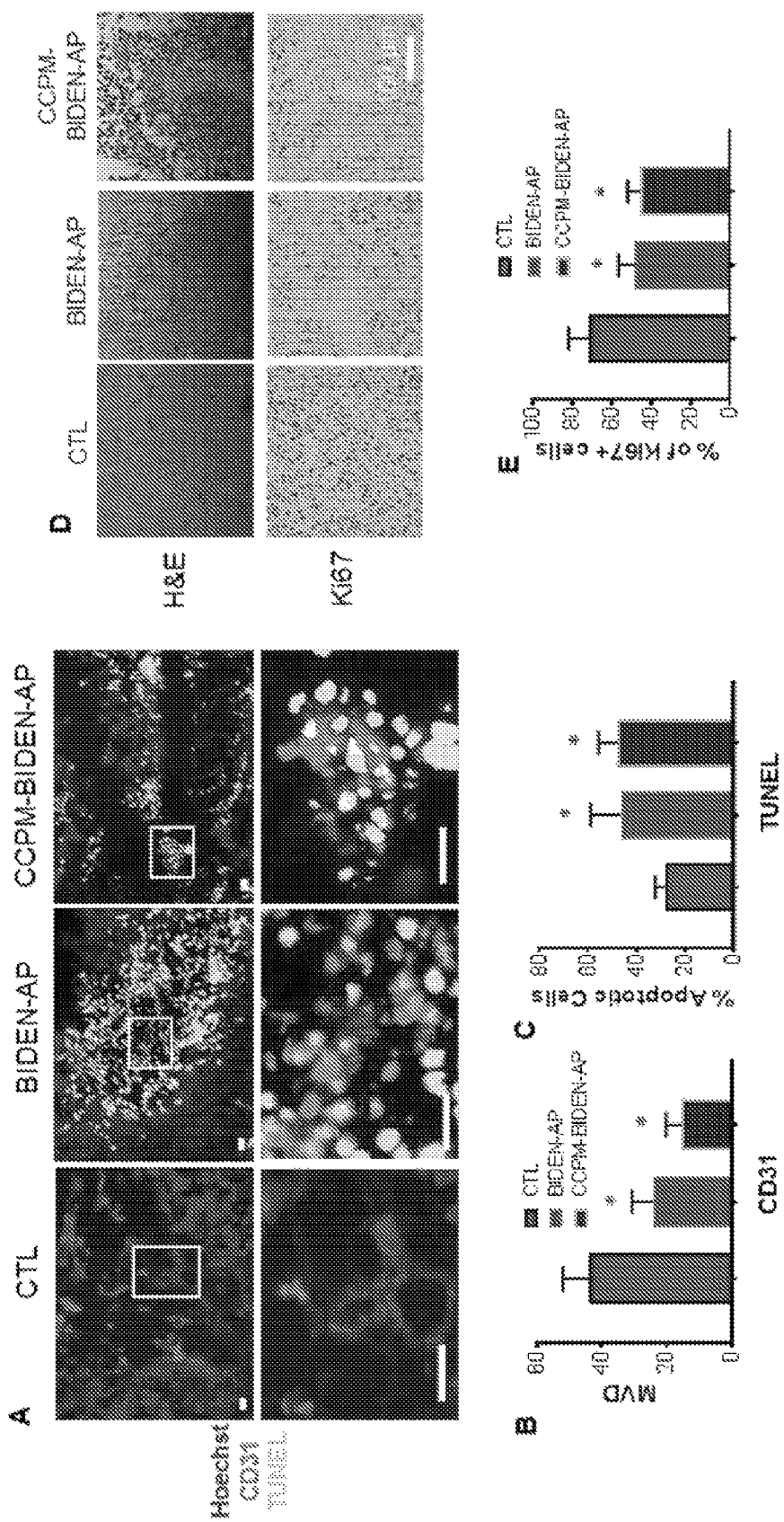
FIGS. 6A-E

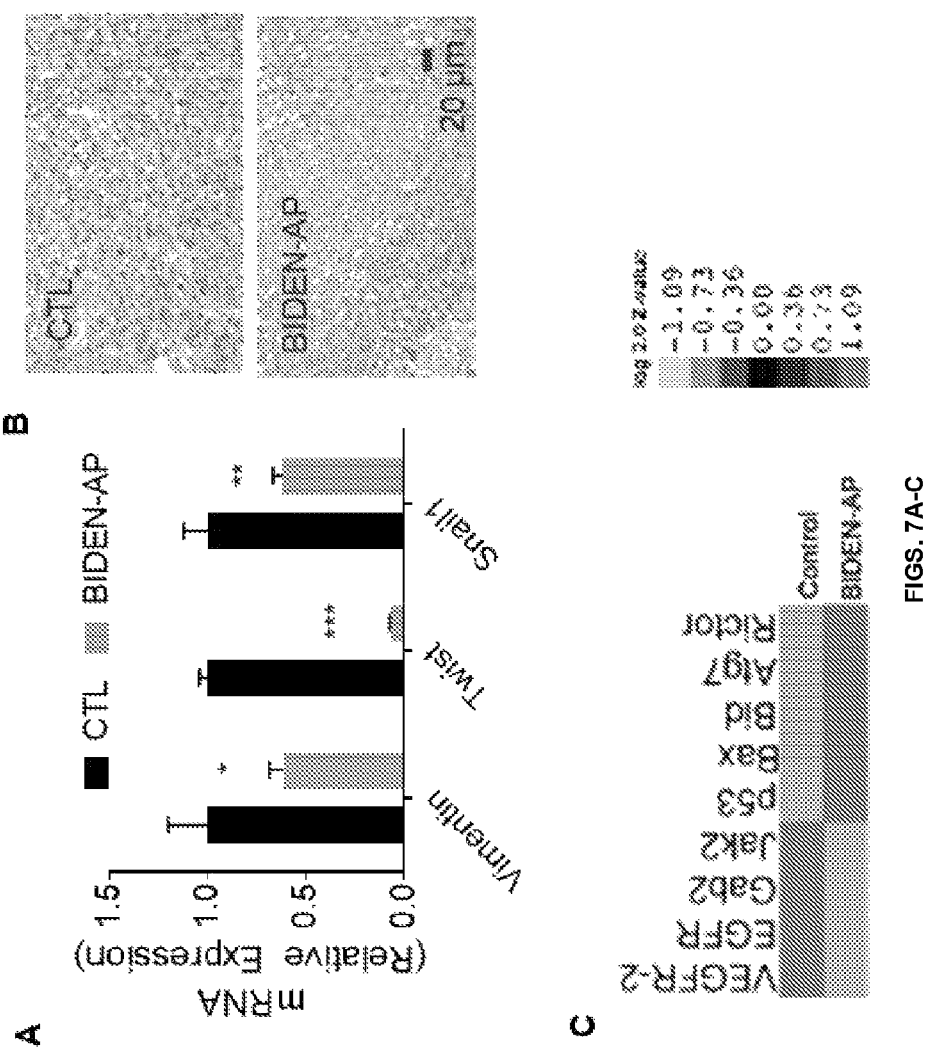
FIGS. 7A-C

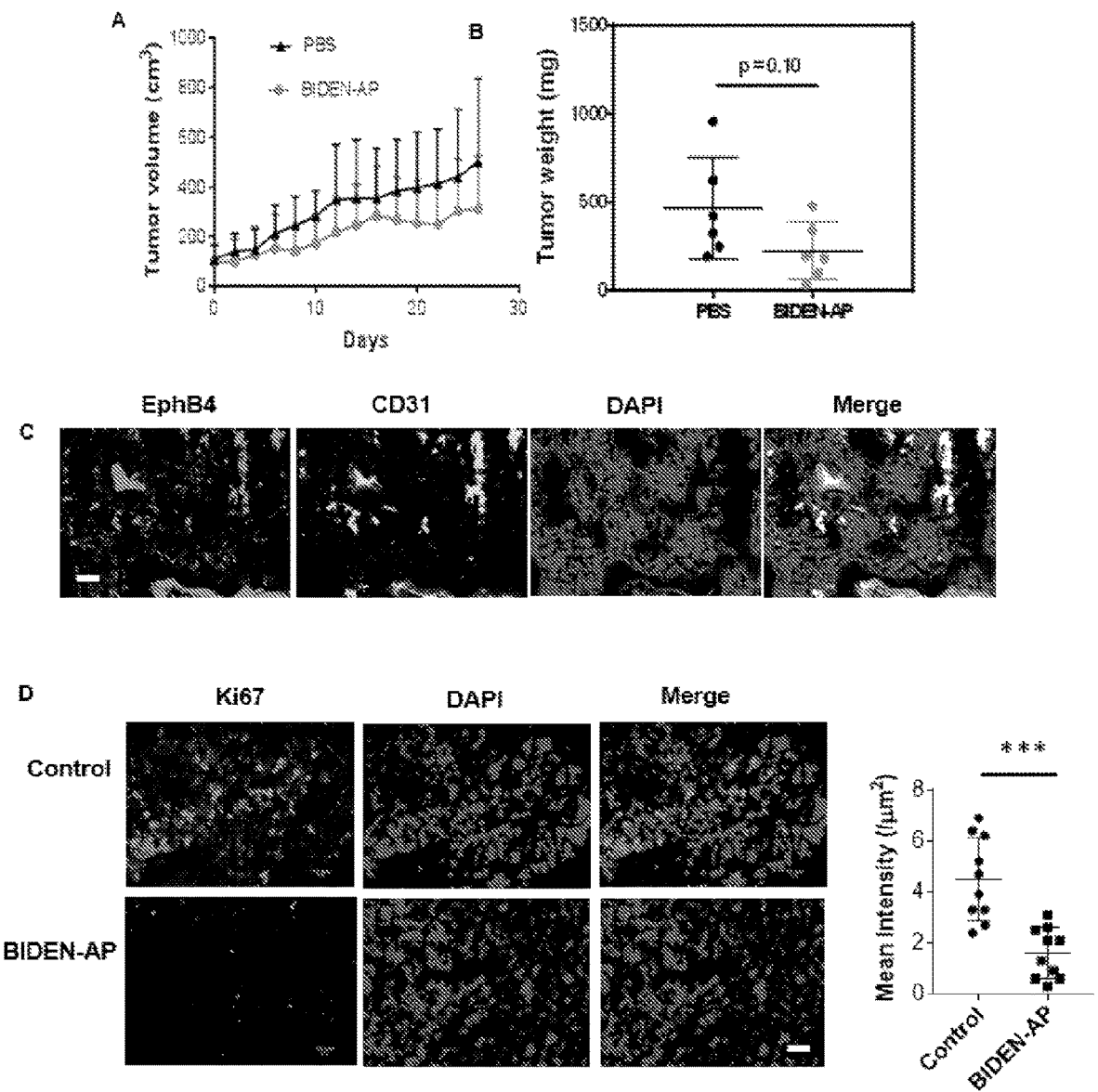
FIGS. 8A-C

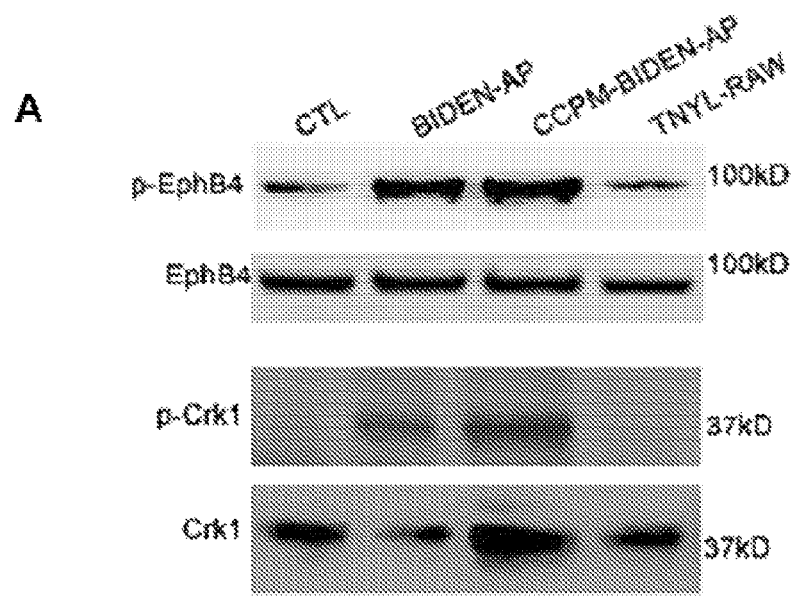
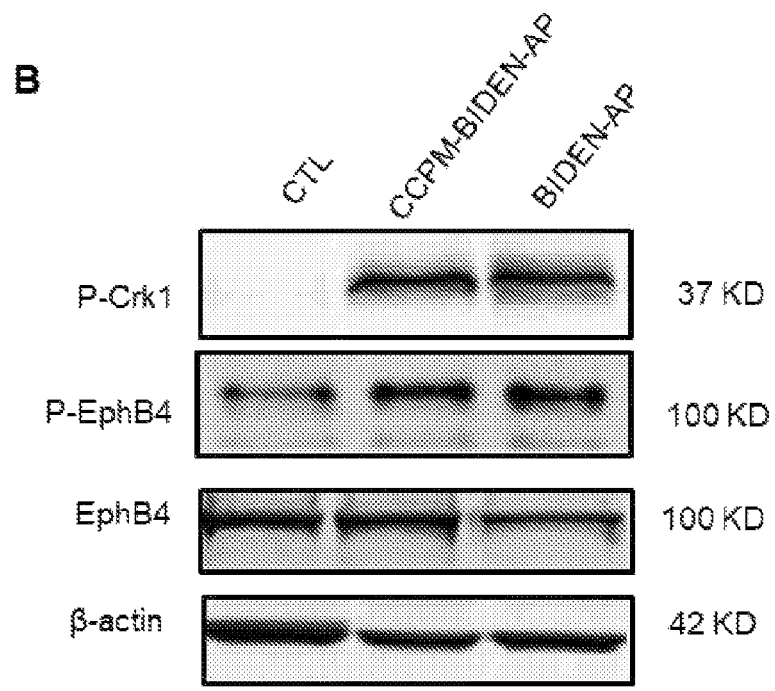
FIGS. 16A-B

A
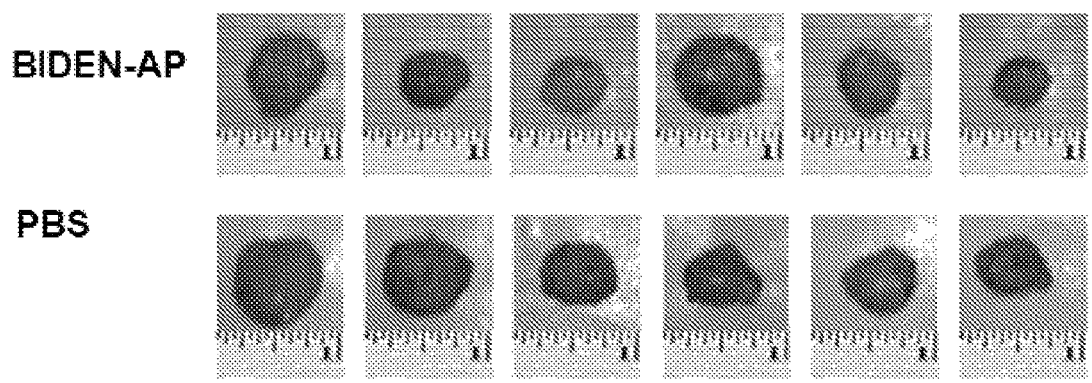
BIDEN-AP
PBS
B
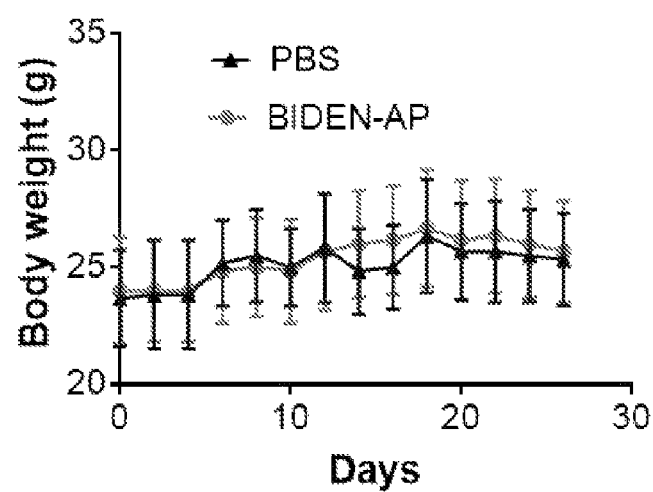
FIGS. 19A-B

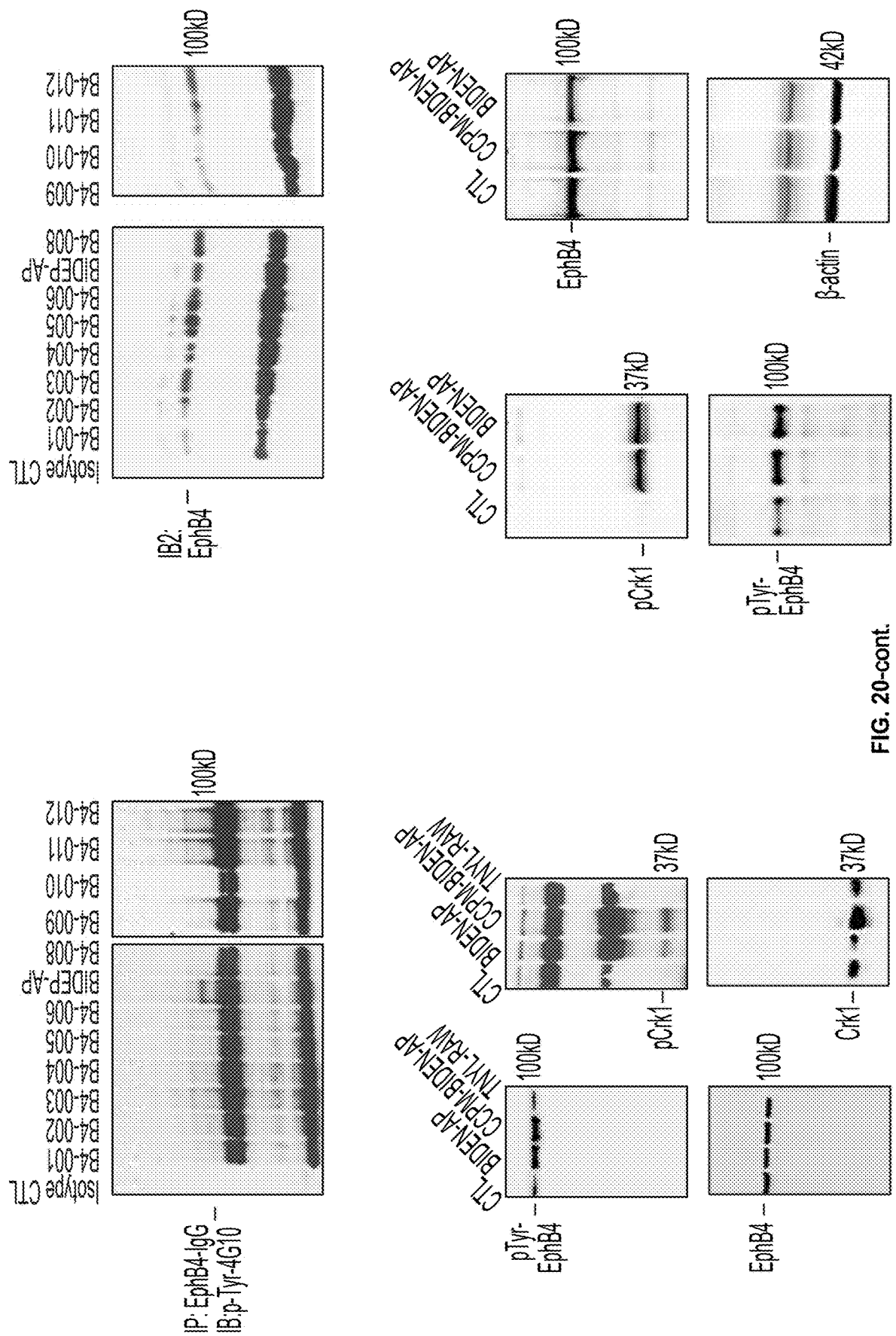
FIG. 20-cont.

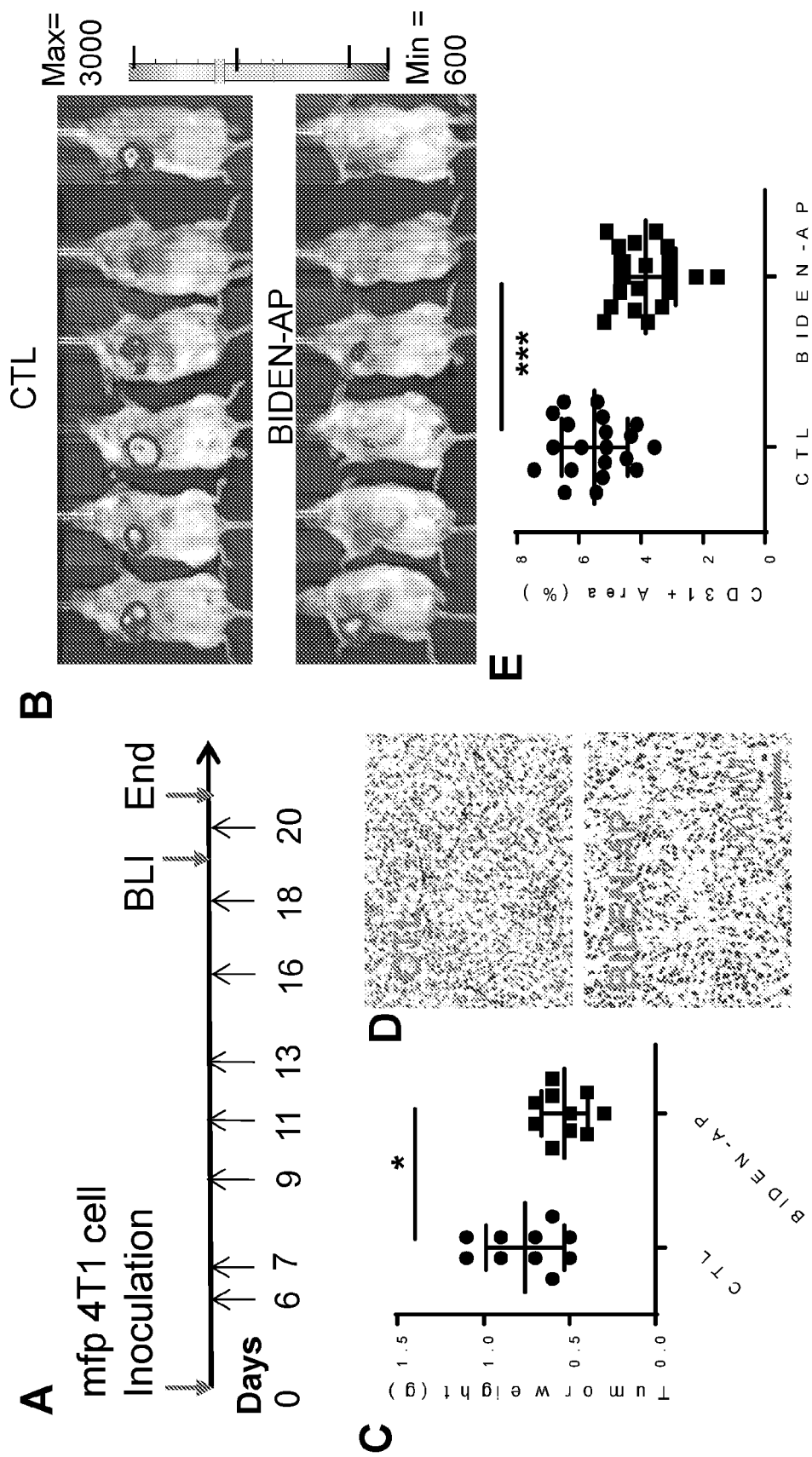
FIGS. 24A-E

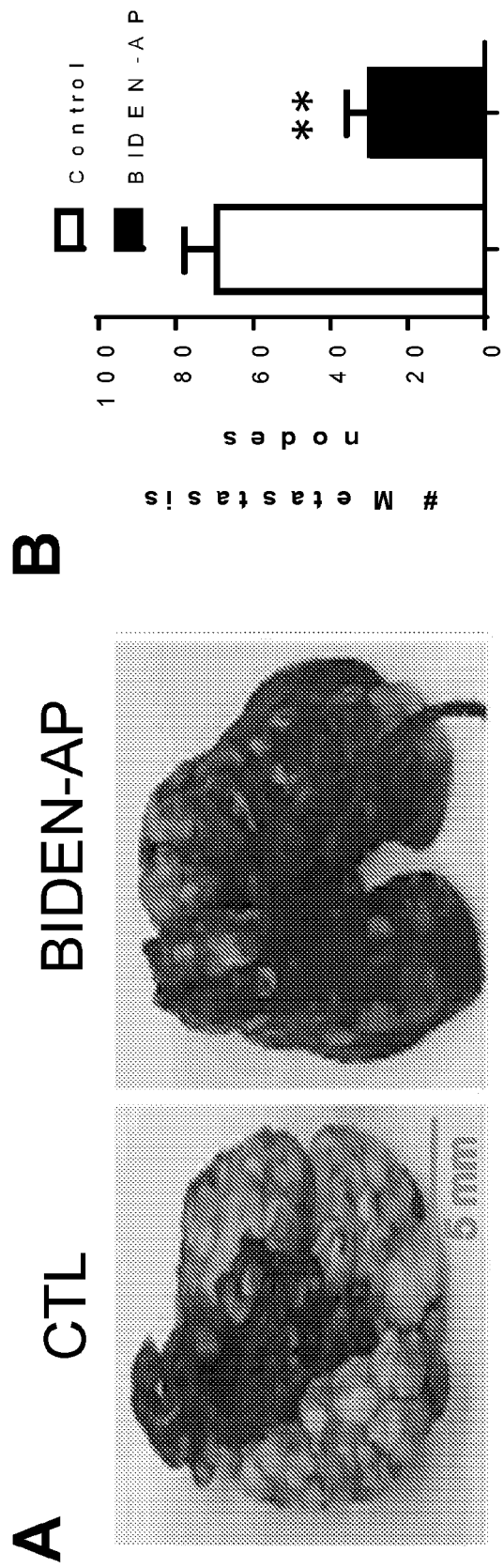
FIGS. 25A-B

```
                           SEQUENCE LISTING

<160> NUMBER OF SEQ ID NOS: 26

<210> SEQ ID NO 1
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (3)..(3)
<223> OTHER INFORMATION: D-amino acid

<400> SEQUENCE: 1

Thr Asn Tyr Leu Phe Ser Pro Asn Gly Pro Ile Ala Arg Ala Trp
1               5                   10                  15

<210> SEQ ID NO 2
<211> LENGTH: 18
<212> TYPE: PRT
<213> ORGANISM: Artificial sequence
<220> FEATURE:
<223> OTHER INFORMATION: Synthetic peptide

<400> SEQUENCE: 2

Gly Ser Thr Ser Gly Ser Gly Lys Pro Gly Ser Gly Glu Gly Ser Thr
1               5                   10                  15

Lys Gly

<210> SEQ ID NO 3
<211> LENGTH: 5
<212> TYPE: PRT
<213> ORGANISM: Artificial sequence
<220> FEATURE:
<223> OTHER INFORMATION: Synthetic peptide

<400> SEQUENCE: 3

Glu Ala Ala Ala Lys
1               5

<210> SEQ ID NO 4
<211> LENGTH: 5
<212> TYPE: PRT
<213> ORGANISM: Artificial sequence
<220> FEATURE:
<223> OTHER INFORMATION: Synthetic peptide

<400> SEQUENCE: 4

Gly Gly Gly Gly Ser
1               5

<210> SEQ ID NO 5
<211> LENGTH: 17
<212> TYPE: PRT
<213> ORGANISM: Artificial sequence
<220> FEATURE:
<223> OTHER INFORMATION: Synthetic peptide

<400> SEQUENCE: 5

Lys Thr Asn Tyr Leu Phe Ser Pro Asn Gly Pro Ile Ala Arg Ala Trp
1               5                   10                  15
```

Asp

```
<210> SEQ ID NO 6
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (13)..(13)
<223> OTHER INFORMATION: D-amino acid

<400> SEQUENCE: 6

Thr Asn Tyr Leu Phe Ser Pro Asn Gly Pro Ile Ala Arg Ala Trp
1               5                   10                  15

<210> SEQ ID NO 7
<211> LENGTH: 10
<212> TYPE: PRT
<213> ORGANISM: Artificial sequence
<220> FEATURE:
<223> OTHER INFORMATION: Synthetic peptide

<400> SEQUENCE: 7

Tyr Ser Ala Thr Asn Tyr Leu Arg Ala Trp
1               5                   10

<210> SEQ ID NO 8
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (4)..(4)
<223> OTHER INFORMATION: D-amino acid

<400> SEQUENCE: 8

Thr Asn Tyr Leu Phe Ser Pro Asn Gly Pro Ile Ala Arg Ala Trp
1               5                   10                  15

<210> SEQ ID NO 9
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (5)..(5)
<223> OTHER INFORMATION: D-amino acid

<400> SEQUENCE: 9

Thr Asn Tyr Leu Phe Ser Pro Asn Gly Pro Ile Ala Arg Ala Trp
1               5                   10                  15

<210> SEQ ID NO 10
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (6)..(6)
<223> OTHER INFORMATION: D-amino acid
```

```
<400> SEQUENCE: 10

Thr Asn Tyr Leu Phe Ser Pro Asn Gly Pro Ile Ala Arg Ala Trp
1               5                   10                  15

<210> SEQ ID NO 11
<211> LENGTH: 14
<212> TYPE: PRT
<213> ORGANISM: Artificial sequence
<220> FEATURE:
<223> OTHER INFORMATION: Synthetic peptide

<400> SEQUENCE: 11

Thr Asn Tyr Leu Phe Ser Pro Asn Gly Pro Ile Ala Arg Ala
1               5                   10

<210> SEQ ID NO 12
<211> LENGTH: 7
<212> TYPE: PRT
<213> ORGANISM: Artificial sequence
<220> FEATURE:
<223> OTHER INFORMATION: Synthetic peptide

<400> SEQUENCE: 12

Thr Asn Tyr Leu Arg Ala Trp
1               5

<210> SEQ ID NO 13
<211> LENGTH: 12
<212> TYPE: PRT
<213> ORGANISM: Artificial sequence
<220> FEATURE:
<223> OTHER INFORMATION: Synthetic peptide

<400> SEQUENCE: 13

Tyr Ser Ala Tyr Pro Asp Ser Val Pro Met Met Ser
1               5                   10

<210> SEQ ID NO 14
<211> LENGTH: 8
<212> TYPE: PRT
<213> ORGANISM: Artificial sequence
<220> FEATURE:
<223> OTHER INFORMATION: Synthetic peptide

<400> SEQUENCE: 14

Thr Asn Tyr Leu Ala Arg Ala Trp
1               5

<210> SEQ ID NO 15
<211> LENGTH: 15
<212> TYPE: PRT
<213> ORGANISM: Artificial sequence
<220> FEATURE:
<223> OTHER INFORMATION: Synthetic peptide

<400> SEQUENCE: 15

Thr Asn Tyr Leu Phe Ser Pro Asn Gly Pro Ile Ala Arg Ala Trp
1               5                   10                  15

<210> SEQ ID NO 16
<211> LENGTH: 13
<212> TYPE: PRT
<213> ORGANISM: Artificial sequence
<220> FEATURE:
<223> OTHER INFORMATION: Synthetic peptide

<400> SEQUENCE: 16
```

Thr Asn Tyr Leu Phe Ser Pro Asn Gly Pro Ile Ala Arg
1               5                   10

<210> SEQ ID NO 17
<211> LENGTH: 14
<212> TYPE: PRT
<213> ORGANISM: Artificial sequence
<220> FEATURE:
<223> OTHER INFORMATION: Synthetic peptide

<400> SEQUENCE: 17

Asn Tyr Leu Phe Ser Pro Asn Gly Pro Ile Ala Arg Ala Trp
1               5                   10

<210> SEQ ID NO 18
<211> LENGTH: 13
<212> TYPE: PRT
<213> ORGANISM: Artificial sequence
<220> FEATURE:
<223> OTHER INFORMATION: Synthetic peptide

<400> SEQUENCE: 18

Tyr Leu Phe Ser Pro Asn Gly Pro Ile Ala Arg Ala Trp
1               5                   10

<210> SEQ ID NO 19
<211> LENGTH: 12
<212> TYPE: PRT
<213> ORGANISM: Artificial sequence
<220> FEATURE:
<223> OTHER INFORMATION: Synthetic peptide

<400> SEQUENCE: 19

Leu Phe Ser Pro Asn Gly Pro Ile Ala Arg Ala Trp
1               5                   10

<210> SEQ ID NO 20
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (2)..(2)
<223> OTHER INFORMATION: D-amino acid

<400> SEQUENCE: 20

Thr Asn Tyr Leu Phe Ser Pro Asn Gly Pro Ile Ala Arg Ala Trp
1               5                   10                  15

<210> SEQ ID NO 21
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (10)..(10)
<223> OTHER INFORMATION: D-amino acid

<400> SEQUENCE: 21

Thr Asn Tyr Leu Phe Ser Pro Asn Gly Pro Ile Ala Arg Ala Trp
1               5                   10                  15

<210> SEQ ID NO 22

```
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (11)..(11)
<223> OTHER INFORMATION: D-amino acid

<400> SEQUENCE: 22

Thr Asn Tyr Leu Phe Ser Pro Asn Gly Pro Ile Ala Arg Ala Trp
1               5                   10                  15

<210> SEQ ID NO 23
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (14)..(14)
<223> OTHER INFORMATION: D-amino acid

<400> SEQUENCE: 23

Thr Asn Tyr Leu Phe Ser Pro Asn Gly Pro Ile Ala Arg Ala Trp
1               5                   10                  15

<210> SEQ ID NO 24
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (15)..(15)
<223> OTHER INFORMATION: D-amino acid

<400> SEQUENCE: 24

Thr Asn Tyr Leu Phe Ser Pro Asn Gly Pro Ile Ala Arg Ala Trp
1               5                   10                  15

<210> SEQ ID NO 25
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
<222> LOCATION: (7)..(7)
<223> OTHER INFORMATION: D-amino acid
<220> FEATURE:
<221> NAME/KEY: MISC_FEATURE
<222> LOCATION: (10)..(10)
<223> OTHER INFORMATION: D-amino acid

<400> SEQUENCE: 25

Thr Asn Tyr Leu Phe Ser Pro Asn Gly Pro Ile Ala Arg Ala Trp
1               5                   10                  15

<210> SEQ ID NO 26
<211> LENGTH: 15
<212> TYPE: PRT
<213> ORGANISM: Artificial sequence
<220> FEATURE:
<223> OTHER INFORMATION: Synthetic peptide
<220> FEATURE:
<221> NAME/KEY: MISC_FEATURE
```

```
<222> LOCATION: (12)..(12)
<223> OTHER INFORMATION: D-amino acid
<220> FEATURE:
<221> NAME/KEY: MISC_FEATURE
<222> LOCATION: (14)..(14)
<223> OTHER INFORMATION: D-amino acid

<400> SEQUENCE: 26

Thr Asn Tyr Leu Phe Ser Pro Asn Gly Pro Ile Ala Arg Ala Trp
1               5                   10                  15
```

THERAPEUTIC PEPTIDES

This application is a national phase application under 35 U.S.C. § 371 of International Application No. PCT/US2020/032074, filed May 8, 2020, which claims the benefit of U.S. Provisional Patent Application No. 62/844,986, filed May 8, 2019, the entirety of each of which is incorporated herein by reference.

This invention was made with government support under grant number CA217685 awarded by the National Institutes of Health. The government has certain rights in the invention.

BACKGROUND OF THE INVENTION

1. Field of the Invention

The present invention relates generally to the field of molecular biology and medicine. More particularly, it concerns therapeutic non-natural peptides that can be used to image and/or treat cancers and other diseases.

2. Description of Related Art

Cancer continues to be a significant clinical problem. The tyrosine kinase receptor EphB4 is frequently overexpressed in ovarian, breast, and other solid tumors and is involved in interactions between tumor cells and tumor microenvironment, contributing to metastasis. Trans-interaction between EphB4 and its membrane-bound ligand ephrin B2 (EFNB2) mediates bi-directional signaling: forward EFNB2-to-EphB4 signaling suppresses tumor cell proliferation, while reverse EphB4-to-EFNB2 signaling stimulates invasive and angiogenic properties of endothelial cells.

Efforts have been made to produce modulators of EphB4 signaling to treat cancers. For example, previous work reported the use of monoclonal antibodies, soluble fusion proteins, and small-molecule kinase inhibitors to inhibit the reverse EphB4-to-EFNB2 signaling, which promotes angiogenesis (Kertesz et al., 2006; Abéngozar et al., 2012; Stephenson et al., 2015; Martiny-Baron et al., 2004). However, no small-molecule-based, dual-function, EphB4-binding peptides are currently available. Clearly, there is a need for new therapies for the treatment of cancer.

SUMMARY OF THE INVENTION

The present invention, in some aspects, overcomes limitations in the prior art by providing new therapeutic peptides that may be used, e.g., for the treatment of cancers. In some aspects, a non-natural peptide referred to as a bi-directional ephrin agonist peptide, BIDEN-AP (TN(dY)LFSPNGPIARAW; SEQ ID NO: 1)), is provided herein. As shown in the below examples, BIDEN-AP was selectively internalized via receptor-mediated endocytosis and suppressed invasion and EMT of ovarian cancer cells. BIDEN-AP also inhibited endothelial migration and tube formation. In vivo, BIDEN-AP and its nano-conjugate CCPM-BIDEN-AP significantly reduced growth of orthotopic ovarian tumors, with CCPM-BIDEN-AP displaying greater anti-tumor potency than BIDEN-AP. Both BIDEN-AP and CCPM-BIDEN-AP compromised angiogenesis by downregulating EMT and angiogenic pathways. The therapeutic peptide (e.g., BIDEN-AP) may be comprised in a larger peptide or polypeptide, expressed as a fusion protein, conjugated to a nanocarrier, or conjugated to a cytotoxic drug, e.g., for targeted delivery of a therapeutic payload to cancerous cells that express or overexpressing EphB4. Since therapeutic peptides disclosed herein (e.g., BIDEN-AP) based agents can be internalized by tumor cells, therapeutic payloads carried by the therapeutic peptide can be used to increase cellular uptake of the payload into the intracellular space. The therapeutic peptides described herein may optionally be comprised in liposomes or nanoparticles and used to treat a variety of cancers such as, e.g., ovarian cancers and caners that express or overexpress EphB4.

An aspect of the present invention relates to a non-natural peptide comprising the sequence TNd(Y)LFSPNGPIARAW (SEQ ID NO: 1) or a sequence or a sequence that has 1, 2, 3, or 4 amino acid substitutions relative to SEQ ID NO:1 and retains the D-amino acid at position 3 of SEQ ID NO:1. The peptide may be comprised in micelles, nanoparticles, or liposomes. In some embodiments, the micelles are core-crosslinked polymeric micelles (CCPM). The peptide may be contained in or covalently bound to the micelles, nanoparticles, liposomes, or preferably CCPM. In some embodiments, the peptide is covalently bound via a maleiimide bond or by reacting the micelles, nanoparticles, or liposomes and the peptide with N-(γ-maleimidobutyry-loxy)-succinimide ester) (GMBS). The micelles, nanoparticles, or liposomes may have a diameter from about 15 nm to about 300, about 15 nm to about 200, about 15 nm to about 100, from about 20 nm to about 70 nm, from about 15 nm to about 50 nm, about 20 nm to about 70 nm, about 20 nm to about 60 nm, or from about 20 nm to about 30 nm, or any range disclosed herein. The micelles, nanoparticles, or liposomes may comprise polyethylene glycol (PEG), polyethylene glycol monomethyl ether (mPEG), methoxy-poly(ethylene glycol)-block-poly(D, L-lactide), poly(ethylene glycol)-block-poly(aspartate), poly(ethylene glycol)-b-poly(methacrylic acid), an amine-terminated amphiphilic block copolymer, poly(PEG-methacrylate)-b-poly(triethoxysilyl propylmethacrylate), or poly(ethylene glycol)-block-poly(glutamate). The micelles, nanoparticles, or liposomes may further comprise a chemotherapeutic, an anti-angiogenic agent, or an immunotherapy. In some embodiments, the micelles, nanoparticles, or liposomes comprise an imaging agent. In some embodiments, the imaging agent is a fluorophore or a radioisotope. In some embodiments, the micelles are core-crosslinked polymeric micelles (CCPM) and wherein the micelles are labelled with a fluorophore, preferably a near-infrared fluorophore. In some embodiments, the micelles are core-crosslinked polymeric micelles (CCPM) and wherein the micelles are labelled with both a fluorophore, preferably a near-infrared fluorophore, and a radioisotope, preferably $^{111}$In, $^{99m}$Tc, $^{64}$Cu, or $^{89}$Zr. The peptide may be conjugated to or covalently attached to a cytotoxic moiety or a drug moiety. The cytotoxic moiety may be a chemotherapeutic or a cytotoxic polypeptide. In some embodiments, the cytotoxic moiety is a maytansinoid, an auristatin, a taxoid, a calicheamicin, a CC-1065 analog, a duocarmycin, a protein toxin (such for example a Pseudomonas exotoxin or diphtheria toxin), or an amatoxin. The peptide may be conjugated to a radionuclide, e.g., with or without conjugating the peptide to a chelator or a radiometal chelator. In some embodiments, the peptide is not covalently attached to a chelator. In some embodiments, the peptide is covalently attached to a radiometal chelator such as, e.g., 1,4,7-triazacyclononane-1,4,7-triacetic acid (NOTA), 1,4,7,10-tetraazacyclododecane-1,4,7,10-tetraacetic acid (DOTA), diethylenetriaminepentaacetic anhydride (DTPA), 1,4,8,11-tetraazacyclotetradecane-1,4,8,11-tetraacetic acid (TETA), a 1,4,7-triazacyclononane macrocycle substituted with a phosphonic (NOTP) or phosphinic (TRAP) group, bis(2-hydroxybenzyl)ethylenediaminediacetic acid (HBED), 4,11-bis(carboxymethyl)-1,4,8,11-tetraazabicyclo[6.6.2]hexadecane (CB-TE2A), or desferrioxamine-B (DFO). In some embodiments, the radionuclide is $^{90}$Y, $^{86}$Y, $^{111}$In, $^{67}$Ga, $^{68}$Ga, $^{89}$Zr, $^{64}$Cu, $^{67}$Cu, $^{177}$Lu, $^{188}$Re, $^{186}$Re, $^{153}$Sm, $^{89}$Sr, $^{186}$Er, $^{47}$Sc, $^{223}$Ra, $^{166}$Ho, $^{161}$Tb, $^{149}$Tb, $^{212}$Pb/$^{212}$Bi, $^{225}$Ac, $^{213}$Bi, $^{211}$At, $^{17m}$Sn, $^{123}$I, $^{131}$I or $^{18}$F. In some embodiments, a linker separates the peptide from the cytotoxic payload. The linker may be a cleavable linker or anon-cleavable linker. In some embodiments, the peptide is conjugated to or covalently attached to a cell targeting moiety. The cell targeting moiety may comprise or consists of an antibody, a scfv, or a targeting ligand. In some embodiments, the peptide is conjugated to or covalently attached to an imaging agent. In some embodiments, the imaging agent is a fluorescent dye, a fluorescent protein, or an enzyme conjugate. The peptide may be conjugated to or covalently attached to a linker, such as, e.g., a cleavable linker. In some embodiments, the peptide is conjugated to a drug payload. In some embodiments, the drug payload is an auristatin, maytansinoid, tubulysin, calicheamicin, duocarmycin, benzodiazepine, camptothecin analogue, doxorubicin, non-clinical-stage cytotoxic payload, or combination thereof. The peptide may be comprised in a peptide homodimer, a peptide homotrimer, a peptide homotetramer, a peptide heterodimer, a peptide heterotrimer, a peptide heterotetramer, or a peptide multimer (e.g., a homomultimer or a heteromultimer). In some embodiments, the peptide is comprised in a pharmaceutical composition. The pharmaceutical composition may be formulated for injection, parenteral administration, subcutaneous injection, intravenous administration, or intraperitoneal injection.

Another aspect of the present invention relates to a method of treating a cancer in a mammalian subject comprising administering to the subject a therapeutically relevant amount of a peptide of the present embodiments or as described herein or above. In some embodiments, the cancer is an ovarian cancer, breast cancer, colorectal cancer, leukemia, pancreatic cancer, head and neck cancer, a metastatic cancer, esophageal cancer, or lung cancer. In some embodiments, the subject is a human. The peptide may be comprised in a pharmaceutical composition. In some embodiments, the pharmaceutical composition is administered intravenously, parenterally, intratumorally, intraarterially, or intraperitoneally. The method may further comprise administering a second anti-cancer therapy to the subject. The second anti-cancer therapy may be a chemotherapeutic, an immunotherapy, an anti-angiogenic therapy, a radiotherapy, or a surgery. In some embodiments, the second anti-cancer therapy is an anti-VEGF therapy, a checkpoint inhibitor, or an antiangiogenic agent.

Yet another aspect of the present invention relates to a peptide of the present embodiments or as described above for the treatment of a cancer in a mammalian subject, preferably a human. In some embodiments, the cancer is an ovarian cancer, breast cancer, colorectal cancer, leukemia, pancreatic cancer, head and neck cancer, a metastatic cancer, esophageal cancer, or lung cancer.

Another aspect of the present invention relates to a peptide of the present embodiments or as described above for the treatment of a heart disease in a mammalian subject. Yet another aspect of the present invention relates to a peptide of the present embodiments or as described above for the treatment of a bone disease in a mammalian subject.

Another aspect of the present invention relates to a method of treating a heart disease in a mammalian subject comprising administering to the subject a therapeutically relevant amount of a peptide of the present embodiments or as described above. In some embodiments, the heart disease is an ischemic heart disease. In some embodiments, the subject is a human.

Yet another aspect of the present invention relates to a method of treating a bone disease or promoting bone healing or bone remodeling in a mammalian subject comprising administering to the subject a therapeutically relevant amount of a peptide of the present embodiments or as described herein or above. In some embodiments, the subject is a human.

The term "therapeutic peptide" or "diagnostic peptide" as used herein refers to an amino acid sequence comprising or consisting of TN(dY)LFSPNGPIARAW (SEQ ID NO:1), or a sequence that has 1, 2, or 3 amino acid substitutions relative to SEQ ID NO:1 and retains the D-amino acid at position 3 of SEQ ID NO: 1. The therapeutic peptide may be comprised in a therapeutic or non-natural polypeptide. In some embodiments, the therapeutic peptide is covalently attached to or expressed as a fusion protein with a cell penetrating peptide (CPP), an antibody, a targeting moiety, toxin, scFv, or other amino acid sequence. In some embodiments, the therapeutic peptide is comprised in a peptide that is less than or equal to 50, 45, 44, 43, 42, 41, 40, 39, 38, 37, 36, 35, 34, 33, 32, 31, 30, 29, 28, 27, 26, 25, 24, 23, 22, 21, 20, 19, 18, 17, or 16 amino acids in length. Therapeutic peptides can include natural and non-natural amino acids. In some embodiments, the therapeutic peptide may comprise one or more chemical modification to resist degradation or prolong pharmacokinetic effects in vivo.

In some embodiments, the therapeutic peptide (e.g., SEQ ID NO: 1) may be conjugated to or covalently bound to an imaging agent or label, such as a fluorescent label. A variety of labels may be used including, e.g., fluorescent dyes (e.g., Texas Red, rhodamine, aminomethylcoumarin (AMCA), FITC, Cy3, Cy5, Cy5.5, Cy7, IRDyes, DyLight™ dyes, Alexa Flour™ dyes), fluorescent proteins (e.g., green fluorescent protein (GFP), yellow fluorescent protein (YFP), blue fluorescent protein (BFP), cyan fluorescent protein (CFP), allophycocyanin (APC), B-Phycoerythrin (BPE), R-Phycoerythrin (R-PE), PerCP, or R-Phycocyanin (RPC)), and/or enzyme conjugates (e.g., alkaline phosphatase (AP), glucose oxidase (GOx), or horseradish peroxidase (HRP)). If desired, the protein can be labelled with a radioactive isotope, such as $^{3}$H- or $^{14}$C-methyl groups. In some embodiments, the therapeutic peptide is covalently attached to a nano-carriers including but not limited to core-crosslinked polymeric micelles (CCPM), and the nano-carrier can be labelled with a fluorescent dye and/or a radionuclide such as, e.g., Indium-111 ($^{111}$In), $^{64}$Cu, or $^{89}$Zr.

In a further embodiment there is provided a therapeutic peptide (e.g., comprising or consisting of SEQ ID NO: 1), wherein the therapeutic peptide is conjugated to or fused with a cell-targeting moiety. For example, the therapeutic polypeptide can be conjugated to a cell-targeting moiety by a thioester linkage (e.g., using a Cys residue comprised in the peptide or polypeptide, or positioned terminally to the therapeutic protein coding sequence). In some aspects, the cell-binding moiety is covalently attached to a therapeutic peptide (e.g., comprising SEQ ID NO:1). In some embodiments, a cell-targeting moiety can bind to a protein, carbohydrate or lipid expressed on a cell (e.g., specifically or preferentially expressed on a cancer cell). Examples of cell-targeting moieties are further detailed and exemplified below and include, without limitation, moieties that bind to GP240, 5T4, HER1, HER2, CD-33, CD-38, VEGFR-1, VEGFR-2, CEA, FGFR3, IGFBP2, IGF-1R, BAFF-R, TACI, APRIL, Fn14 or HER3.

In yet further aspects, a therapeutic peptide, optionally attached to a cell-targeting construct, is further conjugated to an imaging agent. For example, the imaging agent can be a radionuclide, a MRI contrast agent or an ultrasound contrast agent. Thus, in some aspects, a method is provided for imaging target cells in a subject comprising administering a cell-targeting construct conjugated to an imaging agent to the subject and imaging the target cells in the subject.

It will be understood that in certain cases, a fusion protein may comprise additional amino acids positioned between the therapeutic peptide and another therapeutic peptide or polypeptide. In general, these sequences are interchangeably termed "linker sequences" or "linker regions." One of skill in the art will recognize that linker regions may be one or more amino acids in length and often comprise one or more glycine residue(s) which confer flexibility to the linker. In some specific examples, linkers for use in the current embodiments include, without limitation, the 218 (GST-SGSGKPGSGEGSTKG; SEQ ID NO: 2), the HL (EAAAK; SEQ ID NO: 3) SSG and the $G_4S$ (GGGGS; SEQ ID NO:4) linkers. Such linker sequences can be repeated 1, 2, 3, 4, 5, 6, or more times or combined with one or more different linkers to form an array of linker sequences. For instance, in some applications, a linker region may comprise a protease cleavage site, such as the cleavage site recognized by an endogenous intracellular protease. In this case when the cell targeting construct is internalized into a target cell proteolytic cleavage can separate the therapeutic peptide from a cell targeting moiety and/or other polypeptide domains. As such, cell targeting constructs according to this embodiment may have the advantage of enhanced intracellular activity of the targeted therapeutic peptide since potential interference from the cell targeting polypeptide will be reduced.

In some embodiments, additional amino acids are attached to the therapeutic peptide. For example, additional amino acids may be included to aid production or purification. Some specific examples of amino acid sequences that may be attached include, but are not limited to, purification tags (e.g., a T7, MBP. GST, HA, or polyHis tag), proteolytic cleavage sites, such as a thrombin or furin cleavage site, intracellular localization signals or secretion signals.

If desired, the therapeutic peptide of the embodiments can be covalently attached to a cell-penetrating peptide (CPP). As used herein the terms CPP and membrane translocation peptide (MTP) as used interchangeably to refer to peptide sequences that enhance the ability of a protein to be internalized by a cell. Examples for CPPs for use according to the embodiments include, without limitation, peptide segments derived from HIV Tat, herpes virus VP22, the *Drosophila* Antennapedia homeobox gene product, protegrin I, as well as the T1, T2, INF7 and 26 peptides. In certain aspects a CPP is separated from the therapeutic peptide (e.g., SEQ ID NO: 1) by a linker sequence. In some embodiments, the therapeutic peptide is covalently attached to both a cell-targeting moiety and a CPP.

The therapeutic peptide may be covalently attached to an additional anti-cancer compound or polypeptide. For example, it is anticipated that various anti-tumor or chemotherapeutic compounds may be covalently attached to the therapeutic peptide. In this way, the interaction of the therapeutic peptide (e.g., SEQ ID NO: 1) with EphB4 may bring the additional anti-cancer compound or polypeptide into closer proximity with a cell population (e.g., cancerous cells), such that the additional anti-cancer compound (e.g., a radioactive compound or chemotherapeutic) or polypeptide can exert additional clinical benefit.

In some embodiments, a therapeutic peptide of the embodiments is comprised in liposomes or nanoparticles. The liposomes may be unilamellar, multilamellar, or multivesicular. In some embodiments, the liposomes comprise poly-ethylene glycol (PEG) in the composition (e.g., stealth liposomes). In some embodiments, the liposomes can antibodies to target the liposomes to a particular cell, or cancer cell, population (e.g., Sofou et al., 2008). In some embodiments, the therapeutic peptide is included in a liposomal formulation or nanoparticle formulation in order to direct the liposomes to selectively target cells that express EphB4. In some embodiments, a therapeutic peptide is comprised in a polymeric micelle, a core-crosslinked polymeric micelle, a core-shell-nanohydrogel, or a polymersome (e.g., Talelli et al., 2015).

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is preferably below 0.01%. Most preferred is a composition in which no amount of the specified component can be detected with standard analytical methods.

As used herein the specification, "a" or "an" may mean one or more. As used herein in the claim(s), when used in conjunction with the word "comprising", the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

Throughout this application, the term "about" is used to indicate that a value includes the inherent variation of error for the device, the method being employed to determine the value, or the variation that exists among the study subjects.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

(FIG. 1A) Structure of BIDEN-AP. D-Tyr-P3 is highlighted in red. (FIG. 1B) SPR sensorgrams of BIDEN-AP. Vertical axes, in response units (RU), represent binding of the peptide to immobilized EphB4. (FIG. 1C) Competition of BIDEN-AP with EFNB2-Fc for EphB4 binding. BIDEN-AP at concentrations from 2 nM to 1000 nM was mixed with human EphB4 (30 nM) and injected onto sensor chips coated with EFNB2-Fc. (FIG. 1D) Competition of BIDEN-AP with EFNB2-Fc for EphB4 binding at the cellular level. A2780cp20 cells were co-incubated with EFNB2-Fc (20 nM) and BIDEN-AP (at concentrations from 0 to 100 μM) at 25° C. for 1 h. EFNB2-Fc bound to the cells was probed with phycoerythrin-labeled anti-Fc antibody and analyzed by flow cytometry.

(FIG. 2A) BIDEN-AP induced phosphorylation of EphB4 and the associated MAPK14 (Crk1). After 16 h serum starvation, A2780cp20 cells were incubated with EFNB2-Fc (20 nM), TNYL-RAW (SEQ ID NO: 12) (50 μM), or BIDEN-AP (50 μM) for 30 min or 2 h. The uncropped blots were available at Supplemental FIG. 11. (FIG. 2B) BIDEN-AP inhibited A2780cp20 cell invasion compared to untreated control (CTL). A modified Boyden transwell chamber coated with human defined matrigel was used. Experiments were performed in triplicate. Data are presented as mean±SD. ***$p<0.001$. (FIG. 2C) Alexa647-BIDEN-AP was internalized via receptor-mediated endocytosis. A2780cp20 cells were incubated at 37° C. with Alexa647-BIDEN-AP (0.05 μM), Alexa647-TNYL-RAW (SEQ ID NO: 12) (0.05 μM), or Alexa647-BIDEN-AP (0.05 μM) plus unlabeled TNYL-RAW (SEQ ID NO: 12) (5 μM, blocking). Alexa647-BIDEN-AP but not Alexa647-TNYL-RAW (SEQ ID NO: 12) was internalized into the A2780cp20 cells.

FIGS. 3A-C: Synthesis and characterization of CCPM-BIDEN-AP nano-conjugate. (FIG. 3A) Reaction scheme for the synthesis of CCPM-BIDEN-AP. (FIG. 3B) SPR sensorgrams showing high-avidity binding of CCPM-BIDEN-AP to rhEphB4-coated sensor chips. Unconjugated CCPM was used as a control. In both cases, CCPM was used at concentrations corresponding to equivalent BIDEN-AP concentrations in CCPM-BIDEN-AP ranging from 0.16 nM to 20 nM. Duplicates were run for each concentration. RU, response units. (FIG. 3C) TEM of CCPM-BIDEN-AP. The average size of the nanoparticles was 24±3 nm.

FIGS. 4A-D: BIDEN-AP-based agents inhibit microtubule formation and sensitizes resistant endothelial cells to anti-VEGF antibody. (FIG. 4A, FIG. 4B) Microtubule formation in RF24 cells treated with EFNB2-Fc (2 nM) or BIDEN-AP (15 μM) compared to untreated controls (CTL). Five images per well were taken at ×100 magnification. Each condition was performed in triplicate; data are expressed as mean±SD. *$p<0.05$, **$p<0.01$ compared to control. (FIG. 4C, FIG. 4D) BIDEN-AP and CCPM-BIDEN-AP induced cell death in bevacizumab (Bev)-resistant RF24 cells. Representative plots from flow cytometry analysis with SYTOX-green are shown. Numbers of SYTOX-negative live Bev-resistant RF24 cells were significantly reduced after treatment with BIDEN-AP or CCPM-BIDEN-AP compared to Bev. Data are presented as mean±SD (n=6). *$p<0.05$, **$p<0.01$.

FIG. 5: Potent anti-tumor activities of BIDEN-AP and CCPM-BIDEN-AP in orthotopic ovarian cancer model. (FIG. 5A) Schema for in vivo orthotopic A2789cp20-Luc model and treatment. Female nude mice were intraperitoneally (i.p.) inoculated with A2789cp20-Luc tumor cells. Beginning on day 7 after inoculation, each mouse received 10 intraperitoneal injections of BIDEN-AP or CCPM-BIDEN-AP (bold arrows) at a dose 13 mg/kg/injection every other day for a total of 10 doses. Tumor growth was monitored by bioluminescence imaging (IVIS). (FIGS. 5B-C) Representative bioluminescence images on day 28 after tumor cell inoculation (FIG. 5B) and corresponding quantification of signal intensity (FIG. 5C) of mice bearing orthotopic A2780cp20-Luc tumors (n=4). (FIGS. 5D-E) Tumor weight (FIG. 5D) and number of tumor nodules (FIG. 5E) per treatment group (n=8). Data are expressed as mean±SD. *$p<0.05$, $p<0.01$, **$p<0.0001$. CTL, untreated control.

FIGS. 6A-E: BIDEN-AP and CCPM-BIDEN-AP induce endothelial apoptosis, compromise angiogenesis, and reduce tumor cell proliferation. (FIG. 6A) Representative immunofluorescence images of tumor sections stained for CD31 (red) and TUNEL (green). Nuclei were counterstained with Hoechst (blue). Higher magnification images (bottom row) show double-stained apoptotic endothelial cells. Scale bars, 20 μm. (FIGS. 6B-C) Microvessel density (MVD) (FIG. 6B) and apoptotic (TUNEL-positive) cell counts as a percentage of the total number of cells (FIG. 6C). (FIG. 6D) Microphotographs of representative hematoxylin and eosin (H&E)- and Ki67-stained sections from each treatment group. (FIG. 6E) Ki67-positive cells as a percentage of the total number of cells. Data are derived from 10 high-power fields from three tumors and expressed as mean±SD. *$p<0.05$ compared to untreated control (CTL).

FIGS. 7A-D: Inhibition of EMT signaling by BIDEN-AP-based agents. (FIG. 7A) qRT-PCR validation of expression of relative mRNA levels of EMT core transcription factors Twist and Snail1 and EMT effector vimentin in A2789cp20-Luc tumors from untreated control (CTL) and BIDEN-AP-treated mice. Samples for qRT-PCR were collected from three individual tumors from each group. *$p<0.05$, $p<0.01$, *$p<0.001$. (FIG. 7B) Microphotographs of representative vimentin-stained tumors from an untreated mouse and a BIDEN-AP-treated mouse. (FIG. 7C) Heatmap of selected factors that were most significantly regulated by BIDEN-AP. Data were obtained from reverse-phase protein array of A2780cp20-Luc tumors from untreated mice (control) and BIDEN-AP-treated mice. (FIG. 7D) Proposed mechanism of action of BIDEN-AP.

FIGS. 8A-D: Antitumor activity against an ovarian cancer PDX model. (FIG. 8A) Tumor growth curve. (FIG. 8B) Scatter plot of tumor weight at the end of a 28-day study. Data are expressed as mean±standard deviation. (FIG. 8C) Representative immunofluorescence photomicrographs of EphB4- and CD31-stained tumor slices showing EphB4 expression in both tumor cells and tumor vessels. (FIG. 8D) Representative immunofluorescence photomicrographs of Ki67-stained tumor slices showing reduced tumor proliferation with BIDEN-AP treatments. The fluorescence intensity of Ki67 staining is expressed as mean±standard deviation of 10 random fields of view. Magnification of the original slides: ×200. Scale bar, 50 μm. ***$p<0.001$.

NYLFSPNGPIARAW=SEQ ID NO: 17; YLFSPNGPIARAW=SEQ ID NO: 18; LFSPNGPIARAW=SEQ ID NO: 19)

Figure 11:
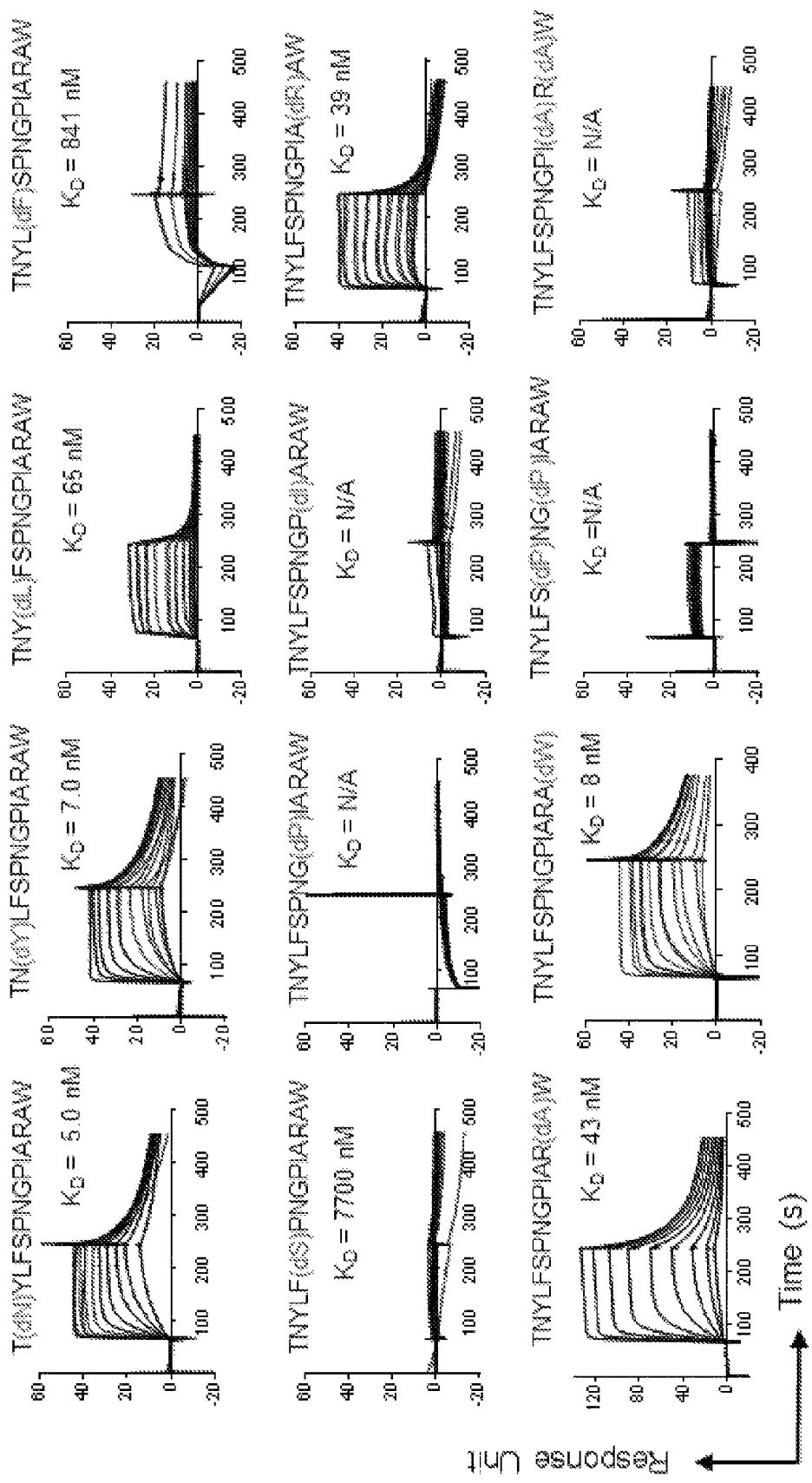

FIG. 11: BIACore sensorgrams of binding of selected D-substituted TNYL-RAW (SEQ ID NO: 12) peptides to immobilized rhEphB4. Peptides in concentrations of 1.6 nM to 800 nM were injected over the rhEphB4 sensor chips, and the magnitude of peptide binding to immobilized EphB4 in response units (RU) was recorded. (T(dN) YLFSPNGPIARAW=SEQ ID NO: 20; TN(dY) LFSPNGPIARAW=SEQ ID NO: 1; TNY(dL) FSPNGPIARAW=SEQ ID NO: 8; TNYL(dF) SPNGPIARAW=SEQ ID NO: 9; TNYLF(dS) PNGPIARAW=SEQ ID NO: 10; TNYLFSPNG(dP) IARAW=SEQ ID NO: 21; TNYLFSPNGP(dI)ARAW=SEQ ID NO: 22; TNYLFSPNGPIA(dR)AW=SEQ ID NO: 6; TNYLFSPNGPIAR(dA)W=SEQ ID NO: 23; TNYLF-SPNGPIARA(dW)=SEQ ID NO: 24; TNYLFS(dP)NG(dP) IARAW=SEQ ID NO: 25; TNYLFSPNGPI(dA)R(dA) W=SEQ ID NO: 26)

Figure 12:
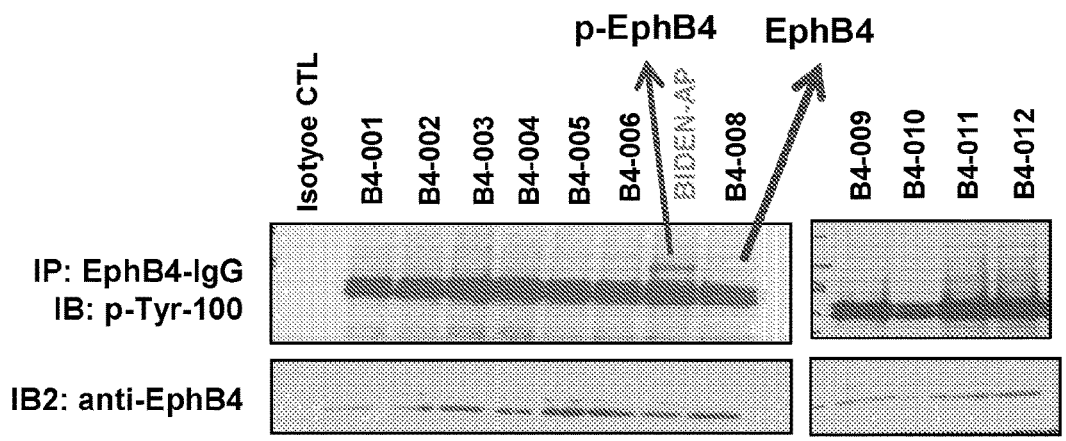

FIG. 12: BIDEN-AP induces EphB4 phosphorylation. HeyA8 ovarian cancer cells were grown to 75% confluence in 6-well plates. Cells were washed and incubated with serum-deprived medium for 12 h. Cells were then treated for 12 h with each test compound at a concentration of 50 nM in complete medium. Cell lysates were subjected to immunoprecipitation (IP) using 10 µL (5 µg) mouse anti-EphB4 receptor antibody and 18 µL protein G beads. After resolving with 4-20% Nu-PAGE gel, the immunoblotting were performed with anti-phosphorylated Tyrosine and anti-EphB4 antibodies. Mouse IgG was included as an isotype control for immunoprecipitation. The uncropped blots were available at Supplemental FIG. 11.

Figure 13:
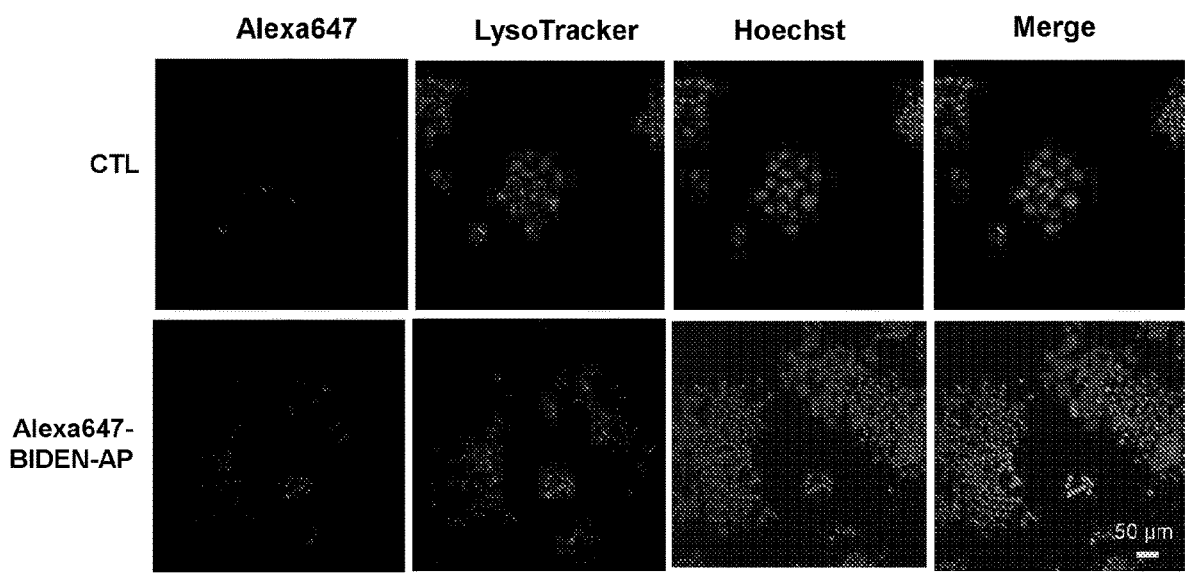

FIG. 13: Alexa647-BIDEN-AP was not internalized in ovarian cancer cells at 4° C. A2780cp20 cells were incubated at 4° C. with Alexa647-BIDEN-AP (0.05 µM). The compound was not taken up by the tumor cells at low temperature, suggesting an energy-dependent receptor-mediated endocytic process for Alexa647-BIDEN-AP.

Figure 14A:
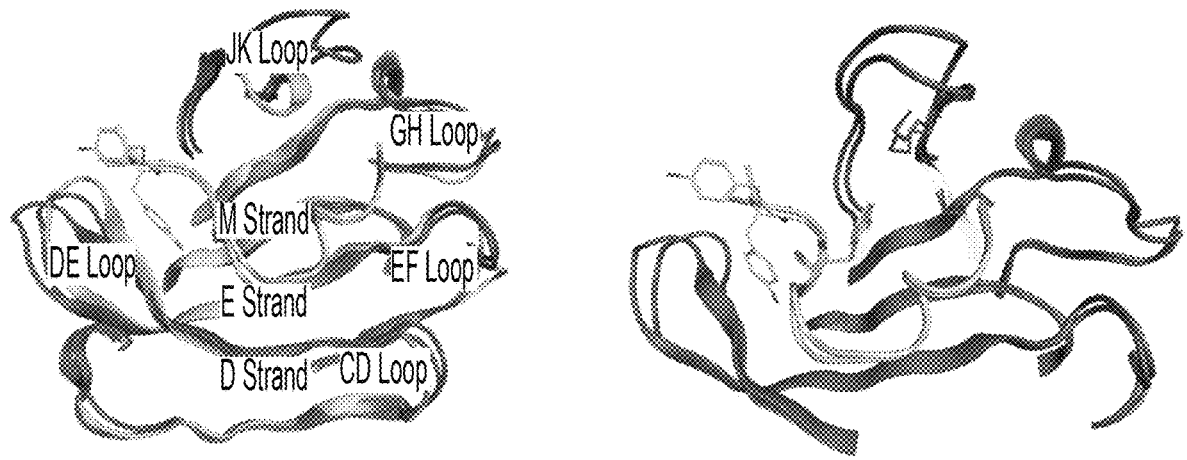
Figure 14B:
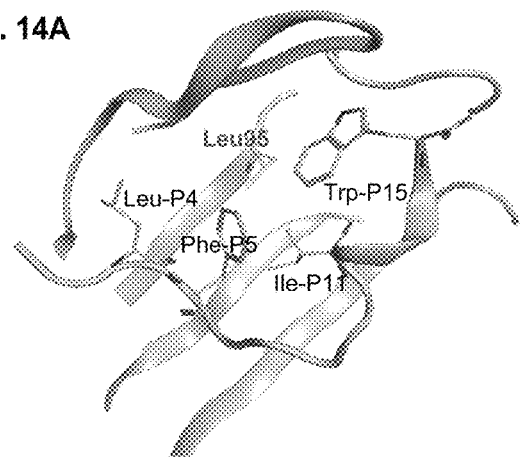

FIGS. 14A-B: Superimposition of EphB4 structures. (FIG. 14A) The green ribbon shows EphB4 conformation in the presence of the natural ligand EFNB2 (PDB:2HLE), the red ribbon shows conformation with antagonist (PDB: 2BBA), and the blue ribbon shows modeled EphB4 conformation bound to BIDEN-AP. Antagonist peptide TNYLA-RAW (SEQ ID NO: 14) is shown in light pink and BIDEN-AP in the teal color. (FIG. 14B) TNYL-RAW (SEQ ID NO: 12) and BIDEN-AP interactions with EphB4. Leu95 of EphB4 could accommodate both peptides through hydrophobic interactions with Leu-P4, Phe-P5, Ile-P11, and Trp-P15. Other EphB receptors would generate steric clash with both peptides and thus would not bind these peptides.

Figure 15:
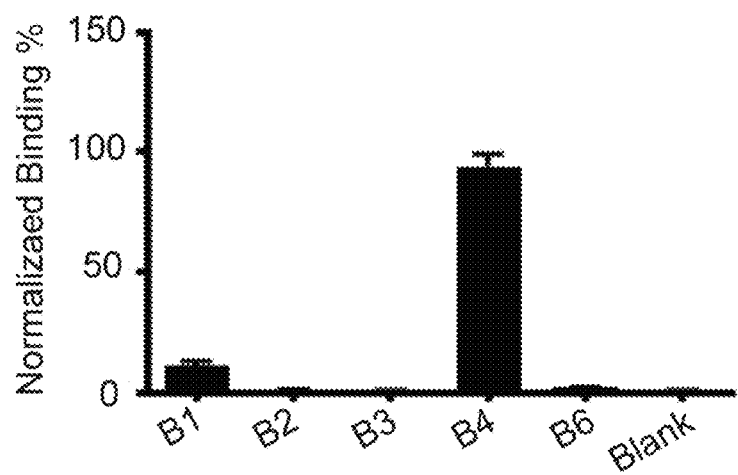

FIG. 15: ELISA binding assay to EphB class receptors. BIDEN-AP selectively bound to EphB4 but not other members in the EphB receptor family. Data are expressed as mean±SD (n=3).

FIGS. 16A-B: Both BIDEN-AP and CCPM-BIDEN-AP activate EphB4 and the associated Crk1 in human ovarian cancer cells or lysates from orthotopic ovarian tumors (FIG. 16A) A2780cp20 cells were incubated with BIDEN-AP (50 nM), CCPM-BIDEN-AP (50 nM equivalent concentration to BIDEN-AP), or TNYL-RAW (SEQ ID NO: 12) (50 nM) for 24 h after the cells had been cultured in serum-free medium for 16 h. Total protein lysates were harvested and subjected to Nupage-SDS separation followed by immuno-blotting. (FIG. 16B) Immunoprecipitation and immunoblotting for analyzing phosphorylated EphB4 and Crk1 levels in orthotopic A2780cp20 tumors in mice treated with BIDEN-AP or CCPM-BIDEN-AP. CTL, untreated control. The uncropped blots were available at Supplemental FIG. 11.

Figure 17:
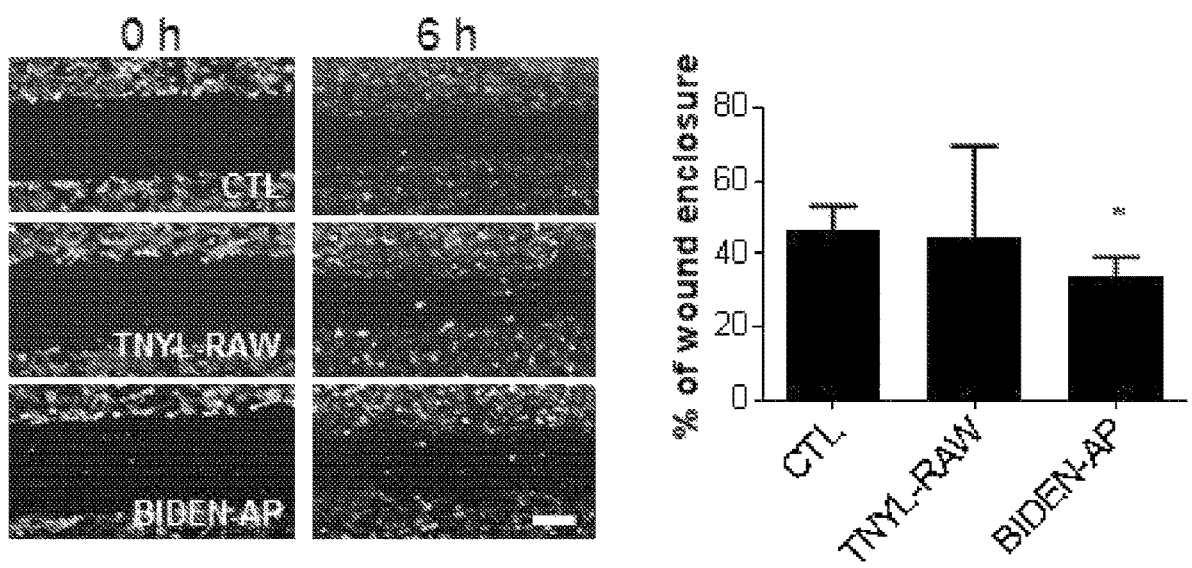

FIG. 17: BIDEN-AP inhibits migration ability of endothelial cells. RF24 cells were treated with BIDEN-AP (50 µM) or TNYL-RAW (SEQ ID NO: 12) (50 µM), and subjected to a scratch assay to access cell migration. Scale bar, 200 µm. Mean wound closure was determined for each group. CTL, untreated control. *p<0.05 (compared to CTL; n=7).

Figure 18:
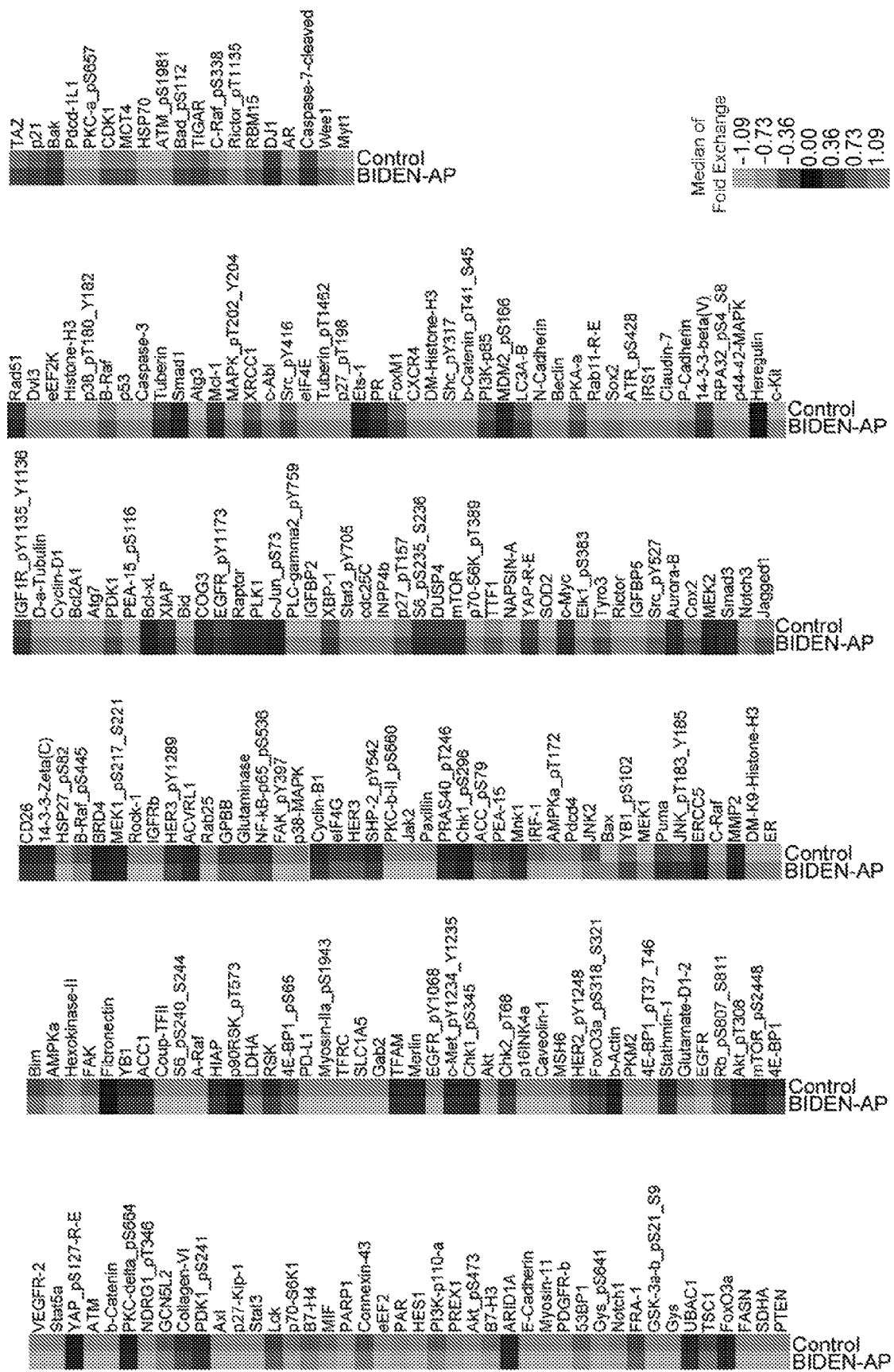

FIG. 18: Heatmap representing 263 array spots obtained from reverse-phase protein array. Three individual A2780cp20-Luc tumors from untreated mice (control) and BIDEN-AP-treated mice (BIDEN-AP) were used in the analysis. The median of the expression fold-change from three individual replica in each condition was plotted in this heatmap.

FIGS. 19A-B: Antitumor activity of BIDEN-AP against a subcutaneously implanted ovarian cancer PDX model. (FIG. 10A) Photographs of excised tumors at the end of a 28-day study period. (FIG. 10B) Body weight change over the course of the study. Data are expressed as mean±standard deviation.

Figure 20:
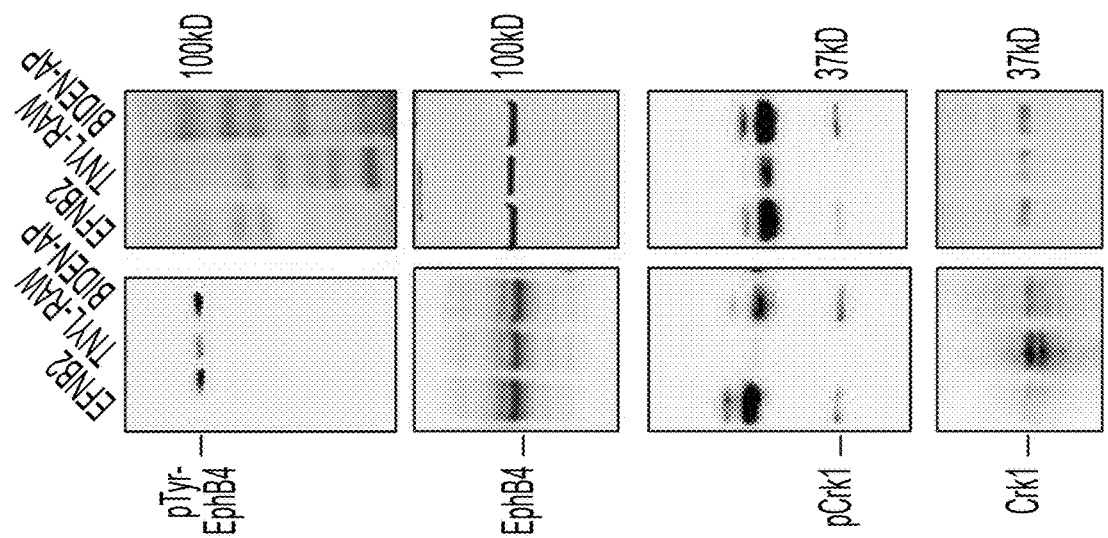

FIG. 20: Original western blot data. (TNYL-RAW (SEQ ID NO: 12))

Figure 21:
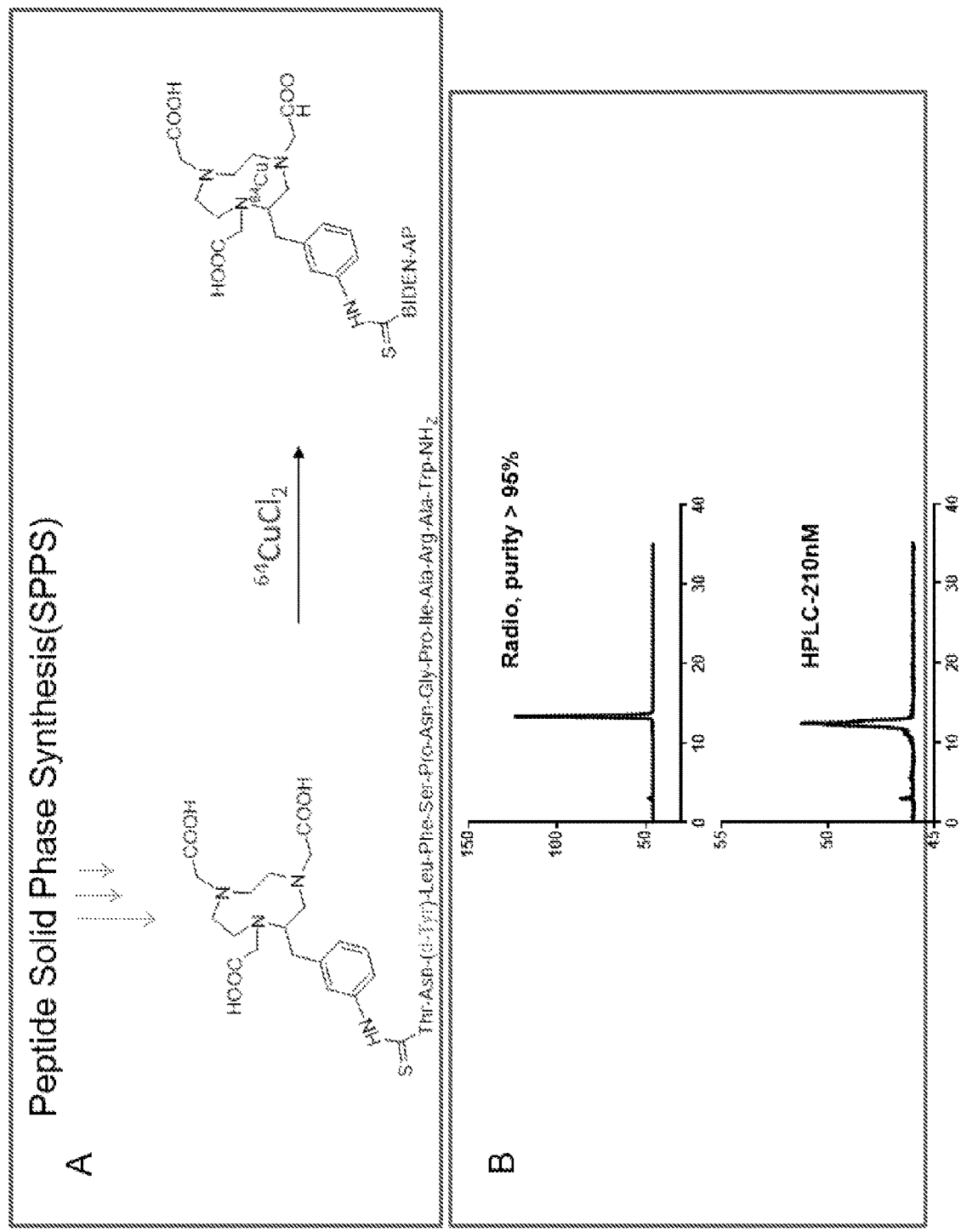

FIG. 21: Synthesis of $^{64}$Cu-labeled BIDEN-AP. (SEQ ID NO: 1)

Figure 22:
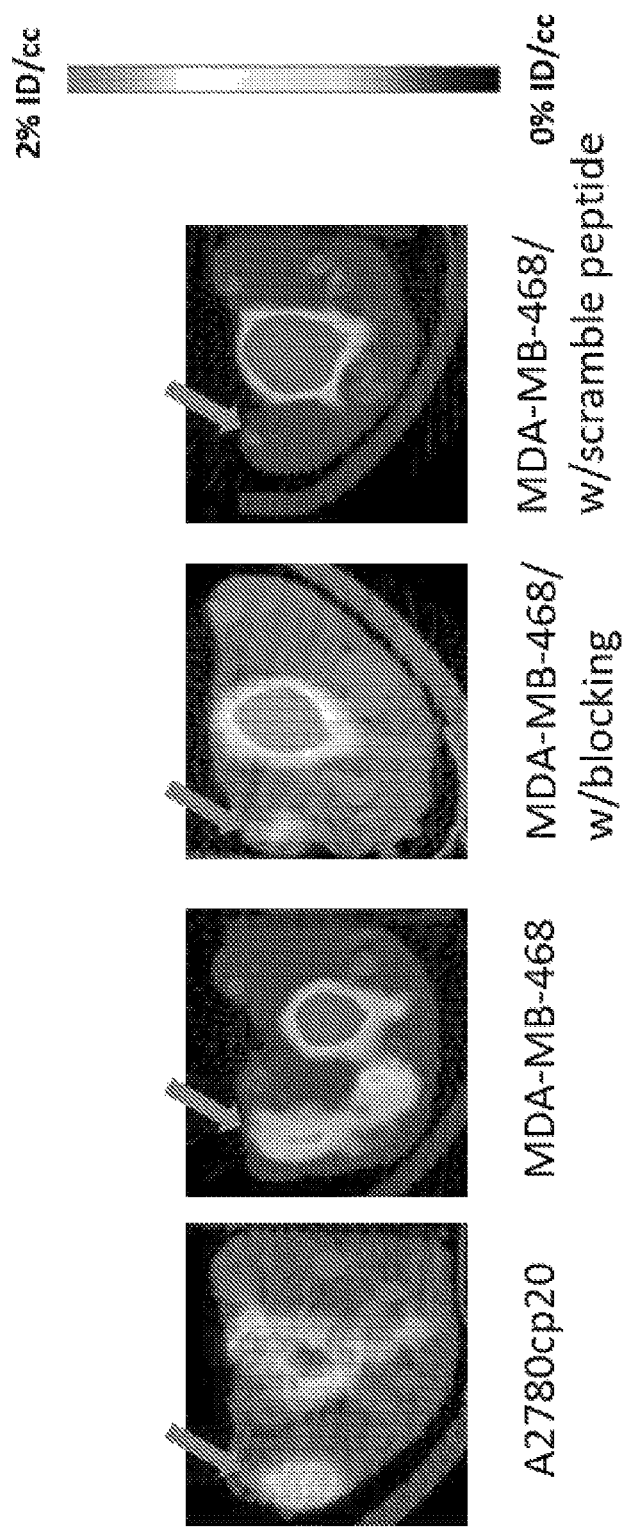

FIG. 22: Micro-positron emission tomography/computed tomography (µPET/CT) transaxial imaging of mice bearing s.c. A2780cp20 or MDA-MB-468 tumors. Images were acquired at 1 hour after intravenous injection of $^{64}$Cu-NOTA-BIDEN-AP.

Figure 23:
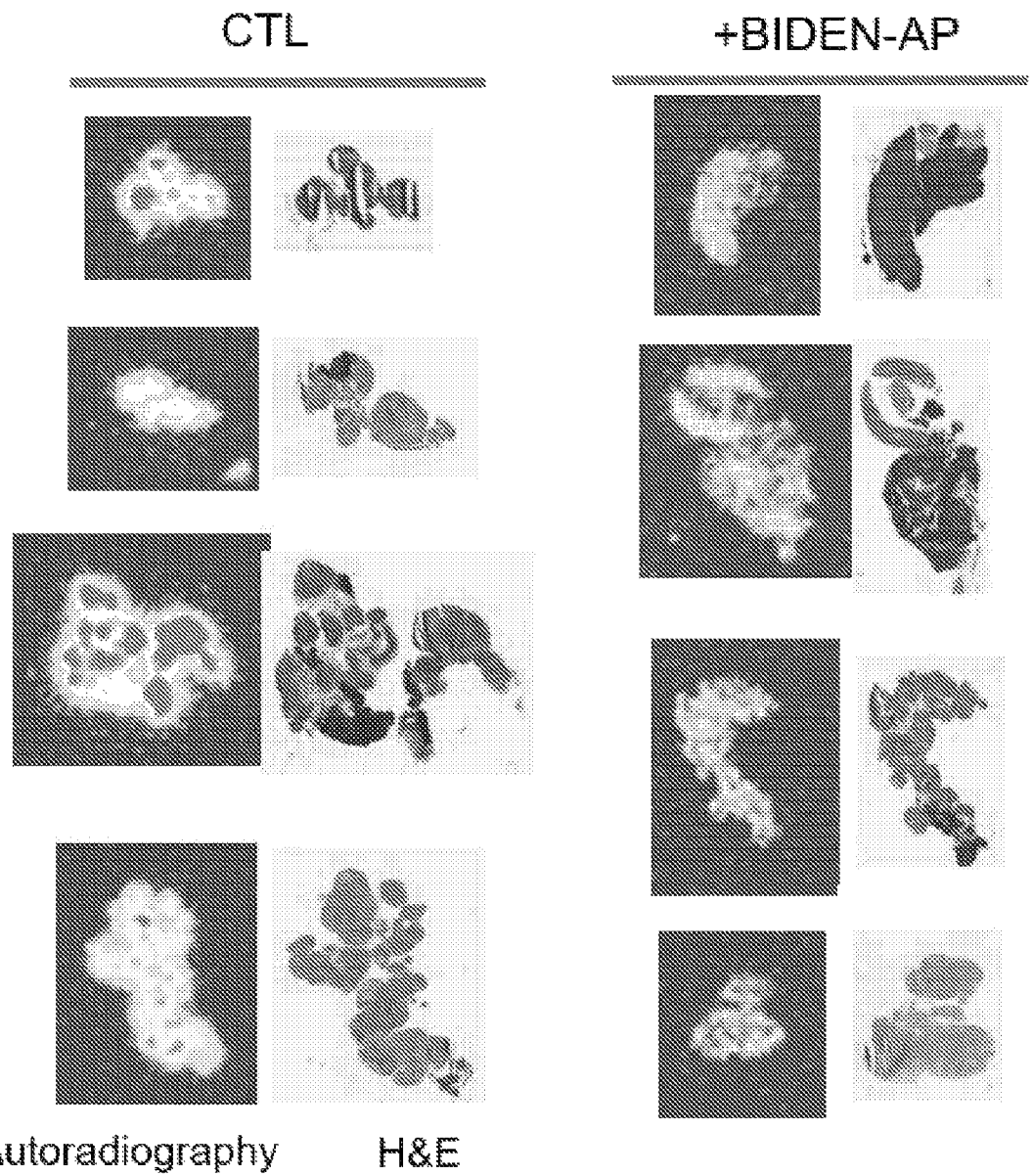

FIG. 23: Autoradiographs of A2780cp20 tumor. Female nude mice bearing orthotopic A2780-CP20 tumors were injected with either $^{64}$Cu-NOTA-BIDEN-AP alone (200 µCi, 0.2 mL) or $^{64}$Cu-NOTA-BIDEN-AP together with a large excess of cold BIDEN-AP peptide (200-fold molar ratio). Tumors were removed and processed for autoradiography 24 h after ratiotracer injection. BIDEN-AP specifically blocked tumor uptake of $^{64}$Cu-NOTA-BIDEN-AP.

FIGS. 24A-E: Anti-tumor activity of BIDEN-AP. (FIG. 24A) Schema for in vivo orthotopic 4T1 breast tumor model and treatment. Female Balb/c mice were inoculated in the mammary fat pad 4T1-Luc cells (1×106/site). Beginning on day 6 after inoculation, each mouse received 8 i.p. injections of BIDEN (black arrows) at a dose 13 mg/kg/injection over 2 weeks. Bioluminescence imaging (IVIS-BLI) one day before the last injection, and tumors were harvested and weighted one day after the last dosing. (FIG. 24B) Representative BLI images on day 19 after tumor cell inoculation. (FIG. 24C) Tumor weight at the end of the study (day 21) (n=10). (FIG. 24D, FIG. 24E) Immunohistochemical staining of CD31 and corresponding quantification of CD31+ area per field (n=8). Data are expressed as mean±SD. *p<0.05, ***p<0.001. CTL, untreated control, unaired student's t test.

FIGS. 25A-B: Anti-metastatic activity of BIDEN-AP. (FIG. 25A) Representative photographs of lungs from different treatment groups. The normal lung tissue was stained by blue ink. (FIG. 25B) Counts of surface metastatic nodules in the lung by visual inspection. Data are expressed as mean±SD. **p<0.01 (n=10).

DESCRIPTION OF ILLUSTRATIVE EMBODIMENTS

I. Therapeutic Peptides

The present invention is based, in part, on the identification of new therapeutic peptides that can selectively bind EphB4. In some aspects, the inventors have discovered that the substitution of an L-amino acid with a D-amino acid at specific position can result in surprising and unexpected changes in the function of the peptide. As shown in the below examples, the inventors unexpectedly found that substitution of L-Tyr-P3 with D-Tyr-P3 (e.g., as shown in SEQ ID NO: 1) led to a functional switch from EphB4 antagonist to EphB4 agonist. Unlike EphB4's natural ligand EFNB2, which binds to several receptors within the B subclass (Chrencik et al., 2006; Himanen et al., 2001), the EphB4 agonist peptide, TN(dY)LFSPNGPIARAW (SEQ ID NO: 1), exclusively bound to EphB4. Further experiments indicated that both BIDEN-AP and its nano-conjugate, CCPM-BIDEN-AP, promoted forward, tumor-suppressive EphB4 signaling both in vitro and in vivo, blocked the reverse signaling by interfering interaction between EphB4 and its natural ligand EFNB2 in endothelial cells, therefore suppressed their angiogenic properties, and sensitized Bev-resistant endothelial cells to cell death. Furthermore, monotherapy with BIDEN-AP or CCPM-BIDEN-AP demonstrated significant anti-tumor effects and anti-angiogenic activity both in vitro and in animal models in vivo. Methods of using the therapeutic peptides to treat a cancer are also provided herein.

In additional aspects, the therapeutic peptide that can selectively bind EphB4 may be further modified by one or more other amino substitutions while maintaining their activity; in some preferred embodiments, the therapeutic peptide has a D-amino acid at position 3 (e.g., as shown in SEQ ID NO:1). Generally, amino acid substitutions can be made at one or more positions wherein the substitution is for an amino acid having a similar hydrophilicity. The importance of the hydropathic amino acid index or hydrophilicity in conferring interactive biologic function on a protein is generally understood in the art. It is accepted that the relative hydropathic character or hydrophilicity of the amino acid contributes to the secondary structure of the resultant protein, which in turn defines the interaction of the protein with other molecules, for example, enzymes, substrates, receptors, DNA, antibodies, antigens, and the like. Thus, such conservative substitution can be made in therapeutic protein and will likely only have minor effects on their activity. As detailed in U.S. Pat. No. 4,554,101, the following hydrophilicity values have been assigned to amino acid residues: arginine (+3.0); lysine (+3.0); aspartate (+3.0±1); glutamate (+3.0±1); serine (+0.3); asparagine (+0.2); glutamine (+0.2); glycine (0); threonine (−0.4); proline (−0.5±1); alanine (0.5); histidine −0.5); cysteine (−1.0); methionine (−1.3); valine (−1.5); leucine (−1.8); isoleucine (−1.8); tyrosine (−2.3); phenylalanine (−2.5); tryptophan (−3.4). These values can be used as a guide and thus substitution of amino acids whose hydrophilicity values are within ±2 are preferred, those that are within ±1 are particularly preferred, and those within ±0.5 are even more particularly preferred. Thus, any of the therapeutic peptides described herein may be modified by the substitution of an amino acid, for different, but homologous amino acid with a similar hydrophilicity value, e.g., at 1, 2, 3, or 4 different positions. Amino acids with hydrophilicities within ±/−1.0, or +/−0.5 points are considered homologous. It is anticipated that the therapeutic peptide may comprise 1, 2, or 3 deletion mutations relative to SEQ ID NO:1, although preferably the amino acid at position 3 of SEQ ID NO:1 is a D-amino acid.

B. Synthesis of D-Amino Acid Peptides

In some preferred embodiments, a therapeutic peptide of the present embodiments comprises at least one D-amino acid (e.g., SEQ ID NO:1). D-amino acids, the enantiomers of naturally abundant L-amino acids, bears unique stereochemistry properties that lead to the resistance towards most of endogenous enzymes. A variety of methods for the generation or synthesis of D-amino acid peptides are known in the art. For example, solid-phase peptide synthesis (SPPS) is often used for the synthesis of peptides, including peptides comprising one or more D-amino acids.

SPPS has been used for some time and allows for rapid assembly of a peptide chain through successive reactions of amino acid derivatives on an insoluble porous support (e.g., (Merrifield, 1963; Chan and White, 2000). Fmoc Solid Phase Peptide Synthesis: A Practical Approach. Oxford, UK: OUP. ISBN 978-0-19-963724-9.) Typically, the solid support comprises small, polymeric resin beads functionalized with reactive groups (e.g., amine or hydroxyl groups) that can attach to the peptide chain being synthesized. Reagents and side products can be added and removed by washing and filtration. SPPS uses repeated cycles of alternate N-terminal deprotection and coupling reactions to synthetically grow the peptide. Peptide coupling agents that can be used include, e.g.: carbodiimides such as dicyclohexylcarbodiimide (DCC) or diisopropylcarbodiimide (DIC), which can be used for amide bond formation; an aminium/uronium (e.g., HATU (HOAt), HBTU/TBTU (HOBt) and HCTU (6-Cl-HOBt)) or a phosphonium salt of a non-nucleophilic anion (e.g., tetrafluoroborate or hexafluorophosphate) (El-Faham and Albericio, 2011); or propanephosphonic acid anhydride. Solid supports include gel-type supports, surface-type supports, and composites (Albericio, 2000). Protecting groups that may be used include, e.g.: tert-butyloxycarbonyl protecting group (also called "Boc"), that may be removed with trifluoroacetic acid; Fluorenylmethyloxycarbonyl protecting group (also called "Fmoc"), and carbobenzyl groups. Custom synthesis of peptides comprising a D-amino acid is also available from a variety of commercial manufacturers.

In some embodiments, the solid phase synthesis can be used to synthesize a therapeutic peptide comprising a D-amino acid, as follows. Solid phase syntheses can be carried out on an automatic peptide synthesizer (e.g., Prelude; PTI, Tucson, Ariz.) using Rink resin (e.g., Novabiochem). The resin (0.05-0.1 g) can be swollen and washed with about 5×1.5 mL of dimethylformamide (DMF)/ methylene chloride ($CH_2Cl_2$). Fluorenylmethyloxycarbonyl (Fmoc) groups can be removed with 3×1.5 mL of 20% piperidine/DMF for 5 min each. For coupling, three-fold excesses of Fmoc-amino acids, diisopropylcarbodiimide, and 1-hydroxybenzotriazole in 3 mL of DMF/$CH_2Cl_2$ can be used. This procedure can be repeated once. After coupling and deprotection steps, resins are washed with 3×3 mL of DMF/$CH_2Cl_2$. On completion of the peptide chain elongation, resins are washed with 3×3 mL of $CH_2Cl_2$ and were treated with trifluoroacetic acid:triisopropylsilane:$H_2O$ (95:2.5:2.5) for 15 min each. The combined filtrates can rest at room temperature for about 1-2 h, and the volumes can be reduced in a vacuum. Peptides can then be precipitated in ice cold ethyl ether, collected by centrifugation, washed two times with ethyl ether, and subjected to centrifugation. After drying, peptides can be purified by reverse-phase high-performance liquid chromatography (HPLC), e.g., using an Agilent 1200 system (C-18, Vydac, 10×250 mm, 10 µm; Santa Clara, Calif.). Alexa647-coupled therapeutic peptide (e.g., BIDEN-AP) can be obtained by solution phase reaction of the respective peptide with Alexa647-N-hydroxysuccinate (Alexa647-NHS), followed by HPLC purification.

C. Conjugates

The therapeutic peptide (e.g., SEQ ID NO: 1) may be covalently coupled to peptide, polypeptide (e.g., an antibody, scFv, or additional anti-inflammatory or anti-cancer polypeptide), or compound (e.g., a chemotherapeutic or anti-cancer compound). Strategies for the design of peptide drug conjugates are discussed, e.g., in Vrettos et al., 2018. Linking/coupling agents and/or mechanisms known to those of skill in the art can be used to modify therapeutic peptides of the present embodiments, such as, for example, antibody-antigen interaction, avidin biotin linkages, amide linkages, ester linkages, thioester linkages, ether linkages, thioether linkages, phosphoester linkages, phosphoramide linkages, anhydride linkages, disulfide linkages, ionic and hydrophobic interactions, bispecific antibodies and antibody fragments, or combinations thereof. In some embodiments, a therapeutic peptide of the present embodiments may be conjugated to a chemotherapeutic to facilitate delivery to cells or cancerous cells expressing EphB4; for example, the therapeutic peptide (e.g., SEQ ID NO:1) may be covalently attached to a cytotoxic agent and the biodegradable connecting linker to form the peptide-drug conjugate (e.g., Vrettos et al., 2018).

It is contemplated that a cross-linker having reasonable stability in blood can be employed. Numerous types of disulfide-bond containing linkers are known that can be successfully employed to conjugate targeting and therapeutic/preventative agents. For example, linkers that contain a disulfide bond that is sterically hindered may result in greater stability in vivo. Another cross-linking reagent is SMPT, which is a bifunctional cross-linker containing a disulfide bond that is sterically hindered by an adjacent benzene ring and methyl groups. The SMPT cross-linking reagent, as with many other known cross-linking reagents, lends the ability to cross-link functional groups such as the SH of cysteine or primary amines (e.g., the epsilon amino group of lysine). Another possible type of cross-linker includes the hetero-bifunctional photoreactive phenylazides containing a cleavable disulfide bond such as sulfosuccinimidyl-2-(p-azido salicylamido) ethyl-1,3'-dithiopropionate. The N-hydroxy-succinimidyl group reacts with primary amino groups and the phenylazide (upon photolysis) reacts non-selectively with any amino acid residue.

In addition to hindered cross-linkers, non-hindered linkers also can be employed in accordance herewith. Other useful cross-linkers, not considered to contain or generate a protected disulfide, include SATA, SPDP and 2-iminothiolane. The linker may be a bifunctional linkers, such as ones useful for producing conjugates of ligands with amine-containing polymers and/or proteins, especially for forming antibody conjugates with chelators, drugs, enzymes, detectable labels and the like (e.g., U.S. Pat. No. 4,680,338). U.S. Pat. Nos. 5,141,648 and 5,563,250 disclose cleavable conjugates containing a labile bond that is cleavable under a variety of mild conditions.

In some embodiments, the peptide is comprised in a heterodimer or a multimer. For example, the peptide may be comprised in a peptide homodimer, a peptide homotrimer, a peptide homotetramer, a peptide heterodimer, a peptide heterotrimer, a peptide heterotetramer, or a peptide multimer. Heterodimers and other multimer constructs are can be prepared by methods, e.g., as disclosed in Yan et al., 2011. Such multimer constructs may be particularly useful in imaging approaches. For example, such multivalency approaches can be used to improve peptide binding affinity. Peptide homodimers or homomultimers in which peptide ligands of the same type can be constructed with suitable linkers. Peptide heterodimers can be used, e.g., for targeting multi-receptor over-expressed tumor cells, and may result in affinity enhancements. Methods for the generation of peptide multimers are also described, e.g., in Dijkraaf et al., 2008.

D. Drug Payloads

In some embodiments the therapeutic peptide is conjugated to or covalently bound to a drug payload, such as a cytotoxic payload (e.g., a protein or enzyme) or a chemotherapeutic. For example, it is anticipated that a wide variety of chemotherapeutics or cytotoxic polypeptides may be attached to is a maytansinoid, an auristatin, a taxoid, a calicheamicin, a CC-1065 analog, a duocarmycin, a protein toxin (such for example a *Pseudomonas* exotoxin or diphtheria toxin), an amatoxin. In some embodiments, the therapeutic peptide (e.g., SEQ ID NO: 1) may be attached to a drug payload including, e.g., auristatins, maytansinoids, tubulysins, calicheamicins, duocarmycins, benzodiazepines, camptothecin analogues, doxorubicin, or other cytotoxic warheads (e.g., non-clinical-stage cytotoxic warheads), or a combination thereof. Optionally, the therapeutic peptide may be covalently attached to the drug payload or cytotoxic payload via a linker. The linker may be a cleavable linker.

Anticancer drugs for peptide-drug conjugates (PDC), much the same way as antibody-drug conjugates (ADC) that have been used to enhance antitumor efficacy of existing small molecular weight anticancer drugs (Beck et al., Strategies and challenges for the next generation of antibody-drug conjugates. Nat Rev Drug Discov. 2017 May; 16(5): 315-337. doi: 10.1038/nrd.2016.268.). Anticancer drugs that can be conjugated to BIDEN-AP (SEQ ID NO: 1) include but are not limited to warheads used in clinical-stage ADCs such as auristatins, maytansinoids, tubulysins, calicheamicins, duocarmycins, benzodiazepines, camptothecin analogues, doxorubicin, and other non-clinical-stage cytotoxic warheads.

E. Imaging Agents

In some embodiments, the therapeutic peptide (e.g., SEQ ID NO: 1) is conjugated to or covalently bound to an imaging agent or a detectable label. For example, in some embodiments, the therapeutic peptide may be covalently bound to a detectable label. The therapeutic peptide may also be comprised in or covalently attached to nanoparticles, liposomes, or micelles, wherein the nanoparticles, liposomes, or micelles comprise a detectable label.

As used herein, "detectable label" is a compound and/or element that can be detected due to its specific functional properties, and/or chemical characteristics, the use of which allows the peptide to which it is attached be detected, and/or further quantified if desired.

In some embodiments, the detectable label is a photoluminescent probe, such as a fluorophore or a nanoparticle, such as for example a strontium aluminate nanoparticle (e.g., see Paterson et al., 2014). Exemplary labels include, but are not limited to, a particulate label such as colloidal gold, a radioactive isotope such as $^{211}$astatine, $^{57}$cobalt, $^{58}$cobalt, $^{67}$copper, $^{67}$copper $^{152}$Eu, $^{67}$gallium, $^{18}$fluorine, iodine$^{123}$, iodine$^{125}$, iodine$^{131}$, $^{111}$indium, $^{59}$iron, $^{32}$phosphorus, $^{186}$rhenium, $^{188}$rhenium, $^{75}$selenium, $^{35}$sulphur, $^{-99}$technicium, $^{-99i}$technetium, $^{89}$zirconium, or $^{90}$yttrium, a colorimetric label such as dinitrobenzene, dansyl chloride, dabsyl chloride, any of the azo, cyanin or triazine dyes, or chromophores disclosed in U.S. Pat. Nos. 5,470,932, 5,543, 504, or 6,372,445, all of which are incorporated herein by reference; a paramagnetic label such as chromium (III), manganese (II), iron (III), iron (II), cobalt (II), nickel (II), copper (II), neodymium (III), samarium (III), ytterbium (III), gadolinium (III), vanadium (II), terbium (III), dysprosium (III), holmium (III) or erbium (III), a fluorescent label such as Alexa 350, Alexa 430, AMCA, BODIPY 630/650, BODIPY 650/665, BODIPY-FL, BODIPY-R6G, BODIPY-TMR, BODIPY-TRX, Cascade Blue, Cy3, Cy5,6-FAM, Cy7, IRDyes, Fluorescein Isothiocyanate, HEX, 6-JOE, Oregon Green 488, Oregon Green 500, Oregon Green 514, Pacific Blue, REG, Rhodamine Green, Rhodamine Red, Renographin, ROX, TAMRA, TET, Tetramethylrhodamine, and/or Texas Red, or Lucifer Yellow, an enzyme label such as urease, luciferase, alkaline phosphatase, (horseradish) hydrogen peroxidase, or glucose oxidase, or a chemiluminescent label such as luminol, phthalazinedione, and others disclosed in any of U.S. Pat. Nos. 4,373,932, 4,220,450, 5,470,723, and U.S. Patent Application 2007/0264664, all of which are incorporated herein by reference.

F. Linkers

A variety of linkers can be used in a constructs comprising a therapeutic peptide of the embodiments. For example, a therapeutic peptide (e.g., SEQ ID NO: 1) may be covalently attached to a linker that is covalently attached to a drug payload or a cytotoxic payload. In some embodiments, the linker is cleavable in an intracellular environment; in this way, the drug payload may be released inside a cell (e.g., a tumor cell or a cancerous cell) after the therapeutic peptide has bound EphB4 and been internalized into the intracellular environment. In some aspects a linker can be a random string of one or more amino acids (e.g., 2, 3, 4, 5, 10, 15, 20 or more amino acids). Some specific linkers for use according the embodiments include the 218 (GST-SGSGKPGSGEGSTKG; SEQ ID NO: 2), the HL (EAAAK; SEQ ID NO: 3) and the $G_4S$ (GGGGS; SEQ ID NO: 4) linkers (e.g., Robinson and Sauer, 1998; Arai et al., 2004 and Whitlow et al., 1993, each incorporated herein by reference).

In further aspects, a linker can serve as a way of separating different domains of a polypeptide construct, such as by proteolytic cleavage. For example, a linker region may comprise a protease cleavage site, such as the cleavage site recognized by an endogenous intracellular protease. In still further aspects, a protease cleavage site can be a site that is only cleaved in certain cell types. Examples of protease cleavage site for use according to the embodiments include, without limitation, thrombin, furin (Goyal et al., 2000), and caspase cleavage sites.

The constructs comprising a therapeutic protein, and for example a drug payload or cytotoxic payload, may be joined by a variety of conjugations or linkages that have been previously described in the art. In one example, a biologically-releasable bond, such as a selectively-cleavable linker or amino acid sequence may be used. For instance, peptide linkers that include a cleavage site for an enzyme preferentially located or active within a tumor environment are contemplated. For example, linkers that are cleaved by urokinase, plasmin, thrombin, Factor IXa, Factor Xa, or a metalloproteinase, such as collagenase, gelatinase, or stromelysin. In a preferred embodiment, a linker that is cleaved by an intracellular proteinase is preferred, since this will allow the construct to be internalized intact into targeted cells prior to cleavage.

Amino acids such as selectively-cleavable linkers, synthetic linkers, or other amino acid sequences such as the glycine rich linkers are described above and may be used to separate the different regions of the construct. Additionally, while numerous types of disulfide-bond containing linkers are known that can successfully be employed to conjugate the dGel with a cell targeting moiety, certain linkers will generally be preferred over other linkers, based on differing pharmacologic characteristics and capabilities. For example, linkers that contain a disulfide bond that is sterically "hindered" may be preferred in some embodiments due to their greater stability in vivo, which may reduce or prevent release of the cytotoxic payload or drug payload prior to binding at the site of action.

U.S. Pat. No. 5,856,456 provides peptide linkers for use in connecting polypeptide constituents to make fusion proteins, e.g., single chain antibodies. The linker is up to about 50 amino acids in length, contains at least one occurrence of a charged amino acid (preferably arginine or lysine) followed by a proline, and is characterized by greater stability and reduced aggregation. U.S. Pat. No. 5,880,270 discloses aminooxy-containing linkers useful in a variety of immunodiagnostic and separative techniques.

G. Nanoparticles, Liposomes, and Micelles

In some embodiments, a therapeutic peptide (e.g., SEQ ID NO: 1) is administered in liposomes, nanoparticles, or micelles. For example, in some embodiments, the therapeutic peptide is conjugated to core-crosslinked polymeric micelles (CCPM). The liposomes, nanoparticles, or micelles (e.g., CCPM) may optionally comprise a detectable label such as, e.g., a fluorophore (e.g., a fluorescent dye) and/or a radionuclide (e.g., Indium-111 or Copper-64). In some embodiments, the therapeutic peptide is included in the liposomes or nanoparticles and may be used to target the liposomes or nanoparticles to cells that express or overexpress EphB4.

In some embodiments, the therapeutic peptide is administered via a neutral or non-charged liposome, e.g., using liposomes as described in U.S. Pat. No. 8,895,717. In some embodiments, the therapeutic peptide may be administered via a neutral or non-charged liposome, e.g., using liposomes as described in U.S. Pat. No. 8,734,853. For example, in some embodiments, the liposome comprises one or more neutral phospholipids such as a phosphatidylcholine or a phosphatidylethanolamine phospholipid. The liposomes may, e.g., be unilamellar, multilamellar, or multivesicular liposomes. A variety of compounds may be included in the liposomes such as, e.g., egg phosphatidylcholine ("EPC"), dilauryloylphosphatidylcholine ("DLPC"), dimyristoylphosphatidylcholine ("DMPC"), dipalmitoylphosphatidylcholine ("DPPC"), distearoylphosphatidylcholine ("DSPC"), 1-myristoyl-2-palmitoyl phosphatidylcholine ("MPPC"), 1-palmitoyl-2-myristoyl phosphatidylcholine ("PMPC"), 1-palmitoyl-2-stearoyl phosphatidylcholine ("PSPC"), 1-stearoyl-2-palmitoyl phosphatidylcholine ("SPPC"), dimyristyl phosphatidylcholine ("DMPC"), 1,2-distearoyl-sn-glycero-3-phosphocholine ("DAPC"), 1,2-diarachidoyl-sn-glycero-3-phosphocholine ("DBPC"), 1,2-dieicosenoyl-sn-glycero-3-phosphocholine ("DEPC"), palmitoyloeoyl phosphatidylcholine ("POPC"), dilinoleoylphosphatidylcholine distearoylphophatidyletha-nolamine ("DSPE"), dimyristoyl phosphatidylethanolamine ("DMPE"), dipalmitoyl phosphatidylethanolamine ("DPPE"), palmitoyloeoyl phosphatidylethanolamine ("POPE"), dioleoylphosphatidylethanolamine ("DOPE") or dioleoylphosphatidylcholine ("DOPC"). The therapeutic peptide may be administered parenterally, intravenously, transarterially, intra-hepatic portal vein, intramuscularly, intraperitoneally, or intra-tumorally.

The liposomes may be targeted to a particular cell type, e.g., by including a targeting protein or peptide in the liposomes. A variety of methods are known for conjugating antibodies to liposomes, for example as described in Manjappa et al., 2011; Ansell, 2000; or Aryasomayajula, 2017.

In some embodiments, the micelles are biodegradable core-crosslinked polymeric micelles (CCPM). For example, the micelles may comprise polyethylene glycol (PEG), methoxy-poly(ethylene glycol)-block-poly(D, L-lactide), poly(ethylene glycol)-block-poly(aspartate), poly(ethylene glycol)-b-poly(methacrylic acid) or poly(ethylene glycol)-block-poly(glutamate). Other methods of generating CCPM are known and can be used in various embodiments, e.g., as described in Zhou et al., 2017; Talelli et al., 2015; Hu et al., 2016. CCPM may be administered via a variety of routes including parenterally, intravenously, subcutaneously, etc.

The CCPM may also be labeled with a fluorophore or an imaging agent, and can be used for imaging (e.g., as described in Shi et al., 2015). In some embodiments, the therapeutic peptide is conjugated to CCPM micelles, e.g., as described in (Koolpe et al., 2005); generally CCPM with an amine functionalized surface can be synthesized and reacted with a therapeutic peptide comprising a terminal Cys (e.g., Cys-BIDEN-AP), to form micelles or liposomes that are functionalized with the therapeutic peptide. CCPM can also be labelled with an imaging agent, such as a fluorescent dye or a near-infrared fluorescent agent, or dually labeled with a both a fluorescent dye and a radioisotope (e.g., Indium-111), and the labelled CCPM may be used for in vivo imaging applications (e.g., as described in Yang et al., 2007; Zhang et al., 2011a; Zhang et al., 2011b; Zhao et al., 2012). Additional synthetic methods for the generation of therapeutic peptides conjugated to a detectable label (e.g., Copper-64) are shown in the figures.

A variety of liposome diameters may be used. For example, in some embodiments the liposomes (e.g., CCPM) are from about 5-100, 10-50, 15-35, 10-25, 15-25, or 5, 10, 15, 16, 17, 18, 19, 20, 21, 22, 23, 24, 25, 26, 27, 28, 29, or 30 nm in diameter, or any range derivable therein.

II. Treatment of Disease

In some aspects, a composition comprising a therapeutic peptide as described herein (e.g., comprising SEQ ID NO: 1) can be used to treat a cancer. In some embodiments, the cancer expresses or overexpresses EphB4. In other embodiments, a therapeutic peptide disclosed herein may be used to promote bone remodeling or to treat bone loss (e.g., resulting from osteoporosis, a genetic disorder, or resulting from a cancer therapy such as a hormonal therapy, chemotherapy, etc.). In some embodiments, the therapeutic peptide can be used in the treatment of a heart disease, such as an ischemic heart disease.

The tyrosine kinase EphB4, a member of the Eph receptor family, has been associated with tumor angiogenesis, growth and metastasis (e.g., Chen et al., *Semin Cancer Biol.* 2017 Oct. 6. pii: S1044-579X(17)30162-1.), and EphB4 expression has been associated with multiple cancers, including, e.g., colorectal cancers (Kuppen et al., 2017), gastric cancers (Yin et al., 2017), prostate cancers (Mertens-Walker et al., 2015), breast cancers (Li et al., 2017), sarcomas (Becerikli et al., 2015), including rhabdomyosarcoma (Randolph et al., 2017), leukemias including chronic myeloid leukemia (Zhao et al., 2017), pancreatic cancers (Li et al., 2014), lung cancers (Ferguson et al., 2015), head and neck cancers (Bhatia et al., 2016), esophageal cancers (Hasina et al., 2013), or ovarian cancers. Since the BIDEN-AP peptide (SEQ ID NO: 1) has been observed to modulate EphB4 signaling, it is anticipated that the therapeutic peptides may be particularly useful for treating a cancer that expresses or overexpresses EphB4.

EphB4 mutants with mutated phosphorylation sites can still promote tumor cell growth and migration (Hu et al., 2014). Conversely, increasing evidence supports the idea that ligand-dependent EphB4/EFNB2 signaling is tumor suppressive. For example, EFNB2-Fc-mediated EphB4 phosphorylation activated AbI family tyrosine kinase and Crk adaptor protein in tumor cells, which led to significant tumor-suppressive activity (Hu et al., 2014; Tognolini et al., 2013; Noren et al., 2006; Rutkowski et al., 2012; Barneh et al., 2013). In some embodiments, the cancer has one or more mutations in EphB4.

EFNB2 is expressed primarily on the surface of endothelial cells of tumor vasculature (Noren et al., 2004). Several groups have shown that the reverse EphB4 to EFNB2 signaling in endothelial cells plays an essential role in initiating angiogenesis and lymphangiogenesis, important processes in supporting tumor growth and metastasis (Sawamiphak et al., 2010; Wang et al., 2010; Heroult et al., 2006). The soluble extracellular domain of EphB4, which disrupts EphB4-EFNB2 interaction, attenuated angiogenesis and inhibited tumor growth (Kertesz et al., 2006). EFNB2 functions as an important regulator of angiogenesis through activation of vascular endothelial growth factor receptor (VEGFR) (Wang et al., 2010). Therefore, EphB4 agonists that activate the forward EphB4 signaling and interfere with the reverse EFNB2 signaling may offer a unique therapeutic opportunity.

It is anticipated that the therapeutic peptides disclosed herein can be used to treat a variety of cancers. Cancer cells that may be treated with cell targeting constructs according to the embodiments include but are not limited to cells from the bladder, blood, bone, bone marrow, brain, breast, colon, esophagus, gastrointestine, gum, head, kidney, liver, lung, nasopharynx, neck, ovary, prostate, skin, stomach, testis, tongue, or uterus. In addition, the cancer may specifically be of the following histological type, though it is not limited to these: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; paget's disease, mammary; acinar cell carcinoma; adenosquamous carcinoma; adenocarcinoma w/squamous metaplasia;

thymoma, malignant; ovarian stromal tumor, malignant; thecoma, malignant; granulosa cell tumor, malignant; androblastoma, malignant; sertoli cell carcinoma; leydig cell tumor, malignant; lipid cell tumor, malignant; paraganglioma, malignant; extra-mammary paraganglioma, malignant; pheochromocytoma; glomangiosarcoma; malignant melanoma; amelanotic melanoma; superficial spreading melanoma; melanoma in giant pigmented nevus; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; mullerian mixed tumor; nephroblastoma; hepatoblastoma; carcinosarcoma; mesenchymoma, malignant; brenner tumor, malignant; phyllodes tumor, malignant; synovial sarcoma; mesothelioma, malignant; dysgerminoma; embryonal carcinoma; teratoma, malignant; struma ovarii, malignant; choriocarcinoma; mesonephroma, malignant; hemangiosarcoma; hemangioendothelioma, malignant; kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; ewing's sarcoma; odontogenic tumor, malignant; ameloblastic odontosarcoma; ameloblastoma, malignant; ameloblastic fibrosarcoma; pinealoma, malignant; chordoma; glioma, malignant; ependymoma; astrocytoma; protoplasmic astrocytoma; fibrillary astrocytoma; astroblastoma; glioblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; hodgkin's disease; hodgkin's; paragranuloma; malignant lymphoma, small lymphocytic; malignant lymphoma, large cell, diffuse; malignant lymphoma, follicular; mycosis fungoides; other specified non-hodgkin's lymphomas; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; and hairy cell leukemia.

It is anticipated that the therapeutic peptides disclosed herein can be used to treat a variety of diseased in addition to cancer. For example, the forward EphB4 signaling through osteoblasts can enhance osteogenic differentiation and increases bone mass (Zhao et al., 2006). Thus, the therapeutic peptides may be used to treating bone loss and/or to promote bone remodeling.

In some embodiments, the therapeutic peptide is used to treat a heart disease. EphB4 forward-signaling can also regulate cardiac progenitor development in mouse embryonic stem cells (Chen et al., 2015). In addition, intraperitoneal administration of ephrin-B2 Fc was reported to increase capillary density in the infarcted mouse myocardium (Mansson-Broberg et al. 2008). Studies in cell culture suggest a role for EphB4 in cardiomyocyte gap junctional communication and synchronized contraction (Ishii et al., 2011). Therefore, forward signaling mediated by a therapeutic peptide (e.g., SEQ ID NO: 1) may be used to treat a heart disease, such as ischemic myocardium.

II. Pharmaceutical Compositions

Pharmaceutical compositions of the present embodiments comprise an effective amount of one or more compounds of the present embodiments, e.g., a therapeutic peptide (e.g., comprising or consisting of SEQ ID NO:1, optionally conjugated to a cytotoxic payload or chemotherapy, or optionally comprised in a nanoparticle, liposome, or micelle), or additional agent dissolved or dispersed in a pharmaceutically acceptable carrier. The therapeutic peptide may optionally be covalently attached to a drug payload (e.g., directly or via a cleavable or non-cleavable linker), or the therapeutic peptide may be comprised in, conjugated to, or covalently attached to nanoparticles, liposomes, or micelles as described herein.

The phrases "pharmaceutical or pharmacologically acceptable" refers to molecular entities and compositions that do not produce an adverse, allergic or other untoward reaction when administered to an animal, such as, for example, a human, as appropriate. The preparation of an pharmaceutical composition that contains at least one compound or therapeutic peptide or additional active ingredient will be known to those of skill in the art in light of the present disclosure, as exemplified by Remington: The Science and Practice of Pharmacy, 21$^{st}$ Ed., Lippincott Williams and Wilkins, 2005, incorporated herein by reference. Moreover, for animal (e.g., human) administration, it will be understood that preparations should typically meet sterility, pyrogenicity, general safety and purity standards as required by FDA Office of Biological Standards.

As used herein, "pharmaceutically acceptable carrier" includes any and all solvents, dispersion media, coatings, surfactants, antioxidants, preservatives (e.g., antibacterial agents, antifungal agents), isotonic agents, absorption delaying agents, salts, preservatives, drugs, drug stabilizers, gels, binders, excipients, disintegration agents, lubricants, sweetening agents, flavoring agents, dyes, such like materials and combinations thereof, as would be known to one of ordinary skill in the art (see, for example, Remington's Pharmaceutical Sciences, 18th Ed. Mack Printing Company, 1990, pp. 1289-1329, incorporated herein by reference). Except insofar as any conventional carrier is incompatible with the active ingredient, its use in the pharmaceutical compositions is contemplated.

The therapeutic peptide may comprise different types of carriers depending on whether it is to be administered in solid, liquid or aerosol form, and whether it need to be sterile for such routes of administration as injection. The present invention can be administered intravenously, intradermally, transdermally, intrathecally, intraarterially, intraperitoneally, intramuscularly, subcutaneously, mucosally, locally, inhalation (e.g., aerosol inhalation), injection, infusion, continuous infusion, localized perfusion bathing target cells directly, via a catheter, via a lavage, in cremes, in lipid compositions (e.g., liposomes, micelles, or nanoparticles), or by other method or any combination of the forgoing as would be known to one of ordinary skill in the art (see, for example, Remington's Pharmaceutical Sciences, 18th Ed. Mack Printing Company, 1990, incorporated herein by reference).

Further in accordance with the present invention, the composition of the present embodiments suitable for administration is provided in a pharmaceutically acceptable carrier with or without an inert diluent. The carrier should be assimilable and includes liquid, semi-solid, i.e., pastes, or solid carriers. Except insofar as any conventional media, agent, diluent or carrier is detrimental to the recipient or to the therapeutic effectiveness of a composition contained therein, its use in administrable composition for use in practicing the methods of the present embodiments is appropriate. Examples of carriers or diluents include fats, oils, water, saline solutions, lipids, liposomes, resins, binders, fillers and the like, or combinations thereof. The composition may also comprise various antioxidants to retard oxidation of one or more component. Additionally, the prevention of the action of microorganisms can be brought about by preservatives such as various antibacterial and antifungal agents, including but not limited to parabens (e.g., methylparabens, propylparabens), chlorobutanol, phenol, sorbic acid, thimerosal or combinations thereof.

In accordance with the present invention, the composition is combined with the carrier in any convenient and practical manner, i.e., by solution, suspension, emulsification, admixture, encapsulation, absorption and the like. Such procedures are routine for those skilled in the art.

In a specific embodiment, the composition is combined or mixed thoroughly with a semi-solid or solid carrier. The mixing can be carried out in any convenient manner such as grinding. Stabilizing agents can be also added in the mixing process in order to protect the composition from loss of therapeutic activity, i.e., denaturation in the stomach. Examples of stabilizers for use in a composition include buffers, amino acids such as glycine and lysine, carbohydrates such as dextrose, mannose, galactose, fructose, lactose, sucrose, maltose, sorbitol, mannitol, etc.

In further embodiments, the present invention may concern the use of a pharmaceutical lipid vehicle compositions that include a compound or therapeutic peptide, one or more lipids, and an aqueous solvent. As used herein, the term "lipid" will be defined to include any of a broad range of substances that is characteristically insoluble in water and extractable with an organic solvent. This broad class of compounds are well known to those of skill in the art, and as the term "lipid" is used herein, it is not limited to any particular structure. Examples include compounds which contain long-chain aliphatic hydrocarbons and their derivatives. A lipid may be naturally occurring or synthetic (i.e., designed or produced by man). However, a lipid is usually a biological substance. Biological lipids are well known in the art, and include for example, neutral fats, phospholipids, phosphoglycerides, steroids, terpenes, lysolipids, glycosphingolipids, glycolipids, sulphatides, lipids with ether and ester-linked fatty acids and polymerizable lipids, and combinations thereof. Of course, compounds other than those specifically described herein that are understood by one of skill in the art as lipids are also encompassed by the compositions and methods of the present embodiments.

One of ordinary skill in the art would be familiar with the range of techniques that can be employed for dispersing a composition in a lipid vehicle. For example, the compound or therapeutic peptide of the present embodiments may be dispersed in a solution containing a lipid, dissolved with a lipid, emulsified with a lipid, mixed with a lipid, combined with a lipid, covalently bonded to a lipid, contained as a suspension in a lipid, contained or complexed with a micelle or liposome, or otherwise associated with a lipid or lipid structure by any means known to those of ordinary skill in the art. The dispersion may or may not result in the formation of liposomes.

The actual dosage amount of a composition of the present embodiments administered to an animal patient can be determined by physical and physiological factors such as body weight, severity of condition, the type of disease being treated, previous or concurrent therapeutic interventions, idiopathy of the patient and on the route of administration. Depending upon the dosage and the route of administration, the number of administrations of a preferred dosage and/or an effective amount may vary according to the response of the subject. The practitioner responsible for administration will, in any event, determine the concentration of active ingredient(s) in a composition and appropriate dose(s) for the individual subject.

In some embodiments, pharmaceutical compositions may comprise, for example, at least about 0.10% of an active compound. In other embodiments, the an active compound may comprise between about 2% to about 75% of the weight of the unit, or between about 25% to about 60%, for example, and any range derivable therein. Naturally, the amount of active compound(s) in each therapeutically useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

In other non-limiting examples, a dose may also comprise from about 1 microgram/kg/body weight, about 5 microgram/kg/body weight, about 10 microgram/kg/body weight, about 50 microgram/kg/body weight, about 100 microgram/kg/body weight, about 200 microgram/kg/body weight, about 350 microgram/kg/body weight, about 500 microgram/kg/body weight, about 1 milligram/kg/body weight, about 5 milligram/kg/body weight, about 10 milligram/kg/body weight, about 50 milligram/kg/body weight, about 100 milligram/kg/body weight, about 200 milligram/kg/body weight, about 350 milligram/kg/body weight, about 500 milligram/kg/body weight, to about 1000 mg/kg/body weight or more per administration, and any range derivable therein. In non-limiting examples of a derivable range from the numbers listed herein, a range of about 5 mg/kg/body weight to about 100 mg/kg/body weight, about 5 microgram/kg/body weight to about 500 milligram/kg/body weight, etc., can be administered, based on the numbers described above.

A. Parenteral Compositions and Formulations

In further embodiments, a therapeutic peptide of the present embodiments may be administered via a parenteral route. As used herein, the term "parenteral" includes routes that bypass the alimentary tract. Specifically, the pharmaceutical compositions disclosed herein may be administered for example, but not limited to intravenously, intradermally, intramuscularly, intraarterially, intrathecally, subcutaneous, or intraperitoneally U.S. Pat. Nos. 6,7537,514, 6,613,308, 5,466,468, 5,543,158; 5,641,515; and 5,399,363 (each specifically incorporated herein by reference in its entirety).

Solutions of the active compounds as free base or pharmacologically acceptable salts may be prepared in water suitably mixed with a surfactant, such as hydroxypropylcellulose. Dispersions may also be prepared in glycerol, liquid polyethylene glycols, and mixtures thereof and in oils. Under ordinary conditions of storage and use, these preparations contain a preservative to prevent the growth of microorganisms. The pharmaceutical forms suitable for injectable use include sterile aqueous solutions or dispersions and sterile powders for the extemporaneous preparation of sterile injectable solutions or dispersions (U.S. Pat. No. 5,466,468, specifically incorporated herein by reference in its entirety). In all cases the form must be sterile and must be fluid to the extent that easy injectability exists. It must be stable under the conditions of manufacture and storage and must be preserved against the contaminating action of microorganisms, such as bacteria and fungi. The carrier can be a solvent or dispersion medium containing, for example, water, ethanol, polyol (i.e., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous, and intraperitoneal administration. In this connection, sterile aqueous media that can be employed will be known to those of skill in the art in light of the present disclosure. For example, one dosage may be dissolved in isotonic NaCl solution and either added hypodermoclysis fluid or injected at the proposed site of infusion, (see for example, "Remington's Pharmaceutical Sciences" 15th Edition, pages 1035-1038 and 1570-1580, 1990). Some variation in dosage will necessarily occur depending on the condition of the subject being treated. The person responsible for administration will, in any event, determine the appropriate dose for the individual subject. Moreover, for human administration, preparations should meet sterility, pyrogenicity, general safety and purity standards as required by FDA Office of Biologics standards.

Sterile injectable solutions are prepared by incorporating the active compounds in the required amount in the appropriate solvent with various of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof. A powdered composition is combined with a liquid carrier such as, e.g., water or a saline solution, with or without a stabilizing agent.

III. Combination Therapies

In certain embodiments, a therapeutic peptide of the present embodiments is administered to a subject, such as a human subject, in combination with at least one additional therapy. The additional therapy may be radiation therapy, surgery (e.g., hepatectomy and liver transplantation), chemotherapy, microwave ablation, alcohol ablation, chemoembolization, gene therapy, DNA therapy, viral therapy, RNA therapy, immunotherapy, bone marrow transplantation, nanotherapy, monoclonal antibody therapy, or a combination of the foregoing.

In some embodiments, the additional therapy is the administration of small molecule enzymatic inhibitor or anti-metastatic agent. In some embodiments, the additional therapy is the administration of side-effect limiting agents (e.g., agents intended to lessen the occurrence and/or severity of side effects of treatment, such as anti-nausea agents, etc.). In some embodiments, the additional therapy is radiation therapy, a surgery, or a combination of radiation therapy (e.g., gamma irradiation) and surgery. In some embodiments, the additional therapy is therapy with an antiangiogenesis agent (e.g., bevacizumab, or bevacizumab with gemcitabine and oxaliplatin), a tyrosine kinase inhibitor (e.g., sorafenib, erlotinib), a surgery (e.g., a partial hepatectomy), a locally ablative therapy (e.g., intratumoral injection of ethanol or acetic acid, radiofrequency ablation, microwave ablation, laser ablation, nanoknife or cryoablation with liquid nitrogen), a local chemotherapy (e.g., chemoembolism), modulation of local metal ions (e.g., chelation of iron or copper, etc.), gene therapy, immunotherapy (e.g., a checkpoint inhibitor, such as an immunotherapy or antibody that selectively binds PD1 or PD-L1), or diet therapy.

The therapeutic peptide may be administered before, during, after, or in various combinations relative to an additional cancer therapy. The administrations may be in intervals ranging from concurrently to minutes to days to weeks. In embodiments where the therapeutic peptide is provided to a patient separately from an additional therapeutic agent, one would generally ensure that a significant period of time did not expire between the time of each delivery, such that the two compounds would still be able to exert an advantageously combined effect on the patient. In such instances, it is contemplated that one may provide a patient with the antibody therapy and the anti-cancer therapy within about 12 to 24 or 72 h of each other and, more particularly, within about 6-12 h of each other. In some situations it may be desirable to extend the time period for treatment significantly where several days (2, 3, 4, 5, 6, or 7) to several weeks (1, 2, 3, 4, 5, 6, 7, or 8) lapse between respective administrations.

IV. Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 10:
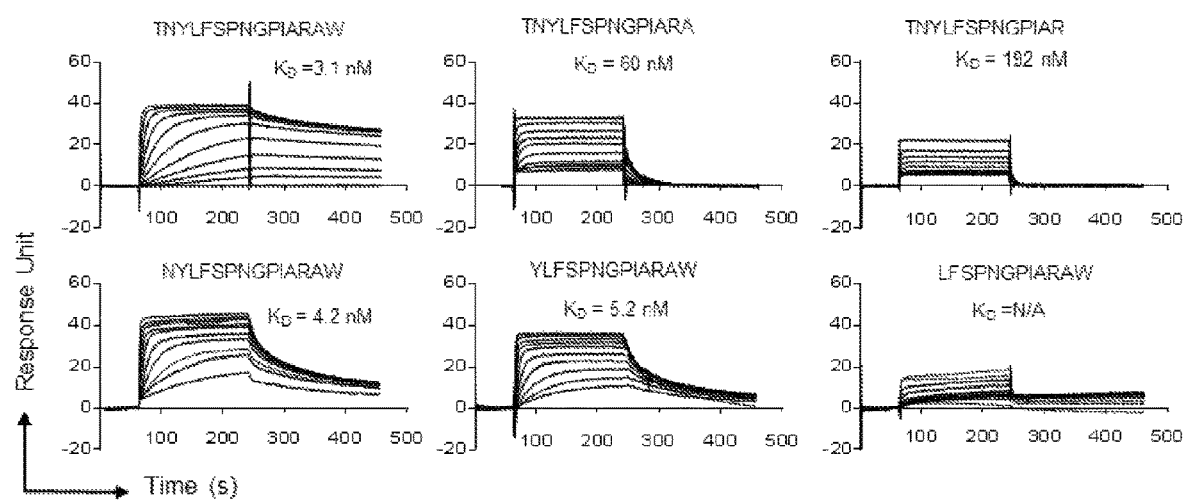
FIG. 10: BIACore sensorgrams of binding of truncated peptides to immobilized rhEphB4. Retention of a peptide on a sensor chip was indicated by a change in response units (RU) over the course of the 180-s injection interval followed by a 210-s washing interval. Peptides in concentrations of 1.6 nM to 800 nM were injected over the rhEphB4 sensor chip, and the magnitude of peptide binding to immobilized EphB4 was recorded. (TNYLFSPNGPIARAW=SEQ ID NO: 15; TNYLFSPNGPIARA=SEQ ID NO: 11; TNYLFSPNGPIAR=SEQ ID NO: 16.

Example 1—Substitution of L-Tyr with D-Tyr in TNYL-RAW (SEQ ID NO: 12) Peptide LED to Conversion from EphB4 Antagonist to EphB4 Agonist Surface plasmon resonance (SPR) was used to measure binding affinity of a small library of TNYL-RAW (SEQ ID NO: 12) analogues to purified EphB4. The resulting data revealed that truncation of C-terminus Trp-P15 and Ala-Trp (P14-P15) motifs progressively reduced the binding affinity of peptides to EphB4 (FIG. 10). This agrees with previous reports that the RAW motif is critical for fitting into the EFNB2 binding pocket of EphB4 (Chrenick et al., 2006b). However, the N-terminus Thr-P1 and Thr-Asn (P1-P2) motif could be truncated without affecting the binding affinity of peptides, suggesting that the two N-terminus amino acids Thr-Asn are not directly involved in receptor binding and therefore could be used as a site for conjugation of imaging probes or pharmacokinetic modifiers in diagnostic and therapeutic applications.

Next, a D-amino acid scan was performed, and it was discovered that substitution of Phe-P5 or Ser-P6 with their corresponding D-amino acids substantially decreased the binding affinity of the resulting peptides to EphB4. Substitution of Pro-P10 or Ile-P11 and double substitution of Pro-P7/Pro-P10 or Ala-P12/Ala-P14 with the corresponding D-amino acids completely abolished the binding affinity of the resulting peptides to EphB4 (FIG. 11). These data indicate that these P5 to P12 amino acids contain important contact points with the EphB4 receptor and are needed for maintaining high receptor binding affinity.

Figure 1A:
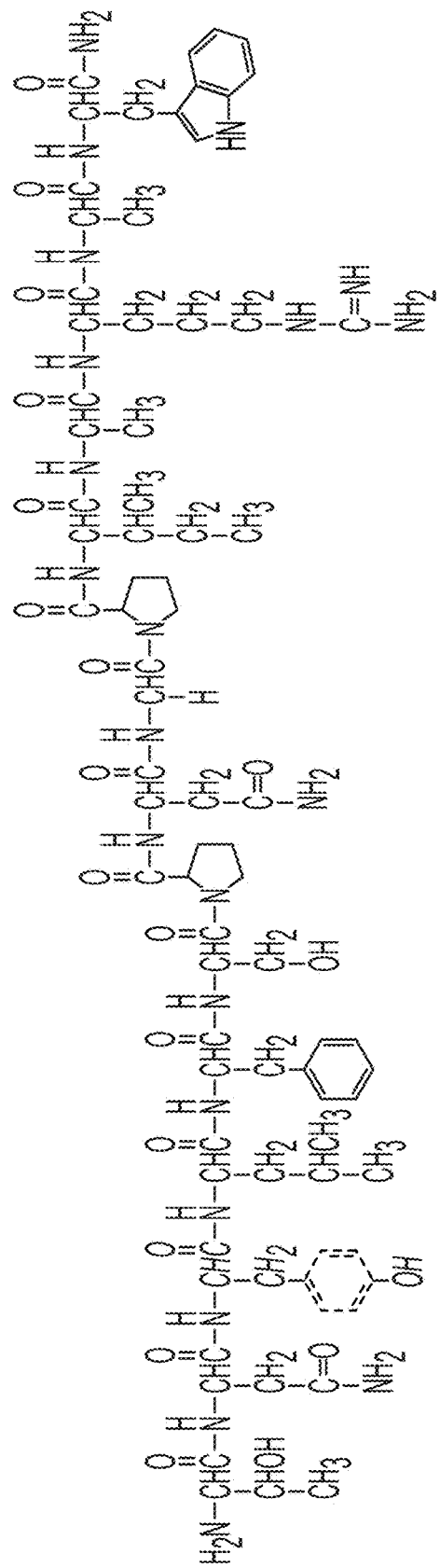
FIGS. 1A-D: Novel EphB4 agonist BIDEN-AP has high receptor binding affinity.
Figure 1C:
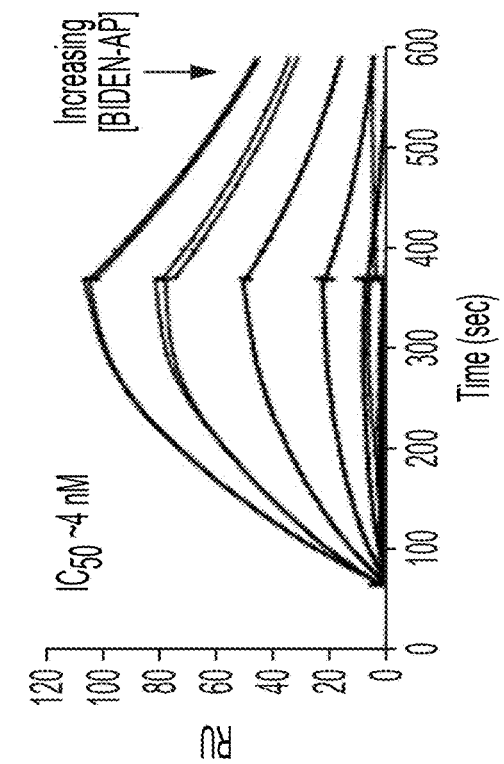
Figure 1B:
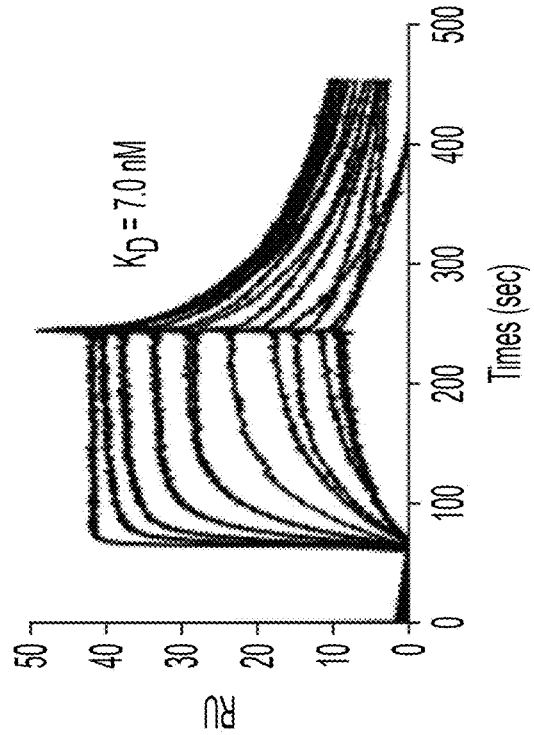
Figure 1E:
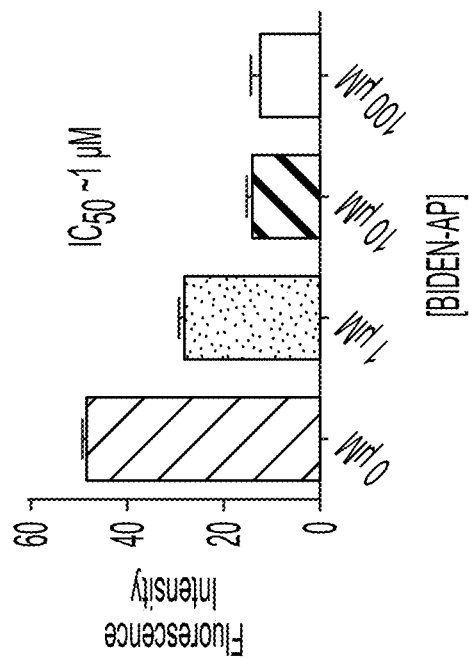
(FIG. 1E) Bound EFNB2-Fc as a function of BIDEN-AP concentration. Individual duplicates were performed in each condition. Data are presented as mean±SD.
Figure 1D:
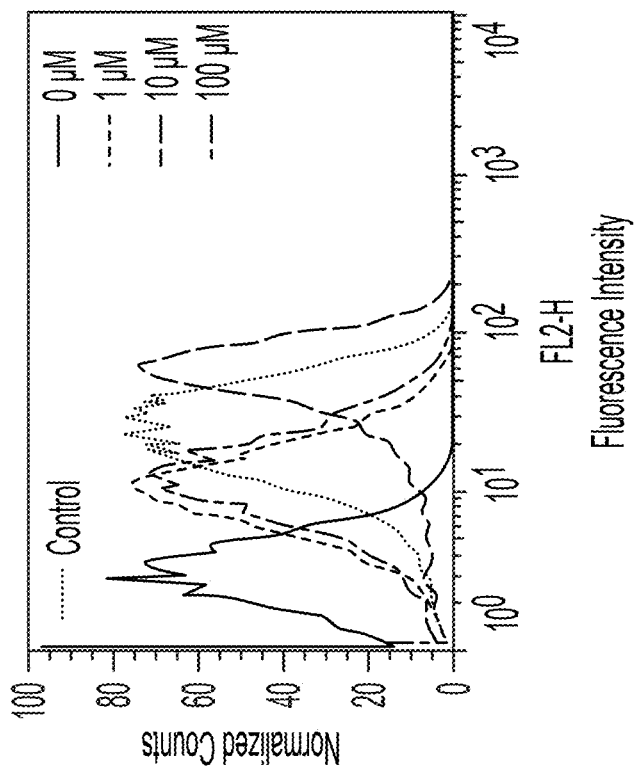

While studying the functional activity of TNYL-RAW (SEQ ID NO: 12) analogues with high EphB4 binding affinity, we discovered that one such analogue, TNd(Y) LFSPNGPIARAW (SEQ ID NO: 1), in which the L-Tyr-P3 was substituted by a D-Tyr, induced EphB4 phosphorylation in human HeyA8 ovarian cancer cells (FIG. 1A, FIG. 12, Table 1). Designated as BIDEN-AP, this peptide showed rapid association followed by slow dissociation from EphB4-coated sensor chips in the SPR assay. The dissociation constant ($K_D$) was estimated to be 7.0 nM after fitting of the datasets to a 1:1 mass transfer interaction model (FIG. 1B). The interaction relationship of BIDEN-AP and EFNB2 with EphB4 was studied by SPR, in which serial dilutions of BIDEN-AP were mixed with a fixed concentration of EphB4 and injected onto EFNB2-Fc-coated CM-5 chips. Sensorgrams show that the amount of EphB4 that bound to EFNB2-Fc decreased with increasing BIDEN-AP concentration. The 50% inhibition concentration of BIDEN-AP ($IC_{50}$) was estimated to be 4 nM (FIG. 1C). Thus, BIDEN-AP inhibited EphB4-EFNB2 interaction with high potency. At the cellular level, BIDEN-AP could effectively displace the binding between EFNB2-Fc and EphB4 on the surface of A2780cp20 cells, with an $IC_{50}$ value of ~1 µM (FIG. 1D, 1E). The higher $IC_{50}$ value in the cell-based assay than protein-based assay reflects the fact that EFNB2-Fc also binds to other Ephrin B class receptors (Pasquale, 1997; Himanen et al., 2001) and thus could not be completely displaced by BIDEN-AP. Collectively, these data indicate that BIDEN-AP and EFNB2 share the same EphB4 binding site.

TABLE 1

Peptides used in EphB4 phosphorylation screening

| Sequence | Samples | MW (Da) | $K_D$ (nM) |
|---|---|---|---|
| Cyclo (KTNYLFSPNGPIARAWD) (SEQ ID NO: 5) | B4-001 | 1932 | 4.4 |
| TNYLFSPNGPIA(dR)AW (SEQ ID NO: 6) | B4-002 | 1706 | 39 |
| *YSA-TNYL-RAW-dimer (SEQ ID NO: 7) | B4-003 | 3950 | 21 |
| TNY(dL)FSPNGPIARAW (SEQ ID NO: 8) | B4-004 | 1706 | 65 |
| TNYL(dF)SPNGPIARAW (SEQ ID NO: 9) | B4-005 | 1706 | 75 |

TABLE 1-continued

Peptides used in EphB4 phosphorylation screening

| Sequence | Samples | MW (Da) | $K_D$ (nM) |
|---|---|---|---|
| TNYLF(dS)PNGPIARAW (SEQ ID NO: 10) | B4-006 | 1706 | >1000 |
| TN(dY)LFSPNGPIARAW (SEQ ID NO: 1) | BIDEN-AP | 1706 | 7.0 |
| TNYLFSPNGPIARA (SEQ ID NO: 11) | B4-008 | 1518 | 13 |
| TNYL-RAW (SEQ ID NO: 12) | | 1706 | 3.1 |

*YSA = YSAYPDSVPMMS (SEQ ID NO: 13)

Figure 2A:
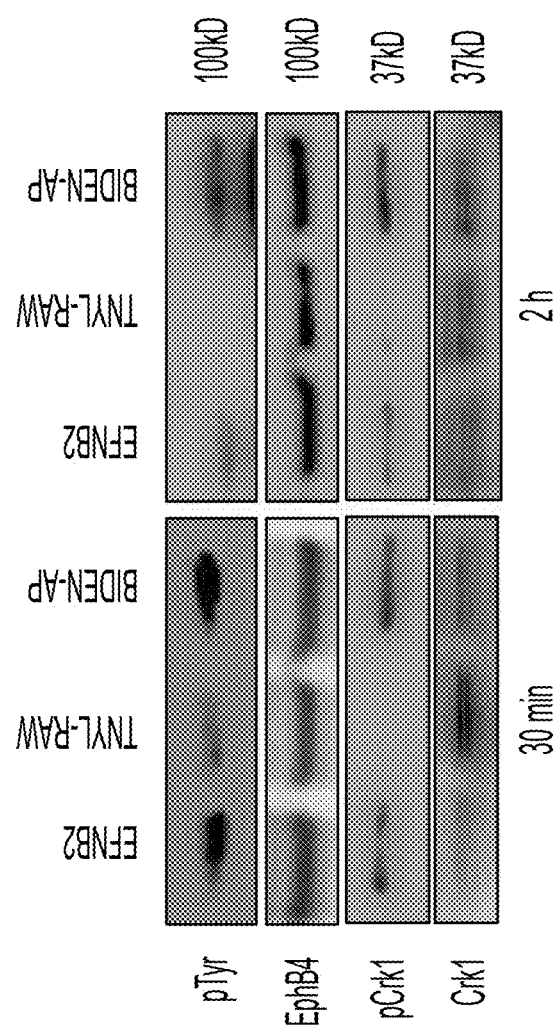
FIGS. 2A-C: BIDEN-AP acts as an EphB4 agonist.
Figure 2B:
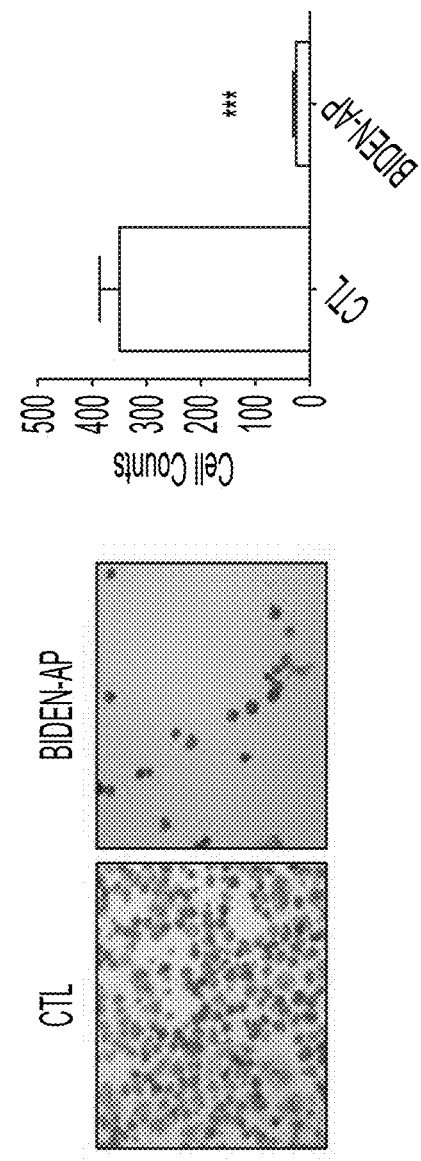
Figure 2C:
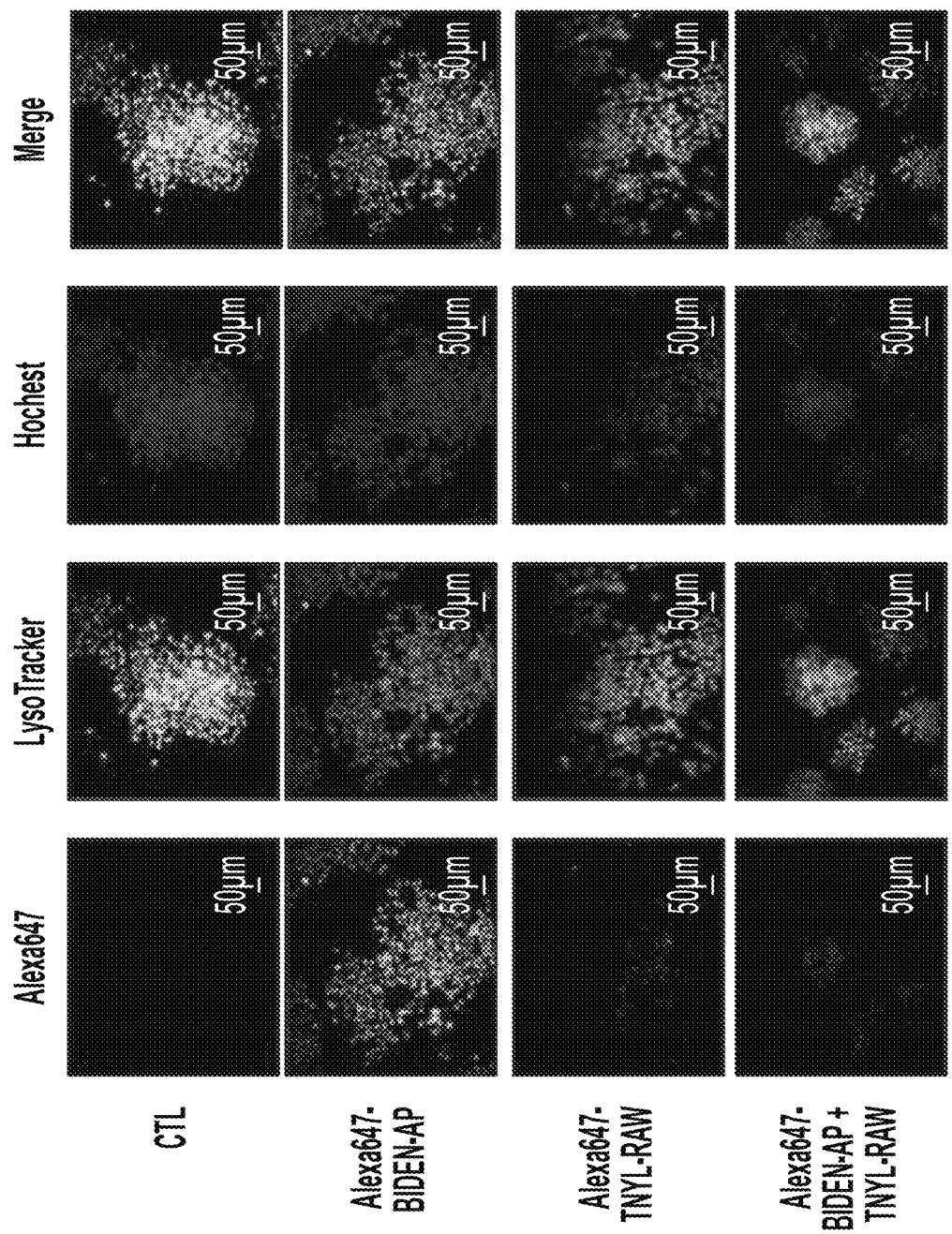

Next, the inventors tested the phosphorylation of EphB4 and its downstream adaptor protein Crk1 (MAPK14) in lysates from human ovarian cancer cells A2780cp20 by immunoprecipitation with anti-EphbB4 and anti-Crk1 antibodies followed by immunoblotting with phospho-specific antibodies. Similar to treatment with EFNB2, BIDEN-AP (but not TNYL-RAW (SEQ ID NO: 12)) increased phosphorylation of both EphB4 and Crk1 (FIG. 2A). Functionally, treatment with BIDEN-AP significantly reduced invasive properties of A2780cp20 cells compared with untreated control (FIG. 2B), suggesting a tumor suppressive property of BIDEN-AP. Alexa647-labeled BIDEN-AP was readily internalized by A2780cp20 cells at 37° C., as shown by confocal microscopic images, in which Alexa647-labeled BIDEN-AP co-localized with endo-lysosome marker Lysotracker. In comparison, Alexa647-labeled antagonist TNYL-RAW (SEQ ID NO: 12) was excluded. Internalization of Alexa647-BIDEN-AP by the A2780cp20 tumor cells were blocked by an excess of unlabeled TNYL-RAW (SEQ ID NO: 12) peptide, suggesting that the two peptides were competing for the same EphB4 binding site (FIG. 2C). The internalization experiment was also performed at 4° C., and no cellular internalization was observed (FIG. 13), suggesting that cellular uptake of BIDEN-AP is mediated by energy-dependent endocytosis. Collectively, these data indicate that BIDEN-AP is an EphB4 agonist, activating EphB4 through phosphorylation and receptor internalization.

To analyze the structural basis of functional switch from an antagonist to an agonist after substitution of a single L-amino acid with its corresponding D-amino acid, we performed computer simulations to model the interaction between BIDEN-AP and EphB4 based on the known crystal structure of TNYL-RAW (SEQ ID NO: 12)/EphB4 complex. Without wishing to be bound by any theory, this model suggests that Asn-P2 had minimal interaction with the receptor and that change in configuration of Asn-P2 did not change peptide binding significantly. Change in configuration of L-Tyr-P3 to D-Tyr-P3 resulted in loss of the interaction of the Tyr-P3 side chain with the pocket formed between the D, E, and M strands of the receptor. This allowed the DE loop of the receptor to be more flexible and moved toward agonist conformation to form Van Der Waal interactions with the ligand (FIG. 14A). Change in configuration of Leu-P4 did not affect the peptide-binding mode, as both L and D conformers occupied the same binding pocket. Significant change in orientation of Phe-P5 was observed when the Phe-P5 configuration was changed from L to D. The side chain of Phe-P5 moved opposite to the Leu95 residue in EphB4 and toward the side chain of Tyr-P3. To accommodate Phe-P5, Tyr-P3 moved slightly away from the pocket but kept the Van Der Waal interactions with the D, E, and M strands, resulting in loss of binding affinity. Change in configuration of Ser-P6 resulted in stearic clash with Tyr-P3 and loss of binding affinity. In addition, change in configuration of Pro-P7 and Pro-P10 resulted in a large conformational change in the backbone of the N-terminal residues and C-terminal residues of both TNYL-RAW (SEQ ID NO: 12) and BIDEN-AP peptides, which led to the loss of peptide interactions with the receptor. Ile-P11 of the peptide interacted with Leu95 of the receptor. Change in configuration of this amino acid introduced stearic clash at this site. This might explain the little to no binding affinity observed after modification with D-Ile-P11. As Trp-P15 is a terminal residue, the side chain has free rotation and binds to the receptor with a similar pose, indicating minimal change in binding affinity as well as activity. These modeling analyses agreed with our detailed SPR binding studies of peptides containing D-amino acids (FIG. 11).

Our computer modeling revealed that BIDEN-AP had the same orientation as TNYL-RAW (SEQ ID NO: 12) to fit into the EphB4 binding cleft (FIG. 14A). Substitution of L-Tyr-P3 with D-Tyr-P3 reduced steric clash at this site between the BIDEN-AP peptide and the receptor, leading to change in EphB4 conformation, which may have contributed to the switch of the peptide from an antagonistic to an agonistic function. The computational data also support the idea that BIDEN-AP's binding is specific for EphB4 because the peptide, similar to TNYL-RAW (SEQ ID NO: 12), fitted tightly into the binding cleft of the receptor (FIG. 14B), while other EphB receptors would have a steric restriction at the Leu95 site (i.e., Arg103 in EphB2 and other EphB receptors) (Chrencik et al., 2006), limiting the fitting of the peptide to their binding pocket. In support of these modeling results, we observed that BIDEN-AP bound only to EphB4, but not other B-class Eph receptors (FIG. 15).

Example 2—Conjugation of BIDEN-AP to Core-Crosslinked Polymeric Micelles (CCPM) Maintained its Binding to EphB4 and Agonistic Activity CCPM has been used to improve pharmacokinetics and enhance peptide stability for in vivo imaging applications (Yang et al., 2007; Zhang et al., 2011a; Zhang et al., 2011b; Zhao et al., 2012). The cross-linked core of CCPM prevents premature micelle disintegration, while the brush-like polyethylene glycol forms a dense protective layer on the micelle surface that minimizes micelle uptake by the organs of the mononuclear phagocytic system. CCPM-TNYL-RAW (SEQ ID NO: 12) displayed 4-fold higher systemic exposure than TNYL-RAW (SEQ ID NO: 12) (area-under-the time curve [AUC]=138% ID h/mL versus 29.1% ID h/mL), mainly as a result of significantly slower systemic clearance (Zhang et al., 2011b). We therefore synthesized CCPM-BIDEN-AP using a two-step reaction scheme (FIG. 3A). The resulting conjugate retained the binding affinity to EphB4 (FIG. 3B). The mean diameter of CCPM-BIDEN-AP was determined by transmission electron microscopy (TEM) to be 24±3 nm (FIG. 3C). Similar to BIDEN-AP, CCPM-BIDEN-AP exhibited potent agonist activity as evidenced by its ability to induce EphB4 and Crk1 phosphorylation in vitro in A2780cp20 cells (FIG. 16A) and in vivo in orthotopic A2780cp20 tumors (FIG. 16B).

Example 3—BIDEN-AP-Based Agents Reduced the Angiogenic Properties of Endothelial Cells and Sensitized Endothelial Cells Resistant to Anti-VEGF Agents to Cell Death We next determined the potential of BIDEN-AP in blocking the reverse EFNB2 signaling in endothelial cells. Using RF24 endothelial cells, our results from a scratch assay indicated that BIDEN-AP but not TNYL-RAW (SEQ ID NO: 12) (both 50 μM) significantly inhibited cell migration compared to untreated controls (FIG. 17). Further, both BIDEN-AP and EFNB2-Fc significantly inhibited the formation of capillary-like tubes from RF24 cells (FIGS. 4A-B). Therefore, our data showed the potential of BIDEN-AP in compromising angiogenic property of endothelial cells by interfering with reverse EphB4-to-EFNB2 signaling.

Given the important role of endothelium in adaptive changes with anti-angiogenic therapy (Bergers et al., 2008), we further tested the effects of BIDEN-AP in overcoming resistance to anti-VEGF therapy in RF24 cells. To do this, we first established a bevacizumab (Bev)-resistant RF24 cell line selected though continuous Bev treatment at low dose (5 μg/μL) for 2 weeks. The Bev-resistant RF24 cells were maintained at a Bev concentration of 1.0 μg/μL. Using flow cytometry with SYTOX-green staining, we quantified the live (SYTOX-negative) vs. dead (SYTOX-positive) populations after treatment with BIDEN-AP or CCPM-BIDEN-AP. The results showed that interfering in EphB4-to-EFNB2 signaling with either BIDEN-AP or CCPM-BIDEN-AP resensitized these cells to Bev treatment (FIGS. 4C-D).

Example 4—BIDEN-AP and CCPM-BIDEN-AP Displayed Potent Inhibitory Effects on Tumor Growth and EMT in Orthotopic Human A2789cp20-Luc Ovarian Cancer Xenograft Model The antitumor activity of BIDEN-AP and CCPM-BIDEN-AP was examined next using an orthotopic, luciferase-labeled A2780cp20-Luc ovarian cancer model. Both agents significantly reduced the bioluminescence signal intensity of A2780cp20-Luc on day 28 after initial inoculation (FIGS. 5A-C). Both agents significantly reduced tumor growth in the peritoneum compared to controls on the basis of tumor weight and number of metastatic nodules at day 31 after tumor inoculation (FIG. 5D). Furthermore, CCPM-BIDEN-AP reduced metastatic nodules to a greater extent than BIDEN-AP (FIG. 5E). In comparison with untreated control tumors, immunofluorescence co-staining using anti-mouse CD31 antibody and TUNEL on the excised A2780cp20 tumors revealed that both BIDEN-AP and CCPM-BIDEN-AP induced apoptotic cell death in CD31V endothelial vasculature within tumor stroma; suppressed angiogenesis in tumors as indicated by decreased microvessel density (MVD) (FIGS. 6A-C); and significantly reduced tumor cell proliferation, as evidenced by the decreased number of Ki67-positive cells (FIGS. 6D-E). As EMT is characterized by downregulated epithelial cadherin (E-cadherin) expression and upregulated vimentin and neural cadherin (N-cadherin) expression (Yang and Weinberg, 2008), and results in increased cell invasion, metastasis, and drug resistance (Lamouille et al., 2014), we also determined the key EMT factors from the excised tumors and observed that BIDEN-AP significantly reduced expression of vimentin, Twist, and Snail1 at the mRNA level and vimentin at the protein level in A2780cp20 tumors (FIGS. 7A-B).

To better understand the mechanism of BIDEN-AP's action, we compared protein expression profiles of the resulting A2780cp20-Luc tumors harvested from mice that were treated with BIDEN-AP or untreated control. Integrated pathway analysis of reverse-phase protein array data showed that: 1) regulation of EMT was among the top pathways downregulated by BIDEN-AP, and 2) important regulators involved in tumor-associated angiogenesis, including EGFR, VEGFR2, GAB2, and JAK2, were significantly downregulated by BIDEN-AP, suggesting that the activity of receptor tyrosine kinase-mediated signal transduction pathways EGFR/MAPK14(Crk1)/JAK2, were decreased by BIDEN-AP-based therapy. The proapoptotic proteins p53, Bax, and Bid, and the autophage-related proteins Atg7 and Rictor were significantly upregulated (FIG. 7C, FIG. 18, and Table 2), which implicated potential mechanisms for their anti-tumor effects.

TABLE 2

Major pathways and factors regulated by BIDEN-AP

| | p-value |
|---|---|
| Top Canonical Pathways (Downregulated) | |
| Regulation of the EMT pathway | $4.86 \times 10^{-9}$ |
| VEGFR-regulated endothelial cell signaling | $3.16 \times 10^{-8}$ |
| Ovarian cancer signaling | $1.52 \times 10^{-7}$ |
| Top Regulators (downregulated) | |
| EGFR | $3.18 \times 10^{-17}$ |
| VEGFR2 | $2.78 \times 10^{-17}$ |
| GAB2 | $1.40 \times 10^{-16}$ |
| JAK2 | $6.00 \times 10^{-17}$ |
| Top Regulators (upregulated) | |
| TP53 | $9.06 \times 10^{-15}$ |
| BAX | $5.42 \times 10^{-7}$ |
| BID | $7.86 \times 10^{-8}$ |
| ATG7 | $5.92 \times 10^{-8}$ |
| RICTOR | $5.47 \times 10^{-3}$ |

These results were obtained from integrated pathway analysis by comparing reverse-phase protein array data from A2780cp20-Luc tumors treated with BIDEN-AP with untreated groups (Control). The p values associated with each pathways in Ingenuity Pathway Analysis were calculated using the right-tailed Fisher Exact Test, and the most significant ones were displayed in this table.

Example 5—BIDEN-AP Displayed Antitumor and Anti-Angiogenic Effects on Subcutaneous Patient-Derived Xenograft (PDX) Model of Ovarian Cancer BIDEN-AP as a single agent delayed the growth of a well-established, subcutaneously implanted MDA-HGSC-1 PDX tumor from patient with high-grade serous carcinoma (HGSC) (FIG. 8A). At the end of the study (28 days after initiation of treatments), the tumor weights were 461±286 mg$^3$ and 220±164 mg$^3$ for PBS and BIDEN-AP-treated mice, respective (p=0.10, Student's t test) (FIG. 8B; FIG. 19A). On the other hand, BIDEN-AP did not result in body weight change compared to mice in the control group (FIG. 19B). Immunofluorescence co-localization analysis showed that EphB4 was expressed in both tumor vasculature and tumor cells in the MDA-HGSC-1 PDX model (FIG. 8C). Tumor cell proliferation was significantly reduced (p<0.001) by BIDEN-AP treatments (FIG. 8D). Thus, BIDEN-AP showed an important potential as a monotherapy against clinically relevant HGSC-PDX tumor.

Dual function of EphB4 as tumor promoter or suppressor associated with its EFNB2 ligand opens a therapeutic window for modulating EphB4 activity in tumor cells (Rutkowski et al., 2012). While exploring the effects of structural modifications to the binding affinity of EphB4 antagonist TNYL-RAW (SEQ ID NO: 12) peptide (Koolpe et al., 2005; Riedl and Pasquale, 2015), the inventors unexpectedly found that substitution of L-Tyr-P3 with D-Tyr-P3 led to a functional switch from EphB4 antagonist to EphB4 agonist. Unlike EphB4's natural ligand EFNB2, which binds to several receptors within the B subclass (Chrencik et al., 2006; Himanen et al., 2001), the EphB4 agonist peptide, BIDEN-AP, exclusively bound to EphB4. Further experiments indicated that both BIDEN-AP and its nano-conjugate, CCPM-BIDEN-AP, promoted forward, tumor-suppressive EphB4 signaling both in vitro and in vivo, blocked the reverse signaling by interfering interaction between EphB4 and its natural ligand EFNB2 in endothelial cells, therefore suppressed their angiogenic properties, and sensitized Bev-resistant endothelial cells to cell death. Furthermore, monotherapy with BIDEN-AP or CCPM-BIDEN-AP demonstrated significant anti-tumor effects and anti-angiogenic activity in an orthotopic human ovarian cancer model and was active against tumor growth in an HGSC-PDX model.

Our functional studies showed that internalization of BIDEN-AP was blocked by a large excess of TNYL-RAW (SEQ ID NO: 12) peptide, suggesting that both peptides compete for the same EphB4 binding pocket. Further study showed that BIDEN-AP also competed with EFNB2-Fc for binding to EphB4. Given that X-ray crystallography studies have shown that TNYL-RAW (SEQ ID NO: 12) and the receptor binding site of EFNB2 fit into the same binding pocket in EphB4 (Chrencik et al., 2006a; Chrencik et al., 2006b), we conclude that BIDEN-AP, like TNYL-RAW (SEQ ID NO: 12), also fit into the same binding pocket in EphB4.

Using the X-ray structure of TNYL-RAW (SEQ ID NO: 12) bound to human EphB4 as a structural guide (Chrencik et al., 2006), we generated binding modes for BIDEN-AP in the binding pocket of EphB4 for both EFNB2 and TNYL-RAW (SEQ ID NO: 12) (Chrencik et al., 2006a; Chrencik et al., 2006b). In comparing EphB4-TNYL-RAW (SEQ ID NO: 12) and EphB4-BIDEN-AP, the inventors observed significant deviation throughout the structure of the receptor loop regions. Dynamic modeling of the binding mode of BIDEN-AP revealed a hydrogen bonding network that closely resembled that observed in the EphB4-EFNB2 crystal structure. On the basis of these computational modeling studies, we believe that the loss of interaction of the Tyr-P3 side chain with the D, E, and M strands of the receptor might be responsible for this drastic change in functional activity. The computational model also supported that change in conformation of the DE loop might be involved in determining the activity of the ligand and the response of the receptor (Chrencik et al., 2006b). These results highlight how structural modifications may affect functional activity, as substitution of a single amino acid from an L- to a D-form resulted in transformation to a 15-mer peptide that had a completely different functional response.

N-terminal Tyr-P3 of the antagonist peptide may be required for high-affinity binding as well as for efficient antagonistic properties, whereas residues such as Leu-P4, Phe-P5, and C-terminal residues Ile-P11 and Trp-P15 may form favorable interactions with Leu95 of the EphB4 receptor and play important roles in specificity (Chrencik et al., 2006a). The interactions of the peptides with Leu95 of the receptor are unique to EphB4. The corresponding strictly conserved residue Arg-103 in other members of the EphB receptor subclass would form steric clashes with ligand atoms. Therefore, our computational data aligned consistently with our experimental conclusion that BIDEN-AP bound selectively to EphB4.

Figure 9:
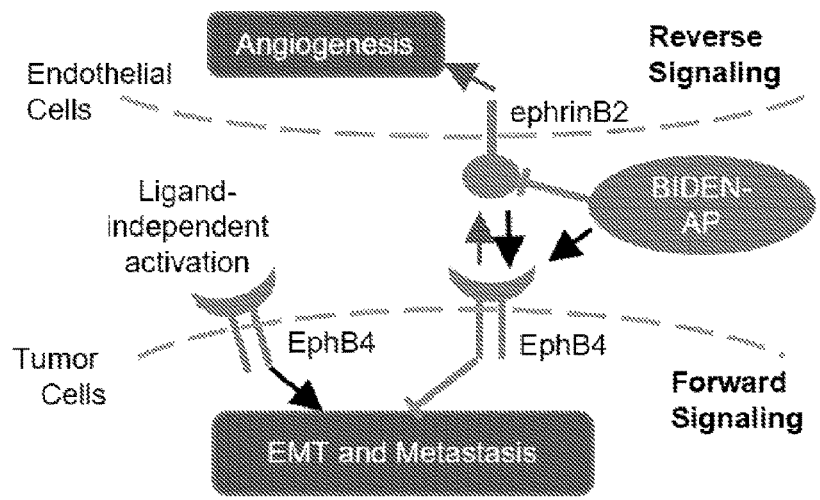
FIG. 9: Proposed mechanism of action of BIDEN-AP. Schematic representation of the mechanisms of action by which BIDEN-AP based therapy interfered bi-directional signaling activities between EphB4 and its membrane-bound ligand EFNB2, which led to suppresses proliferation and metastasis of tumor cells and comprise angiogenesis in surrounding endothelial cells.

Previous work reported the use of monoclonal antibodies, soluble fusion proteins, and small-molecule kinase inhibitors to inhibit the reverse EphB4-to-EFNB2 signaling, which promotes angiogenesis (Kertesz et al., 2006; Abéngozar et al., 2012; Stephenson et al., 2015; Martiny-Baron et al., 2004). At present, a drug targeting EphB4-EFNB2 protein-protein interaction, based on the recombinant soluble EphB4-human serum albumin fusion protein (sEphB4-HSA), has advanced to phase I clinical testing (NCT02495896) (Tognolini et al., 2013; Djokovic et al., 2010). sEphB4-HAS could inhibit the activity of VEGF (Scehnet et al., 2009), and does not activate forward EphB4 signaling. Previous knowledge suggested that, in the absence of functional forward signaling, a ligand-independent mechanism may induce tumorigenesis in tumors with a high level of EphB4 expression (Mertens-Walker et al., 2015; Herington et al., 2014). For example, a kinase-deficient EphB4 mutant was still capable of increasing breast cancer cell growth (Noren and Pasquale, 2007). Collectively, BIDEN-AP and its nano-conjugate CCPM-BIDEN-AP represent a new class of agents that can effectively suppress tumor growth by promoting ligand-dependent forward EphB4 signaling in tumor cells and reduce angiogenesis by inhibiting reverse EFNB2 signaling in tumor-associated endothelial cells (FIG. 9).

In summary, these studies provide comprehensive evidence to support the use of BIDEN-AP for targeting bi-directional EphB4/EFNB2 signaling to reduce tumor growth, metastasis and/or overcome acquired resistance to antiangiogenic therapy. These results illustrate the potential for modulating the EphB4/EFNB2 protein interfaces and their mode of interaction.

Example 6—Antitumor and Antimetastatic Activity of BIDEN-AP Peptide In Vivo

A mouse model of breast cancer was used in experiments to test if the BIDEN-AP peptide (TNd(Y)LFSPNGPIA-RAW; SEQ ID NO: 1) would display anticancer effect(s) in vivo. In orthotopic murine 4T1 TNBC model, BIDEN-AP as a single agent significantly delayed tumor growth (FIGS. 24A-C). BIDEN-AP also significantly reduced microvessel density (FIG. 24D, FIG. 24E). These results demonstrate that BIDEN-AP displays high antitumor and anti-metastatic activity using this breast cancer model in vivo.

To investigate whether BIDEN-AP displays anti-metastatic activity, 4T1 cells were injected intravenously (i.v.) into female Balb/c mice. BIDEN-AP was given at the same dose and the same schedule as in FIG. 24A. Treatments with BIDEN-AP significantly reduced the number of metastatic nodules in the lung compared to untreated control (FIGS. 25A-B). Thus, BIDEN-AP is highly anti-metastatic. BIDEN-AP was also well-tolerated: there were no cases of treatment-related death or change in body weight throughout these in vivo studies. These results demonstrate that BIDEN-AP results in anti-metastatic and anti-cancer effects in vivo, and these data support the clinical administration of BIDEN-AP to treat cancer.

Example 7—Materials and Methods

Cell lines. Cells were maintained in 5% $CO_2$, 95% air at 37° C. Ovarian cancer HeyA8 and cisplatin-resistant A2780Cp20 cells were maintained in Roswell Park Memorial Institute (RPMI) 1640 medium with 15% heat-inactivated fetal bovine serum (FBS) plus 0.5% gentamicin as described previously (Sood et al., 2001; Thaker et al., 2004). All cell lines were routinely tested to confirm the absence of Mycoplasma (Gen-Probe detection kit; Thermo Fisher Scientific, Carlsbad, CA) and were validated by the MD Anderson Cancer Center Characterized Cell Line Core Facility. All in vitro experiments were conducted with 60-80% confluent cultures.

RF24 endothelial cells were a kind gift of Arjan W. Griffioen (Maastricht University Hospital, Maastricht, The Netherlands) and were validated by Short tandem repeat profiling (van Beijnum et al., 2008). RF24 cells were maintained in modified essential medium (MEM) supplemented with 10% FBS, sodium pyruvate, MEM vitamins, L-glutamine, and MEM non-essential amino acids.

Cell-based binding assay. A2780cp20 ovarian cancer cells ($1 \times 10^6$ cells/mL) were incubated with EFNB2-Fc (20 nM) and BIDEN-AP at concentrations ranging from 0 to 100 µM at 25° C. for 1 h. After washings, EFNB2-Fc bound to the cells were probed with PE-labeled anti-Fc antibody and analyzed by flow cytometry. Binding of BIDEN-AP to A2780cp20 cells was determined by its ability to displace EFNB2-Fc's binding to the tumor cells, measured by decreased PE fluorescence signal. Cells were analyzed in a Cellquest fluorocytometer (BD Bioscience, San Jose, CA). The experiments were run in duplicate.

ELISA binding assay to EphB class receptors. An ELISA assay was performed according to manufacturer-provided protocols. Briefly, biotinylated BIDEN-AP was immobilized on streptavidin-coated 96-well plates (Pierce, Waltham, MA) at a concentration of 10 µM. After washings, wells were incubated with Eph ectodomain proteins EphB1, EphB2, EphB3, EphB4, or EphB6 fused with Fc (2.5 µg/mL) in binding buffer (0.5% bovine serum albumin [BSA] in PBS) at room temperature for 1 h. The plates were washed again with binding buffer, and bound receptors were detected using an anti-Fc antibody coupled to alkaline phosphatase (Promega, Madison, Wis.), followed by addition of p-nitrophenyl phosphate as the substrate (Pierce). The signals were measured at 405 nm. Alkaline phosphatase activity from wells without EphB-Fc was subtracted as background. All signals were normalized to the value measured with EphB4-Fc.

Modeling BIDEN-AP-EphB4 binding. The crystal structure of the peptide antagonist (TNYL-RAW (SEQ ID NO: 12)) bound to EphB4 (Protein Data Bank ID: 2BBA) was imported into the Molecular Operating Environment (MOE) 2016 software (Chemical Computing Group, Montreal, Canada). Structure preparation wizard was used with default settings to add missing atoms and partial charges. Energy was minimized by using default settings. The configuration of each amino acid of the antagonist peptide was changed from L to D serially using MOE's Protein Builder tool. The resulting complexes were energy-minimized using default settings.

Invasion assays. The membrane invasion culture system chamber, a modified Boyden transwell chamber, was used to measure the invasive potential of all cell lines used in this study. A2780cp20 tumor cells ($7.5 \times 10^4$) treated with BIDEN-AP or TNYL-RAW (SEQ ID NO: 12) or untreated were suspended in 100 µL serum-free medium and were added into the upper chamber, which was pre-coated with human defined matrix composed of type IV collagen (Sigma C6745), human laminin (Sigma L6274), gelatin (Sigma G1393), and PBS (Landen et al., 2005). Complete medium containing 10% FBS (500 µL) was added to the bottom chamber as a chemoattractant. The chambers were incubated at 37° C. in 5% $CO_2$ for 24 h. After incubation, the cells on the inner side of the upper chamber were removed with cotton swabs. The cells on the outside of the upper chamber, the invaded cells, were fixed, stained, and counted by light microscopy. Cells from five random fields were counted.

Endothelial cell migration assay. RF24 cells were seeded in a 6-well plate (Corning Inc., Corning, NY), $2.5 \times 10^5$ cells/well in 2.5 mL modified essential medium (MEM) supplemented with 10% FBS. Cells were serum-starved for 24 h when they reached about 90% confluency. The cell monolayer was scratched with a sterile pipet tip to make a "wound." The growth medium was then removed and the cell layer was washed three times with serum-free medium to remove the detached cells. MEM medium (0.5% FBS) alone (control) or the medium plus either TNYL-RAW (SEQ ID NO: 12) or BIDEN-AP at a concentration of 50 µM was added to each pre-designed well, and the cells were incubated. The width of the scratch was documented by microphotograph at 6 h. The percentage of the wounded area was measured and calculated by using ImageJ Version 1.51 (National Institutes of Health, Bethesda, Md.). Experiments were performed in 7 replicates. The data are expressed as mean±SD.

Assay of tubule formation of immortalized endothelial cells. Matrigel (Becton Dickinson, Bedford, MA) was used to assess formation of capillary-like structures by RF24 cells on a basement membrane. Twelve-well Costar plates (Corning, Corning, NY) were coated with Matrigel (10 mg/mL) according to the manufacturer's instructions. RF24 ($1.0 \times 10^4$ cells/well) were seeded on Matrigel-coated plates and incubated at 37° C. for 60 min. EFNB2-Fc (2 nM) or BIDEN-AP (15 µM) was added, and the cultures were incubated at 37° C. for 24 h. In vitro endothelial tubule formation was observed and photographed after 24 h as described previously (Pecot et al., 2013). Five images per treatment were taken at ×100 magnification. The nodes (defined as when at least three cells formed a single point) in each image were counted. The degree of tubule formation was determined by counting the number of nodes. Data are expressed as a percentage of the number of tubes in untreated control wells.

Orthotopic ovarian cancer models. Mice were cared for in accordance with guidelines set forth by the American Association for Accreditation of Laboratory Animal Care and the US Public Health Service Policy on Human Care and Use of Laboratory Animals. Female athymic nude mice (NCr-nu) were obtained from Harlan Laboratories (Indianapolis, IN) at age 4 to 6 weeks and kept under sterile conditions. For all therapeutic experiments, groups of the mice (n=8-10) were inoculated intraperitoneally with A2780cp20-Luc cells. The mice were treated with BIDEN-AP or CCPM-BIDEN-AP at a dose of 13 mg equivalent drug/kg per injection for a total of 10 doses every other day starting on day 7 after tumor cell inoculation. Untreated mice were used as a control. On day 31, all mice were euthanized and necropsied, and their tumors were harvested. Tumor weight and number and location of tumor nodules were recorded. Tumor tissue was either fixed in formalin for paraffin embedding, frozen in optimal cutting temperature medium for frozen slide preparation, or snap-frozen for lysate preparation.

PDX model of high grade serous ovarian carcinoma (HGSC). Under Institutional Review Board (IRB protocol PA15-0441) and IACUC approval at University of Texas, MD Anderson Cancer Center, patients with high-serous ovarian carcinoma that were being treated by at the MD Anderson Cancer Center were consented for this study. Subcutaneous HGSC-PDX model was established in 4-6 week old female Balb C athymic nude mice (Harlan Laboratories, Indianapolis, Ind.) by implanting one PDX 3×3×3 mm tumor cube (MDA-HGSOC-1 high-grade serous ovarian cancer; generation 9) at the dorsal portion of each mouse. Tumor size was monitored by caliber, and tumor volume was calculated using the formula $V(cm^3)=(length \times width^2)/2$. Mice were randomly assigned to the PBS vehicle control or BIDEN-AP treatment group, 6 mice per group, once tumor size reached ~100 mm³ (21 days after implantation). PBS or BIDEN-AP was injected intraperitoneally at 300 g/injection (100 L/injection), once every other day for a total of 14 doses. At the end of the study (day 49), all mice were euthanized, and tumors were collected, weighted, and snap-frozen in optimal cutting temperature compound with liquid nitrogen, and cryosectioned into 5-µm sections for IHC staining of CD31 and Ki67 markers.

Bioluminescence imaging. On day 7, day 14, day 21, and day 28 after tumor inoculation, mice received a tail vein injection of D-luciferin (4 mg/kg). Tumor burden as assessed by luciferase activity was assessed using the Xenogen IVIS-200 imaging system (Perkin Elmer, Shelton, CT). The bioluminescence imaging signal generated in mice was quantified using Living Image V.2.11 software and IGOR image analysis software (V.4.02 A; WaveMetrics, Portland, OR). The region of interest was manually selected, and the signal intensity was expressed in terms of the number of photons/s/cm²

Statistical analysis. In general, all in vitro experiments, including cell proliferation, viability, migration, and invasion, unless stated otherwise, were done in triplicate. For all in vivo experiments, the tumor weight and number of metastatic nodules were analyzed by one-way analysis of variance, and groups were compared by independent sample t-test. The SPSS statistical software (IBM, Armonk, NY) was used. All data are presented as mean±standard deviation (SD) unless otherwise indicated. Differences were considered statistically significant if $p<0.05$.

Materials All amino acid derivatives and coupling reagents were purchased from Novabiochem (San Diego, CA), Bachem (Torrance, CA), or Chem-Impex International (Wood Dale, Ill.). All other chemicals were purchased from Sigma-Aldrich (St. Louis, MO). Reagent-grade solvents were used without further purification unless otherwise specified. Recombinant EphB4/Fc chimera, phycoerythrin (PE)-conjugated rat anti-human EphB4 monoclonal antibody, and rabbit anti-EphB4 antibody were purchased from Santa Cruz Biotechnology (Santa Cruz, CA). The BIACore sensor chip CM5, amine coupling kit, HBSEP running buffer (0.01 M [4-(2-hydroxyethyl)-1-piperazineethanesulfonic acid] [HEPES], pH 7.4, 0.15 M NaCl, 3 mM ethylenediaminetetraacetic acid [EDTA], and 0.005% [v/v] surfactant P20 solution), and regeneration buffer were purchased from BIACore, Inc. (Piscataway, NJ). Human EphB4 and murine EphB4, EphB1, EphB2, EphB3, and EphB6 were purchased from R&D Systems (Minneapolis, MN). Phycoerythrin-labeled anti-Fc antibody and EFNB2-Fc were obtained from Sino Biological (Beijing, China).

Peptide synthesis. Solid phase syntheses were carried out on the automatic peptide synthesizer Prelude (PTI, Tucson, AZ) using Rink resin (Novabiochem). The resin (0.05-0.1 g) was swollen and washed with 5×1.5 mL of dimethylformamide (DMF)/methylene chloride ($CH_2Cl_2$). Fluorenylmethyloxycarbonyl (Fmoc) groups were removed with 3×1.5 mL of 20% piperidine/DMF for 5 min each. For coupling, three-fold excesses of Fmoc-amino acids, diisopropylcarbodiimide, and 1-hydroxybenzotriazole in 3 mL of DMF/

CH$_2$Cl$_2$ were used. This procedure was repeated once. After coupling and deprotection steps, resins were washed with 3×3 mL of DMF/CH$_2$Cl$_2$. On completion of the peptide chain elongation, resins were washed with 3×3 mL of CH$_2$Cl$_2$ and were treated with trifluoroacetic acid:triisopropylsilane:H$_2$O (95:2.5:2.5) for 15 min each. The combined filtrates sat at room temperature for 1-2 h, and the volumes were reduced in a vacuum. Peptides were precipitated in ice cold ethyl ether, collected by centrifugation, washed two times with ethyl ether, and subjected to centrifugation. After drying, peptides were purified by reverse-phase high-performance liquid chromatography (HPLC) on an Agilent 1200 system (C-18, Vydac, 10×250 mm, 10 μm; Santa Clara, CA). Alexa647-coupled TNYL-RAW (SEQ ID NO: 12) or BIDEN-AP were obtained by solution phase reaction of the respective peptide with Alexa647-N-hydroxysuccinate (Alexa647-NHS), followed by HPLC purification.

CCPM-BIDEN-AP conjugation. CCPM with amine functionalized surface was synthesized according to reported procedures (Koolpe et al., 2005). To introduce a maleimide group to the CCPM, an aliquot of N-(γ-maleimidobutyryloxy)-succinimide ester) (GMBS) in DMF (22.5 mL, 7 mmol/mL, 0.16 mmol) was added into the CCPM (250 mL, 2.6 nmol nanoparticles) in 1.2 mL of phosphate-buffered saline solution (PBS, pH 8). The mixture was stirred for 3 h at 37° C. The product was purified using a PD-10 column to remove unreacted GMBS. To introduce a sulfhydryl group to BIDEN-AP, the amino acid cysteine was conjugated to the N-terminal amine of BIDEN-AP. The resulting sulfhydryl-containing Cys-BIDEN-AP was mixed with 2 mL of a solution of CCPM-maleimide (0.16 mmol equivalent maleimide) in PBS with a 2:1 molar ratio of Cys-BIDEN-AP to maleimide groups (CCPM). The solution was stirred for 12 h at 4° C. and then purified using a fast protein liquid chromatography system (Amersham Pharmacia Biotech, Uppsala, Sweden) equipped with a G200 column and an ultraviolet light detector (254 nm). The column was eluted with PBS to remove unreacted Cys-BIDEN-AP. The unreacted Cys-BIDEN-AP was quantified on an Agilent 1100 Series LC/MSD-TOF instrument equipped with a Vydac C18 column. The molar ratio of BIDEN-AP to CCPM was calculated on the basis of Cys-BIDEN-AP consumed (total Cys-BIDEN-AP minus remaining Cys-BIDEN-AP). The size of CCPM-BIDEN-AP was determined by transmission electron microscopy (TEM). Briefly, a drop of aqueous sample solution was placed on a 400-mesh copper grid coated with 0.5% poly(vinyl formal) aqueous solution (w/w). A droplet of 1% uranyl acetate solution was added for negative staining. The sample was air-dried and examined with a JEM 1010 transmission electron microscope (JEOL USA, Inc., Peabody, MA) at an accelerating voltage of 80 kV. Digital images were obtained using the AMT Imaging System (Advanced Microscopy Techniques Corp., Danvers, MA).

Surface plasmon resonance (SPR) binding and competition assays. A stock solution of EphB4 in PBS (100 μg/mL) was diluted to 25 μg/mL with 10 mM sodium acetate buffer (pH 4.5) and immobilized to CM5 sensor chips using the amine coupling reaction according to manufacturer-provided procedures (BIACore). Briefly, the surfaces of the chips in flow cells (FC)-1 and FC-2 were activated by exposing chips to a mixture of 200 mM N-ethyl-N'-dimethylaminopropyl carbodiimide and 50 mM N-hydroxysuccinimide for 7 min. FC-1 was used as a reference surface and was directly deactivated by injecting 1 M ethanolamine at pH 8.5 for 7 min. FC-2 was injected with 25 μg/mL human or murine EphB4 followed by injection of 1 M ethanolamine to block the remaining activated ester groups on the surface. The chips were allowed to stabilize for at least 2 h in HBSEP running buffer before injection of test analytes.

Binding assays were performed in duplicate at 25° C. in HBSEP running buffer. Test peptides were diluted in HBSEP buffer, filtered, degassed, and injected at serially doubled concentrations, from 1.6 nM to 800 nM, at a flow rate of 30 μL/min. The injection time of test peptides into the HBSEP buffer was 7 min, followed by a 3-min dissociation period. The chips were regenerated using a 30-s pulse of 10 mM glycine (pH 2.2) after each binding circle. Each cycle consisted of a 2-min waiting period to allow monitoring of the baseline binding stability. A double-referencing procedure was performed to subtract bulk effects caused by changes in the buffer composition or nonspecific binding. Thus, all analyzed samples, including a sample of the running buffer, were additionally injected onto an uncoated reference surface. The association rate ($K_{on}$) and dissociation rate (Kog) were calculated by fitting binding chromatogram data using the BIACore evaluation software with a 1:1 Langmuir binding model. The binding constant $K_D$ was calculated as $K_{off}/K_{on}$. Buffer alone and EFNB2 were used as negative and positive controls, respectively.

The capacity of BIDEN-AP to inhibit the binding of EFNB2 to EphB4 was assessed in a competitive binding assay. A stock solution of EFNB2-Fc in PBS (100 μg/mL) was diluted to 25 μg/mL with 10 mM sodium acetate buffer (pH 4.5) and was immobilized to CM5 sensor chips as already described. Serial dilutions of BIDEN-AP ranging from 2 to 1000 nM were mixed with human EphB4 (30 nM) and injected onto EFNB2-Fc-coated CM5 chips. After each injection, the signal from the control flow cell was subtracted and the relative amount of EphB4 bound to EFNB2-Fc was recorded as the net response over the pre-injection baseline level. A double-referencing procedure was performed to subtract bulk effects caused by changes in the buffer composition or nonspecific binding.

Immunoblotting, immunoprecipitation, and co-immunoprecipitation. For immunoblotting, lysates from cultured cells were prepared using modified radioimmunoprecipitation assay (RIPA) buffer (50 mM Tris-HCl [pH 7.4], 150 mM NaCl, 1% Triton, 0.5% deoxycholate) plus 25 μg/mL leupeptin, 10 μg/mL aprotinin, 2 mM EDTA, and 1 mM sodium orthovanadate. To prepare lysates of snap-frozen tissue from mice, approximately 30-mm$^3$ cuts of tissue were disrupted with a tissue homogenizer and subjected to centrifugation at 13,000 rpm for 30 min in modified RIPA buffer. The protein concentrations were determined by using a BCA Protein Assay Reagent kit (Pierce Biotechnology, Rockford, IL). Lysates were loaded and separated by 8% sodium dodecyl sulfate (SDS)-polyacrylamide gel electrophoresis (PAGE). Proteins were transferred to a nitrocellulose membrane by semidry electrophoresis (Bio-Rad Laboratories, Hercules, CA) overnight, blocked with 3% BSA for 1 h, and then incubated at 4° C. with primary antibody overnight. After washing with a mixture of tris-buffered saline and Tween 20 (TBST) solutions, the membranes were incubated with horseradish peroxidase (HRP)-conjugated horse anti-mouse IgG (1:2000, GE Healthcare, Amersham Place, UK) for 2 h. HRP was visualized by an enhanced chemoluminescence detection kit (Pierce). To confirm equal sample loading, the blots were probed with an antibody specific for beta-actin (0.1 μg/mL; Sigma-Aldrich). Densitometry was performed using ImageJ software. For immunoprecipitation and co-immunoprecipitation, cells were subjected to lysis in non-denaturing NP40 cell lysis buffer (Cell Signaling Technology, Boston, MA). The extracts were incubated with A/G-conjugated antibody at 4° C. for 2 h, and for immunoprecipitation the beads were washed twice with RIPA buffer, once with 0.5 m LiCl in 0.1 m Tris (pH 8.0), and once with PBS. Reactions were boiled in sample buffer, and proteins were then subjected to 10% SDS-PAGE and immunoblotting.

Immunofluorescence imaging. A2780cp20 ovarian cancer cells ($5 \times 10^5$ cells/well) were plated in 4-well chamber slides and treated with Alexa647-labeled BIDEN-AP (50 μM) for 1 h or 2 h. Cells were washed three times with 1×PBS and fixed in freshly prepared fixative containing 3.7% formaldehyde, 0.05% glutaraldehyde, and 0.4% Triton-X-100 in PHEMO buffer (0.068 M PIPES, 0.025 M HEPES, 0.015 M EGTA, 0.003 M $MgCl_2$, and 10% ov/v dimethylsufoxide [DMSO]) for 10 min at room temperature. LysoTracker Green (Cat. L7526; Invitrogen, Carlsbad, CA) was used as a marker of lysosome. The nucleus was stained with Hoechst 33342 (300 nM) at room temperature for 10 min before mounting in Gel Mount mounting medium (Vector Laboratories, Burlingame, CA). Fixed and immunofluorescence-stained cells were imaged using a Zeiss LSM510 Meta laser scanning confocal system (Zeiss, Dublin, CA) configured to a Zeiss Axioplan 2 upright microscope with a CFI Plan Apo Lambda 20× objective lens. Images were obtained from three independent biological replicates.

Immunofluorescence analysis of CD31 was performed on 5-μm-thick fresh-frozen tissue samples. After deblocking with acetone, acetone-chloroform (1:1), and acetone for 5 min, non-specific binding was blocked with 4% fish gelatin (Biotium Inc, Hayward, CA) in PBS for 30 min. The primary antibody, rabbit polyclonal anti-mouse CD31 (ab28364; Abcam, Cambridge, MA) at 1:500 dilution (100-200 μL) in 4% fish gelatin was applied to each slide and the slides were incubated overnight at 4° C. After washing, the slides were incubated with Alexa488-conjugated goat anti-rabbit secondary antibody for 60 min. Slides were subjected to recombinant terminal deoxynucleotidyl transferase (rTdT)-mediated dUTP nick-end labeling (TUNEL) by using the DeadEnd Fluorometric TUNEL System assay kit (Promega) after CD31 staining by immersing slides in 4% formaldehyde in PBS for 15 min. A 20 μg/mL proteinase K solution (Promega) was added to each slide (100 μL per slide), and the slides were incubated at room temperature for 8-10 min. Slides were washed twice with PBS, 100 μL equilibration buffer (Promega) was added to each, and the slides were again incubated for 5-10 min. The slides were then labeled by adding 50 μL of fluorescein-12-dUTP as a substrate, and the rTdT was added. Each slide was covered with a plastic coverslip to ensure even distribution of the labeling solution and incubated for 60 min at 37° C. in a humidified chamber. The reaction was stopped by immersing slides in 2×SSC solution (87.7 g NaCl, 44.1 g sodium citrate, pH 7.0, in 500 mL) for 15 min. After washing with PBS, the slides were counterstained with Hoechst (Sigma-Aldrich) for 15 s. To acquire immunofluorescence images of tissue slices, the slides were mounted and viewed under a Zeiss Axiovert Z.1 fluorescent microscope (Zeiss, Jena, Germany). Microvessel density was evaluated by calculating the average number of CD31-positive microvessels in ten randomly selected tumor areas from each of three tumor samples at ×200 magnification. The apoptotic index was calculated as TUNEL-positive cells/total number of cells in ten randomly selected areas at ×200 magnification from three tumor samples.

Immunofluorescence staining of the samples from resulting PDX tumors was done similarly. For EphB4 staining, slides were probed using rabbit anti-human EphB4 polyclonal antibody (Abcam, Cambridge, MA) as the primary antibody and Alexa Fluor 594-conjugated goat anti-rabbit immunoglobulin (Abcam) as the secondary antibody. For CD31 staining, slides were stained with rat anti-mouse CD31 antibody (Clone 390, Biolegend, San Diego, CA) and Alexa Fluor 488-conjugated donkey anti-rat antibody (Abcam). Ki67 was stained with rabbit anti-Ki67antibody (Clone SP6, Cell Marque, Rocklin, CA) and Alexa Fluor 594-conjugated goat anti-rabbit antibody (Abcam). Cell nuclei were counterstained with DAPI.

Immunohistochemistry (IHC) analysis. For IHC analysis of Ki67, formalin-fixed, paraffin-embedded tumor sections were deparaffinized and rehydrated. After antigen retrieval, slides were blocked in PBS with 10% goat serum and incubated with primary antibody anti-Ki67 (1:400 dilution; Abcam) overnight at 4° C. Slides were washed and incubated with biotinylated goat-anti-rabbit IgG (1:200; Vector Laboratories) and streptavidin-conjugated HRP (DAKO, Carpinteria, CA) for 30 min each. A positive reaction was detected by exposure to 3,3'-diaminobenzidine. Slides were counterstained with hematoxylin and visualized under a microscope. The positively stained nuclei were counted in at least ten randomly selected 20× fields of view.

Integrated pathway analysis of reverse-phase protein array. Three individual tumors with comparable sizes from each group were subjected to prepare for protein lysate. Briefly, the small piece of tumor tissue was put into a 5 ml tube on ice, and added ice-cold lysis buffer (1% Triton X-100, 50 mM HEPES, pH 7.4, 150 mM NaCl, 1.5 mM $MgCl_2$, 1 mM EGTA, 100 mM NaF, 10 mM Na pyrophosphate, 1 mM $Na_3VO_4$, 10% glycerol, containing freshly added protease and phosphatase inhibitors). The volume of lysis buffer was calculated as 40 mg of tumor/mL. The tissue was homogenized by hand homogenizer for 8 seconds, and then transferred to microcentrifuge tubes and centrifuged at 4° C., 14,000 rpm for 10 minutes. Supernatant was collected and diluted to protein concentration of 1.5 μg/μL. The cell lysate was mixed with 4×SDS and were submit for RPPA assay. The RPPA were performed at the Process Core Facility at MD Anderson. In brief, we arrayed these lysates on nitrocellulose-coated FAST slides (Whatman, Inc., Sanford, ME). Slides then were scanned and analyzed to quantitatively measure spot density to generate a fitted curve for each condition. The fitted curve was plotted with the log 2-concentration of proteins versus spot density. Data presented in the treatment groups reflect fold-change compared to the baseline (i.e., to untreated control group), and analyzed by Ingenuity Pathway Analysis (IPA, Qiagen). Positive fold-change was calculated by dividing each linear value >1.0 by the average control linear value for each antibody tested, while negative fold-change (for linear values <1.0) was also calculated (by using the following formula: [−1/linear fold-change]). The median of the expression fold-change from three individual replica in each condition was plotted in the heatmap. The p values associated with pathways in IPA analysis were calculated using the right-tailed Fisher Exact Test.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

U.S. Pat. No. 4,220,450
U.S. Pat. No. 4,373,932
U.S. Pat. No. 4,554,101
U.S. Pat. No. 4,680,338
U.S. Pat. No. 5,141,648
U.S. Pat. No. 5,399,363
U.S. Pat. No. 5,466,468
U.S. Pat. No. 5,470,723
U.S. Pat. No. 5,543,158
U.S. Pat. No. 5,543,504
U.S. Pat. No. 5,563,250
U.S. Pat. No. 5,641,515
U.S. Pat. No. 5,856,456
U.S. Pat. No. 5,880,270
U.S. Pat. No. 5,470,932
U.S. Pat. No. 6,372,445
U.S. Pat. No. 6,613,308
U.S. Pat. No. 6,7537,514
U.S. Pat. No. 8,734,853
U.S. Pat. No. 8,895,717
U.S. Patent Application 2007/0264664
Abéngozar et al., *Blood* 119, 4565-4576, 2012.
Albericio, Solid-Phase Synthesis: A Practical Guide (1 ed.). Boca Raton: CRC Press. p. 848. ISBN 978-0-8247-0359-2, 2000.
Ansell et al., *Methods Mol Med.;* 25:51-68, 2000.
Arai et al., *PROTEINS: Structure, Function, and Bioinformatics,* 57:829-838, 2004.
Aryasomayajula et al. "Multifunctional Liposomes" *Methods Mol Biol.;* 1530:41-61, 2017.
Barneh et al., *Dis Markers* 35, 933-938, 2013.
Becerikli et al., *Int J Cancer.;* 15; 136(8):1781-91, April 2015.
Beck et al., *Nat Rev Drug Discov.;*16(5):315-337, 2017.
Bergers et al., *Nat Rev Cancer* 8, 592-603, 2008.
Bhatia et al., *Sci Rep.;* 12; 6:38792, December 2016.
Chan and White, Fmoc Solid Phase Peptide Synthesis: A Practical Approach. Oxford, UK: OUP. ISBN 978-0-19-963724-9, 2000.
Chen et al., *J Cell Biochem.,* 116(3):467-75, 2015.
Chen et al., *Semin Cancer Biol.;* pii: S1044-579X(17)30162-1, October 2017.
Chrencik et al., *J Biol Chem* 281, 28185-28192, 2006b.
Chrencik et al., *Structure* 14, 321-330, 2006a.
Dijkraaf et al., *Handb Exp Pharmacol.;* (185 Pt 2):61-92, 2008.
Djokovic et al., *BMC Cancer* 10, 641, 2010.
El-Faham and Albericio, *Chemical Reviews.* 111 (11): 6557-602, November 2011.
Ferguson et al., Sci Rep.; 15; 5:10641, June 2015.
Goyal et al., *Biochem. J.,* 345:247-254, 2000.
Hasina et al., *Cancer Res.;* 1; 73(1):184-94, January 2013.
Herington et al., *Growth Factors* 32, 207-213, 2014.
Heroult et al., *Mol Cancer Res* 8, 1297-1309, 2010.
Himanen et al., *Nature* 414, 933-938, 2001.
Hu et al., *Tumour Biol* 35, 7225-7232, 2014.
Hu et al., Int J Pharm.; pii: S0378-5173(16)30851-1, September 2016.
Hwang et al., *Crit. Rev. Ther. Drug Carrier Syst.,* 15(3): 243-284, 1998.
Ishii et al., *Basic Res Cardiol.* 2011; 106:1057-68.
Kertesz et al., *Blood* 107, 2330-2338, 2006.
Koolpe et al., *J Biol Chem* 280, 17301-17311, 2005.
Kuppen et al., *Int J Mol Sci.;* 18(2). pii: E307, February 2017.
Lamouille et al., *Nat Rev Mol Cell Biol* 15, 178-196, 2014.
Landen et al., *Expert Opin Ther Targets* 9, 1179-1187, 2005.
Li et al., *Onco Targets Ther.;* 21; 10:1735-1742, March 2017.
Li et al., *Tumour Biol.;* 35(7):6855-9, July 2014.
Manjappa et al. "*J Control Release.* February 28; 150(1): 2-22, 2011.
Mansson-Broberg et al. Biochem Biophys Res Commun; 373:355-9, 2008.
Martiny-Baron et al., *Neoplasia* 6, 248-257, 2004.
Mathiowitz et al., *Nature,* 386(6623):410-414, 1997.
Merrifield, *J. Am. Chem. Soc.* 85 (14): 2149-2154, 1963;
Mertens-Walker et al., Exp Cell Res.; 10; 333(1):105-15, April 2015.
Mertens-Walker et al., *BMC Cancer* 15, 164, 2015.
Noren and Pasquale, Cancer Res 67, 3994-3997, 2007.
Noren et al., *Proc Natl Acad Sci USA* 101, 5583-5588, 2004.
Noren et al., *Nat Cell Biol* 8, 815-825, 2006.
Pasquale, *Curr Opin Cell Biol* 9, 608-615, 1997.
Paterson et al., 2014.
Pecot et al., Nat Commun 4, 2427, 2013.
Randolph et al., *PLoS One.;* 17; 12(8):e0183161, August 2017.
*Remington: The Science and Practice of Pharmacy,* 21$^{st}$ Ed., Lippincott Williams and Wilkins, 2005.
Remington's Pharmaceutical Sciences" 15$^{th}$ Ed., 1035-1038 and 1570-1580, 1990.
Remington's Science and Practice of Pharmacy, 21$^{st}$ Ed., Mack Printing Company, 2005.
Remington's Pharmaceutical Sciences, 18$^{th}$ Ed. Mack Printing Company, 1289-1329, 1990.
Riedl and Pasquale, *Curr Drug Targets* 16, 1031-1047, 2015.
Robinson and Sauer, *Proc. Natl. Acad. Sci. USA,* 95:5929-5934, 1998.
Rutkowski et al., *Int J Cancer* 131, E614-624, 2012.
Sawamiphak et al., *Nature* 465, 487-491, 2010.
Scehnet et al., *Blood* 113, 254-263, 2009.
Shi et al., *Nanomedicine* (Lond); 10(7):1111-25, 2015.
Sofou et al., *Expert Opin Drug Deliv.;* 5(2):189-204, February 2008.
Sood et al., *Am J Pathol* 158, 1279-1288, 2001.
Stephenson et al., *Oncotarget* 6, 7554-7569, 2015.
Takenaga et al., *J. Control Release,* 52(1-2):81-87, 1998.
Talelli et al., *Nano Today;* 10(1): 93-117, Feb. 1, 2015.
Thaker et al., *Clin Cancer Res* 10, 5145-5150, 2004.
Tognolini et al., *Drug Discov Today Epub* Nov. 26, 2013.
van Beijnum et al., *Exp Cell Res* 314, 264-272, 2008.
Vrettos et al., Beilstein *J Org Chem.;* 14: 930-954, 2018/
Wang et al., *Nature* 465, 483-486, 2010.
Whitlow et al., *Prot. Eng.,* 6:989-995, 1993.
Yan et al., *Amino Acids.;* 41(5): 1081-1092, November 2011.
Yang and Weinberg, *Dev Cell* 14, 818-829, 2008.

Yang et al., *Biomacromolecules* 8, 3422-3428, 2007.
Yin et al., *Anticancer Res.;* 37(8):4489-4497, August 2017.
Zhang et al., *J Nucl Med* 52, 958-964, 2011a.
Zhang et al., *Biomaterials* 32, 5872-5879, 2011b.
Zhao et al., *Cell Metab,* 4:111-121, 2006.
Zhao et al., *ACS Macro Lett* 1, 150-153, 2012.
Zhao et al.; 63:28-33, December 2017.
Zhou et al., *Int J Pharm.;* 15; 523(1):260-269, May 2017.

What is claimed is:

1. A non-natural peptide comprising TNd (Y) LFSPNG-PIARAW (SEQ ID NO:1) or a sequence that has 1, 2, 3, or 4 amino acid substitutions relative to SEQ ID NO: 1 and retains the D-amino acid at position 3 of SEQ ID NO:1.

2. The peptide of claim 1, wherein the peptide is comprised in micelles, nanoparticles, or liposomes.

3. The peptide of claim 2, wherein the micelles are core-crosslinked polymeric micelles (CCPM).

4. The peptide of claim 2, wherein the peptide is contained in or covalently bound to the micelles, nanoparticles, liposomes, or CCPM.

5. The peptide of claim 4, wherein the peptide is covalently bound via a maleiimide bond or by reacting the micelles, nanoparticles, or liposomes and the peptide with N-(γ-maleimidobutyryloxy)-succinimide ester) (GMBS).

6. The peptide of claim 2, wherein the micelles, nanoparticles, or liposomes have a diameter from about 15 nm to about 300 nm.

7. The peptide of claim 6, wherein the micelles, nanoparticles, or liposomes have a diameter from about 20 nm to about 70 nm.

8. The peptide of claim 2, wherein the micelles, nanoparticles, or liposomes comprise polyethylene glycol (PEG), polyethylene glycol monomethyl ether (mPEG), methoxypoly(ethylene glycol)-block-poly (D, L-lactide), poly(ethylene glycol)-block-poly(aspartate), poly(ethylene glycol)-b-poly(methacrylic acid), an amine-terminated amphiphilic block copolymer, poly(PEG-methacrylate)-b-poly(triethoxysilyl propylmethacrylate), or poly(ethylene glycol)-block-poly(glutamate).

9. The peptide of claim 2, wherein the micelles, nanoparticles, or liposomes further comprise a chemotherapeutic, an anti-angiogenic agent, or an immunotherapy.

10. The peptide of claim 2, wherein the micelles, nanoparticles, or liposomes comprise an imaging agent.

11. The peptide of claim 10, wherein the imaging agent is a fluorophore or a radioisotope.

12. The peptide of claim 11, wherein the micelles are core-crosslinked polymeric micelles (CCPM) and wherein the micelles are labelled with a fluorophore or a near-infrared fluorophore.

13. The peptide of claim 11, wherein the micelles are core-crosslinked polymeric micelles (CCPM) and wherein the micelles are labelled with both a fluorophore and a radioisotope.

14. The peptide of claim 1, wherein the peptide is conjugated to or covalently attached to a cytotoxic moiety or a drug moiety.

15. The peptide of claim 14, wherein the cytotoxic moiety is a chemotherapeutic or a cytotoxic polypeptide.

16. The peptide of claim 15, wherein the cytotoxic moiety is a maytansinoid, an auristatin, a taxoid, a calicheamicin, a CC-1065 analog, a duocarmycin, a protein toxin or an amatoxin.

17. The peptide of claim 1, wherein the peptide is conjugated to a radionuclide.

18. The peptide of claim 17, wherein the peptide is not covalently attached to a chelator.

19. The peptide of claim 17, wherein the peptide is covalently attached to a radiometal chelator.

20. The peptide of claim 19, wherein the radiometal chelator is 1,4,7-Triazacyclononane-1,4,7-triacetic acid (NOTA), 1,4,7,10-Tetraazacyclododecane-1,4,7,10-tetraacetic acid (DOTA), diethylenetriaminepentaacetic anhydride (DTPA), 1,4,8,11-tetraazacyclotetradecane-1,4,8,11-tetraacetic acid (TETA), a 1,4,7-triazacyclononane macrocycle substituted with a phosphonic (NOTP) or phosphinic (TRAP) group, bis(2-hydroxybenzyl)ethylenediaminediacetic acid (HBED), 4,11-bis (carboxymethyl)-1,4,8,11-tetraazabicyclo[6.6.2]hexadecane (CB-TE2A), or desferrioxamine-B (DFO).

21. The peptide of claim 17, wherein the radionuclide is $^{90}$Y, $^{86}$Y, $^{111}$In, $^{67}$Ga, $^{68}$Ga, $^{89}$Zr, $^{64}$Cu, $^{67}$Cu, $^{177}$Lu, $^{188}$Re, $^{186}$Re, $^{153}$Sm, $^{89}$Sr, $^{186}$Er, $^{47}$Sc, $^{223}$Ra, $^{166}$Ho, $^{161}$Tb, $^{149}$Th, $^{212}$Pb/$^{212}$Bi, $^{225}$Ac, $^{213}$Bi, $^{211}$At, $^{117m}$Sn, $^{123}$I, $^{131}$I or $^{18}$F.

22. The peptide of claim 14, wherein a linker separates the peptide from the cytotoxic payload.

23. The peptide of claim 22, wherein the linker is a cleavable linker.

24. The peptide of claim 1, wherein the peptide is conjugated to or covalently attached to a cell targeting moiety.

25. The peptide of claim 24, wherein the cell targeting moiety comprises or consists of an antibody, a scfv, or a targeting ligand.

26. The peptide of claim 1, wherein the peptide is conjugated to or covalently attached to an imaging agent.

27. The peptide of claim 26, wherein the imaging agent is a fluorescent dye, a fluorescent protein, or an enzyme conjugate.

28. The peptide of claim 14, wherein the peptide conjugated to or covalently attached to a linker.

29. The peptide of claim 28, wherein the linker is a cleavable linker.

30. The peptide of claim 1, wherein the peptide is conjugated to a drug payload.

31. The peptide of claim 30, wherein the drug payload is an auristatin, maytansinoid, tubulysin, calicheamicin, duocarmycin, benzodiazepine, camptothecin analogue, doxorubicin, non-clinical-stage cytotoxic payload, or combination thereof.

32. The peptide of claim 1, wherein the peptide is comprised in a peptide homodimer, a peptide homotrimer, a peptide homotetramer, or a peptide multimer.

33. There peptide of claim 1, wherein the peptide is comprised in a peptide heterodimer, a peptide heterotrimer, a peptide heterotetramer, or a peptide multimer.

34. The peptide of claim 1, wherein the peptide is comprised in a pharmaceutical composition.

35. The peptide of claim 34, wherein the pharmaceutical composition is formulated for injection, parenteral administration, subcutaneous injection, intravenous administration, or intraperitoneal injection.

36. A method of treating a cancer in a mammalian subject comprising administering to the subject a therapeutically relevant amount of a peptide of claim 1.

37. A method of treating a heart disease in a mammalian subject comprising administering to the subject a therapeutically relevant amount of a peptide of claim 1.

38. A method of treating a bone disease or promoting bone healing or bone remodeling in a mammalian subject comprising administering to the subject a therapeutically relevant amount of a peptide of claim 1.

* * * * *

UNITED STATES PATENT AND TRADEMARK OFFICE
CERTIFICATE OF CORRECTION

| | | |
|---|---|---|
| PATENT NO. | : 12,448,425 B2 | Page 1 of 1 |
| APPLICATION NO. | : 17/609536 | |
| DATED | : October 21, 2025 | |
| INVENTOR(S) | : Chun Li et al. | |

It is certified that error appears in the above-identified patent and that said Letters Patent is hereby corrected as shown below:

In the Claims

Claim 5, Column 51, Line 29, please delete "N-(y-maleimidobutyryloxy)-succinimide ester)" and insert --N-(γ-maleimidobutyryloxy)-succinimide ester)-- therefor.

Claim 21, Column 52, Line 34, please delete "$^{149}$Th," and insert --$^{149}$Tb,-- therefor.

Signed and Sealed this
Thirtieth Day of December, 2025

John A. Squires
*Director of the United States Patent and Trademark Office*